INVENTORS
MAURITZ L. GRANBERG
CHARLES A. KIESLING
BY Thomas J. Nikolai
ATTORNEY

Sept. 9, 1969 M. L. GRANBERG ET AL 3,466,645

DIGITAL DATA CRT DISPLAY SYSTEM

Filed March 1, 1965 26 Sheets-Sheet 2

DIGITAL DATA CRT DISPLAY SYSTEM

Filed March 1, 1965 26 Sheets-Sheet 5

Sept. 9, 1969 M. L. GRANBERG ET AL 3,466,645

DIGITAL DATA CRT DISPLAY SYSTEM

Filed March 1, 1965 26 Sheets-Sheet 6

Sept. 9, 1969 M. L. GRANBERG ET AL 3,466,645

DIGITAL DATA CRT DISPLAY SYSTEM

Filed March 1, 1965 26 Sheets-Sheet 7

Sept. 9, 1969 M. L. GRANBERG ET AL 3,466,645

DIGITAL DATA CRT DISPLAY SYSTEM

Filed March 1, 1965 26 Sheets-Sheet 8

| Ø | X | Y | I |
|---|---|---|---|
| $Ø_1$ | 3 | 2 | 0 |
| $Ø_2$ | 4 | 1 | 1 |
| $Ø_3$ | 2 | 0 | 1 |
| $Ø_4$ | 0 | 1 | 1 |
| $Ø_5$ | 0 | 5 | 2 |
| $Ø_6$ | 2 | 6 | 1 |
| $Ø_7$ | 4 | 5 | 1 |
| $Ø_8$ | 4 | 1 | 2 |

TABLE I

Sept. 9, 1969 M. L. GRANBERG ET AL 3,466,645

DIGITAL DATA CRT DISPLAY SYSTEM

Filed March 1, 1965 26 Sheets-Sheet 10

PHASE GENERATOR

DIGITAL DATA CRT DISPLAY SYSTEM

Sept. 9, 1969 M. L. GRANBERG ET AL 3,466,645

DIGITAL DATA CRT DISPLAY SYSTEM

Filed March 1, 1965 26 Sheets-Sheet 14

Sept. 9, 1969 M. L. GRANBERG ET AL 3,466,645

DIGITAL DATA CRT DISPLAY SYSTEM

Filed March 1, 1965 26 Sheets-Sheet 15

Sept. 9, 1969 M. L. GRANBERG ET AL 3,466,645

DIGITAL DATA CRT DISPLAY SYSTEM

Filed March 1, 1965 26 Sheets-Sheet 16

Sept. 9, 1969 M. L. GRANBERG ET AL 3,466,645

DIGITAL DATA CRT DISPLAY SYSTEM

Filed March 1, 1965 26 Sheets-Sheet 17

DIGITAL DATA CRT DISPLAY SYSTEM

Sept. 9, 1969 M. L. GRANBERG ET AL 3,466,645

DIGITAL DATA CRT DISPLAY SYSTEM

Filed March 1, 1965 26 Sheets-Sheet 20

United States Patent Office 3,466,645
Patented Sept. 9, 1969

3,466,645

DIGITAL DATA CRT DISPLAY SYSTEM

Mauritz L. Granberg and Charles A. Kiesling, Minneapolis, Minn., assignors to Sperry Rand Corporation, New York, N.Y., a corporation of Delaware Filed Mar. 1, 1965, Ser. No. 436,174
Int. Cl. H01j *29/46;* G09f *9/00*
U.S. Cl. 340—324 15 Claims

ABSTRACT OF THE DISCLOSURE

A solid state cathode ray tube digital display device for use in a real-time computing system either to monitor or edit information from a variety of sources to be stored in a computer or to display and edit information retrieved from the computer. The basic element of the character generator is a matrix having input and output lines selectively coupled with diodes for producing a series of groups of output signals representing both the intensity of a character line segment and the coordinates of an end point thereof. Further, the character generating matrices are arranged in a larger matrix to enable the individual selection of a character with minimum hardware. The unique beam positioning circuit includes a D/A converter which does not subject the power supply to extreme load variations. This is accomplished by weighting the value of the resistors in a specific manner. Also included in the system are the unique provisions for deleting or inserting a character in a line of existing characters. Also a visual indicator is provided to locate the point of entry of the next character.

GENERAL

The present invention relates to a solid state digital cathode ray tube display device intended for use in a real-time computing system either to monitor and edit information from a variety of sources to be stored in a computer or to display and edit information retrieved from the computer. Thus the device translates coded information into any type desired character, such as alphanumeric characters, which are then produced on a cathode ray tube for display purposes.

PRIOR ART

The prior art is replete with patents relating to apparatus for generating alphanumeric characters on the phosphor screen of a cathode ray tube.

The first type comprises, within the tube, an aperture mask having a plurality of character shaped apertures. The aperture mask is positioned to intercept the electron beam on its way from the electron gun to the cathode ray tube screen. Sets of deflection voltages are applied to deflecting means which direct the electron beam at a selected character shaped aperture. The beam passing through the aperture has its cross-section shaped to that of the aperture. The character shaped beam thereafter is deflected onto the cathode ray tube screen at a location whereby in connection with other previous and succeeding activations of the screen phosphor, intelligence is conveyed. This type of character generating apparatus is disclosed in Patents 3,020,441, 3,111,598, and 3,091,759. There are several disvantages to this type of display unit, one of which is the requirement for a special and expensive type of display tube. Another disadvantage is the distortion and loss of edge resolution due to beam debunching, both of which are emphasized with this type of display unit. Further, precise control over the diameter of the electron beams or bundles must be incorporated in the system in order to ensure that the beam when passing through one character cut-out will not overlap and pass through an adjacent character cut-out.

A second type of character generation system is the dot sequential display of characters as disclosed by Patents 3,090,041, 3,024,454, 2,987,715, and 2,931,022. The ultimate end of these systems, of course, is to provide apparatus of synthesizing a character with a succession of spots on the screen of a cathode ray tube. The apparatus includes a plurality of coding circuits, each circuit representing an associated character, together with means to selectively actuate a single circuit or group of circuits to successively produce a series of coded signals for each selected character. These signals, when decoded and applied to the deflection plates of a cathode ray tube, cause the beam of the cathode ray tube to be successively deflected from spot to spot in a predetermined seqeunce to thereby synthesize a character or group of characters for display on the screen of the cathode ray tube. The cathode ray tube beam is unblanked at appropriate times to generate a pattern of spots which defines the character. One disadvantage of this system is that the pattern of dots does not form a character which is easily and readily distinguishable because of the spaces between the dots. Further, a large number of dots are required to form each character.

Still another type of character generation system utilizes a series of straight line segments or curved segments which are then successively assembled in proper sequence into a complete character. In these systems, input data to be visually displayed in the form of discrete characters is encoded into representative digital or analog signals. Character control means are provided which decode the input data signals and select a desired character to display from the many characters or symbols available in a character programming device. The programming device is adapted to generate a unique set of gating pulses for each character selected. A display generating unit operative in response to the application of these pulses generates horizontal and vertical sweep voltage waveforms and beam intensity control signals which are applied to the vertical and horizontal deflection plates and intensity control grid of the display tube to cause the electron beam to trace the selected character on the face thereof. The present invention relates to improvements in this system of character display.

PRIOR ART DISADVANTAGES

In each of the above described character generating circuits as described in the prior art, analog circuits are used to control either the positioning of the electron beam or the formation of the characters or both. Analog circuits are inherently disadvantageous in such type system since certain parameters depend on the stability of components and, as the components age, accurate operation of the device begins to change and errors creep into the system. Further, very precise and close tolerance components are required in the system and such components are relatively expensive. One of the novel arrangements of the display system described herein is in the use of solid state digital circuits rather than analog circuits throughout the entire system including the synthesization of the characters with the exception of the positioning of the electron beam where the digital values are converted to current levels. These digital circuits are switched only between the off condition and the fully saturated condition. For this reason, the unit is unusually simple and provides a stable image free from jitter and long term drift. Further, no adjustment or calibration is required in the display system.

PRESENT UNIT

The present display unit utilizes a ten inch round or 19 inch rectangular cathode ray tube as the viewing medium although it is obvious that any size desired may be used. In the present configuration, up to 512 or 1024 characters may be displayed simultaneously in a viewing area of eight inches by six inches which consists of 16 lines with 32 characters generated per line. The beam is positioned in any one of its 512 locations by the digital address stored in an Electromagnetic Address Register which controls the magnetic deflection coils of the CRT. A particular character is "painted" or traced on the face of the CRT by the digital data stored in an Electrostatic Address Register which controls the electrostatic deflection plates of the CRT. It is to be understood that wherever the word "painted" is used hereinafter, it is to be used interchangeably with the word "traced."

The unit contains a 512 word, 6 bit, core memory. However, this is not intended to be limiting but is for purposes of example only and may include larger or smaller memories. It is loaded by a standard computer output channel, a keyboard associated with the display unit (which is similar to a standard electric typewriter keyboard), any special type keyboard, or any special input switch arrangement. These inputs are in the form of data words up to six bits in length which are stored in the 512 word core memory.

As the electromagnetic beam positioning circuitry causes the beam to assume consecutively the 512 positions on the face of the tube, 16 lines with 32 characters per line, it also causes the stored information in the 512 corresponding locations in the core to be consecutively read out. The character repertoire is stored in a diode matrix array which may consist, for instance, of an 8 by 8 array of character synthesizing matrices which would allow 64 different characters to be stored in the matrix array. The size of the matrix array may vary and may be either larger or smaller. As each 6 bit word is read out of memory, it causes selection of one character synthesizing matrix as defined by the junction of a row and column in the matrix array. The output of any one of the matrices in the diode matrix array is in digital form and is coupled to the Electrostatic Address Register where it controls the electron beam to trace the desired character. If more than 64 characters are used then the memory must use more bits for character length i.e., 7 bits for 64 to 128 or 8 bits for 129 to 256 characters. It may also be necessary to add an extra bit if parity either odd or even if desired.

An entry marker or cursor is also provided to enable the operator to determine the exact point of entry of a character or to enable him to insert or delete characters.

Therefore it is an object of this invention to provide a completely digital character generator.

It is also an object of this invention to provide a unique diode matrix array for synthesizing the desired character.

It is another object of this invention to provide a digitalized intensity control circuit.

It is also an object of this invention to provide separate digitized intensity control for each segment of each character to be synthesized and which is an integral part of each character synthesizing matrix.

It is still another object of this invention to provide a controllable entry marker or cursor which will enable the operator to determine the location of the beam in order that a desired operation may be performed at a particular location.

It is also an object of this invention to provide a digitalized beam positioning control system.

It is also an object of this invention to provide a digital beam positioning control system in which the power supplies are not subjected to extreme load variations instantaneously and in which the deleterious effects of component deterioration is reduced.

It is also another object of this invention to provide a character generating and display system which utilizes a conventional cold screen CRT.

It is also an object of this invention to provide a character generation and display system in which the electrostatic deflection plates of the CRT are driven by digital control circuits.

As previously indicated, the display buffer may be loaded by either a switch arrangement, computer output, or keyboard input. To save hardware cost, all buffer loading and unloading is done sequentially and uses the same hardware.

These and other more detailed and specific objects will be disclosed in the course of the following specification, reference being had to the accompanying drawings, in which:

FIG. 1 is a general block diagram of the entire character generation and display system;

FIG. 1*a* is a detailed wiring diagram of the timing unit used with the system;

FIG. 1*b* shows the relationship of the painting or tracing cycle during which the alphanumeric character is painted or traced on a cathode ray tube screen and the input/output cycle during which data is coupled into or out of the system;

Figure 1:
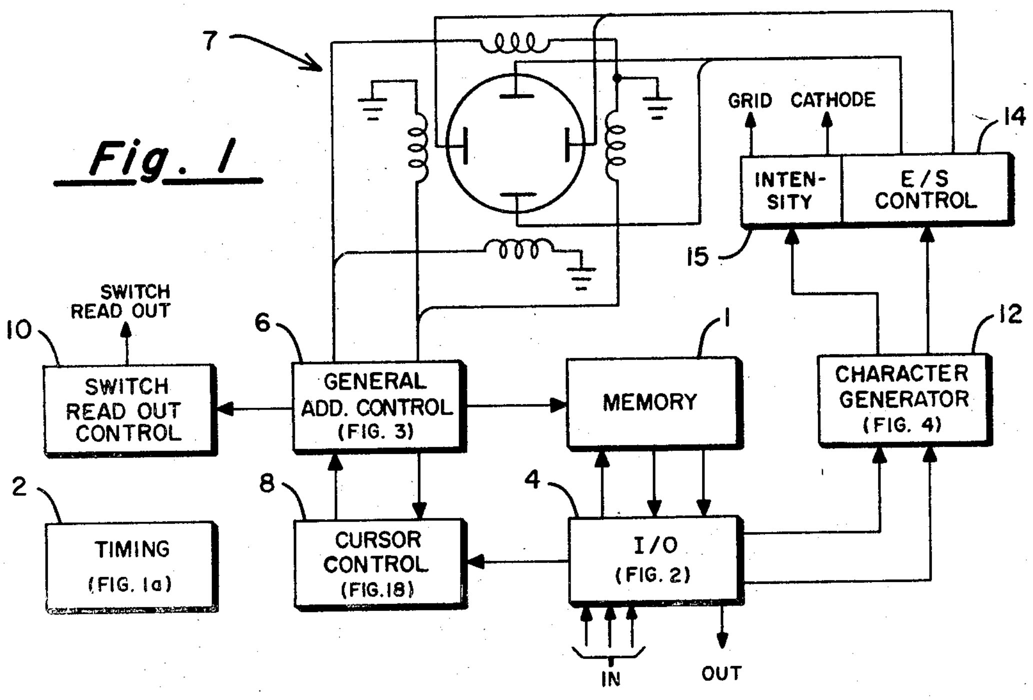
Figure 2:
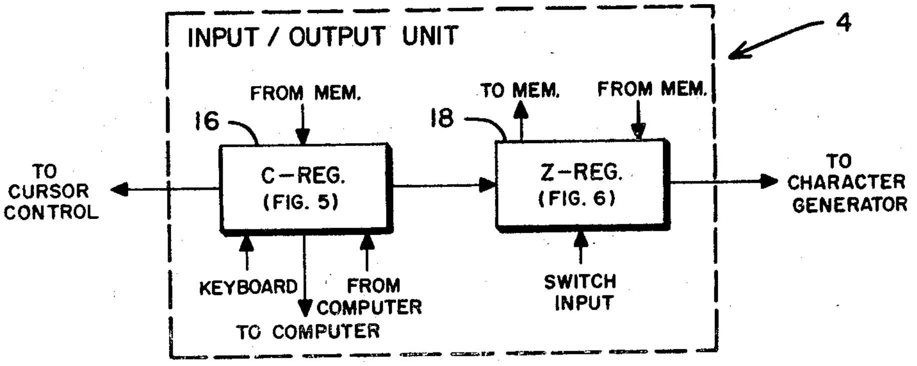
FIG. 2 is a generalized block diagram of the input/output unit shown in FIG. 1.
Figure 3:
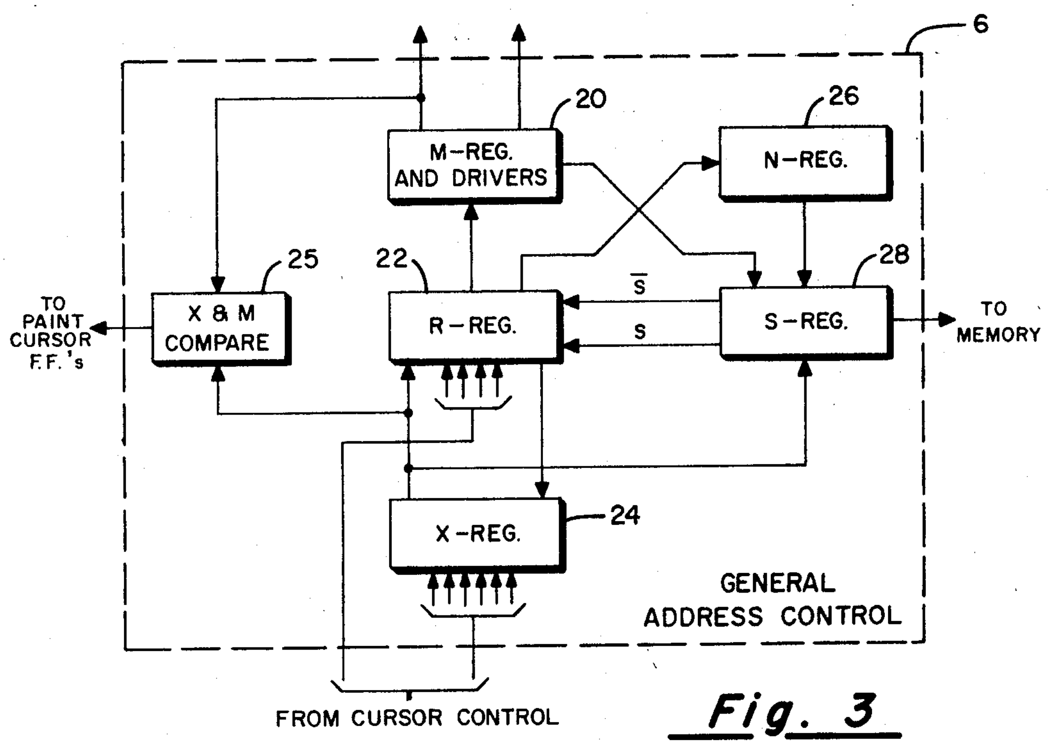
FIG. 3 is a generalized block diagram of the General Address Control shown in FIG. 1.
Figure 4:
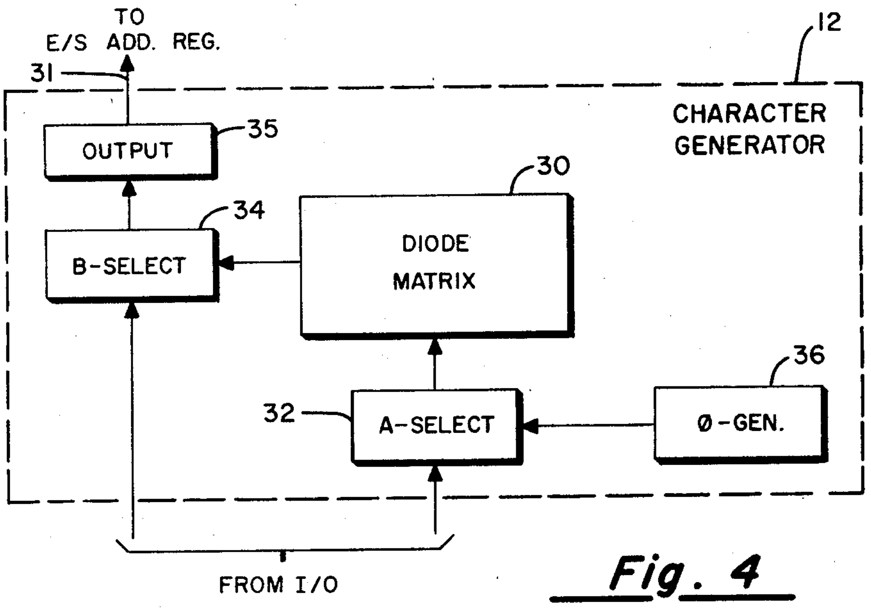
Figure 3A:
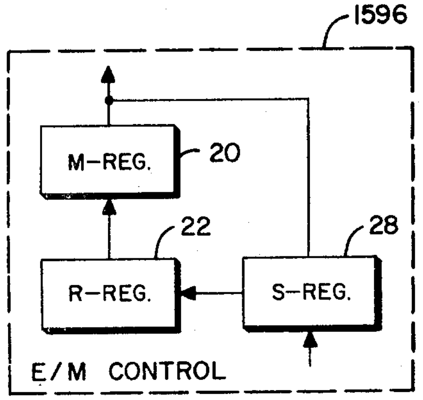
Figure 3B:
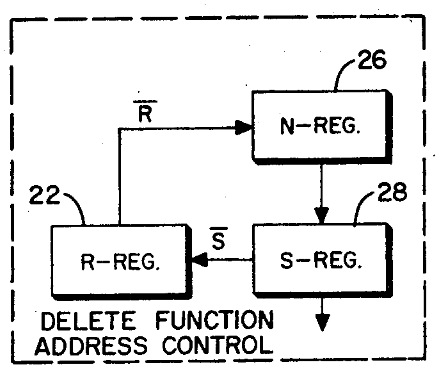
Figure 3C:
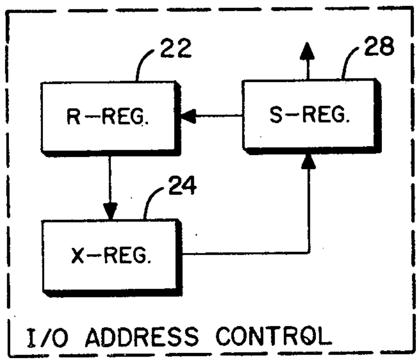
Figure 3D:
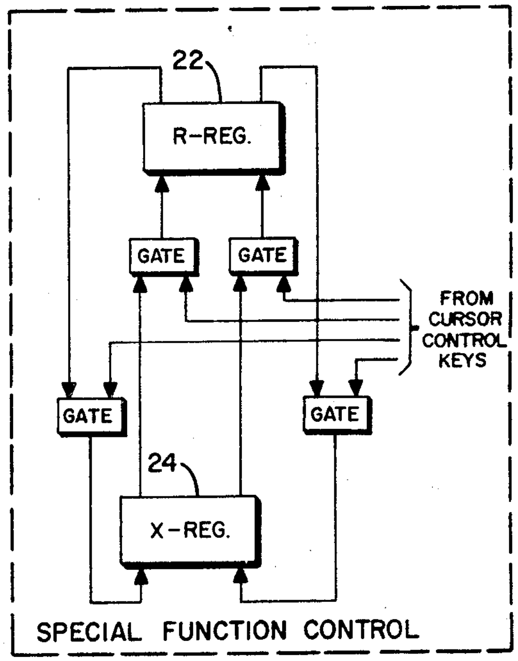
Figure 5:
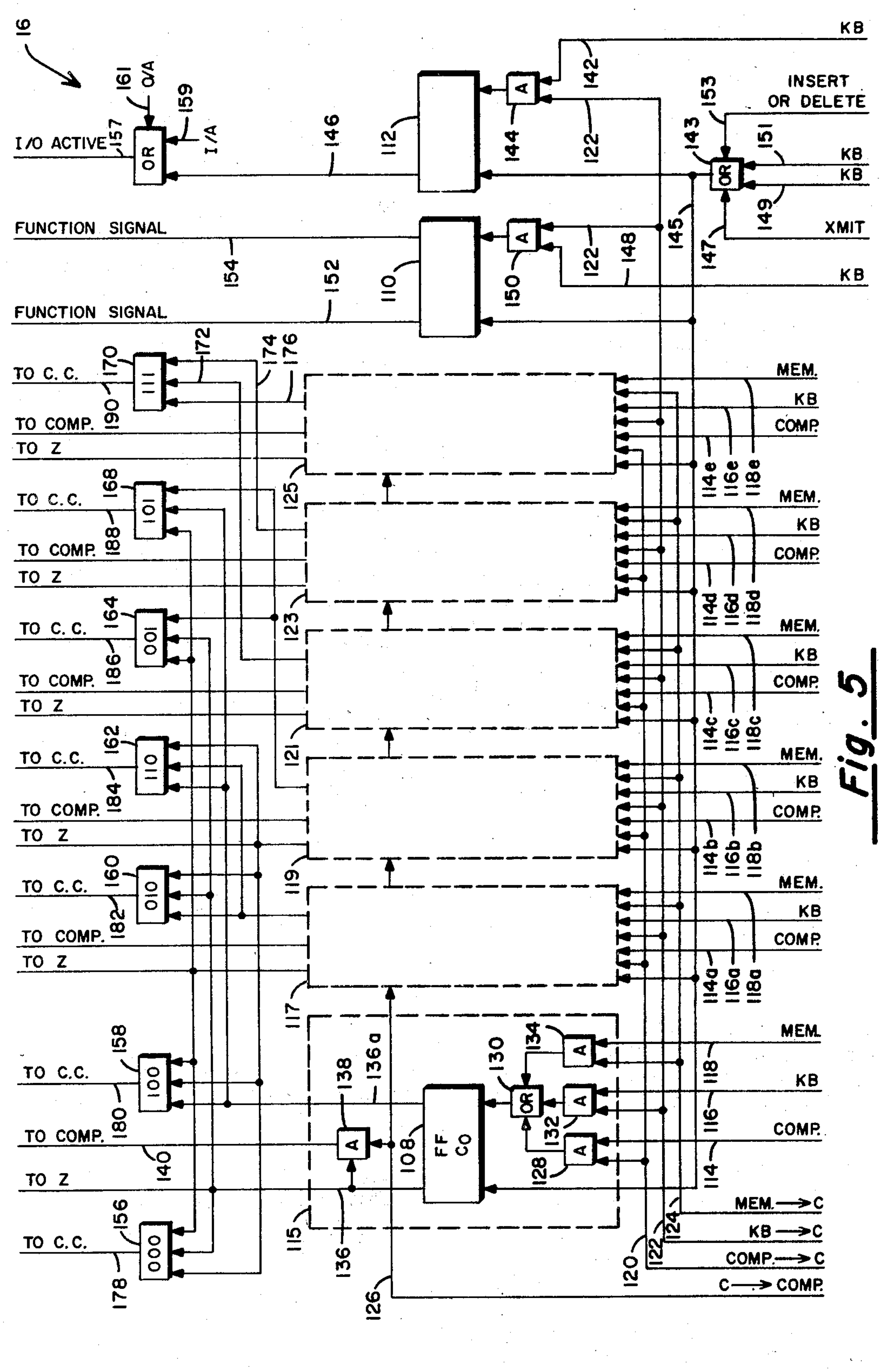
Figure 6:
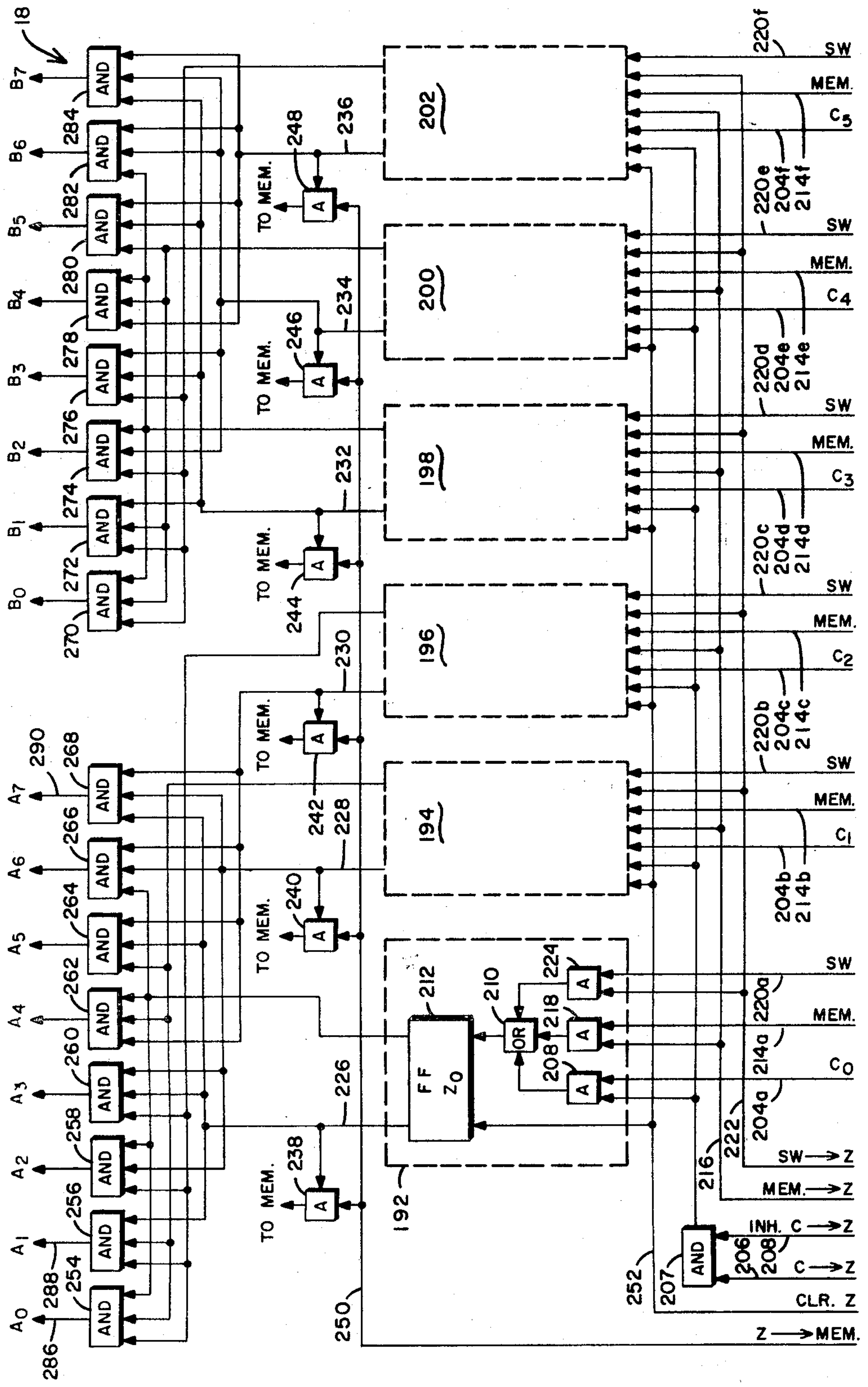
Figure 7:
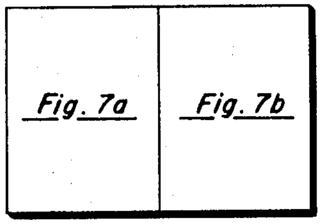
Figure 7C:
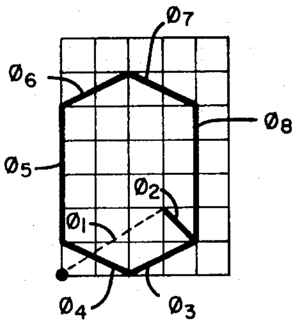
Figure 9:
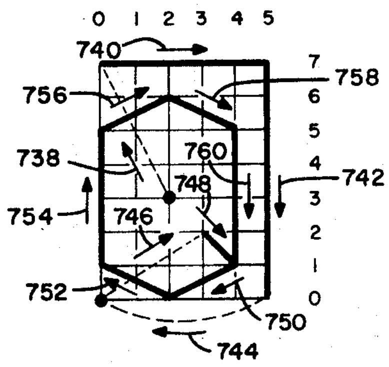
Figure 10A:
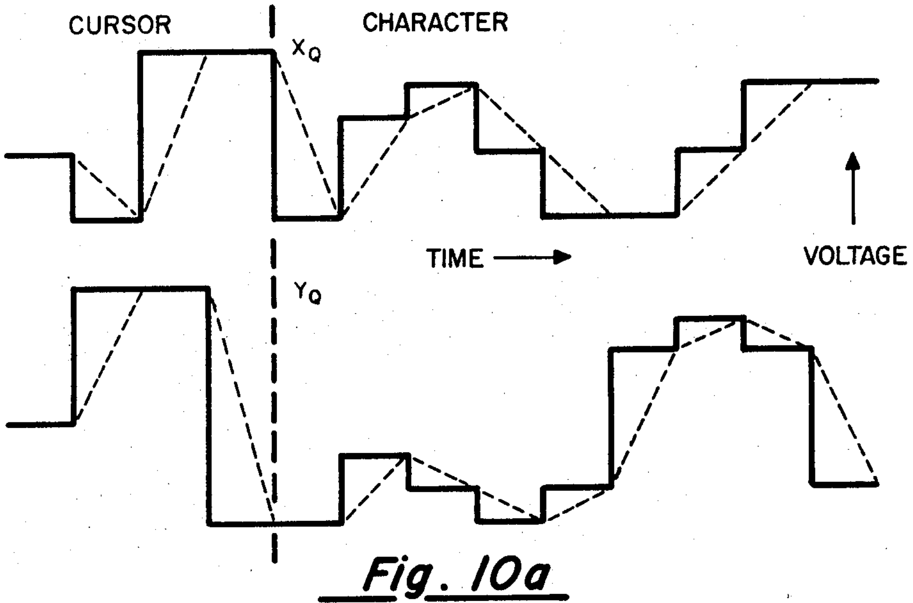
Figure 7A:
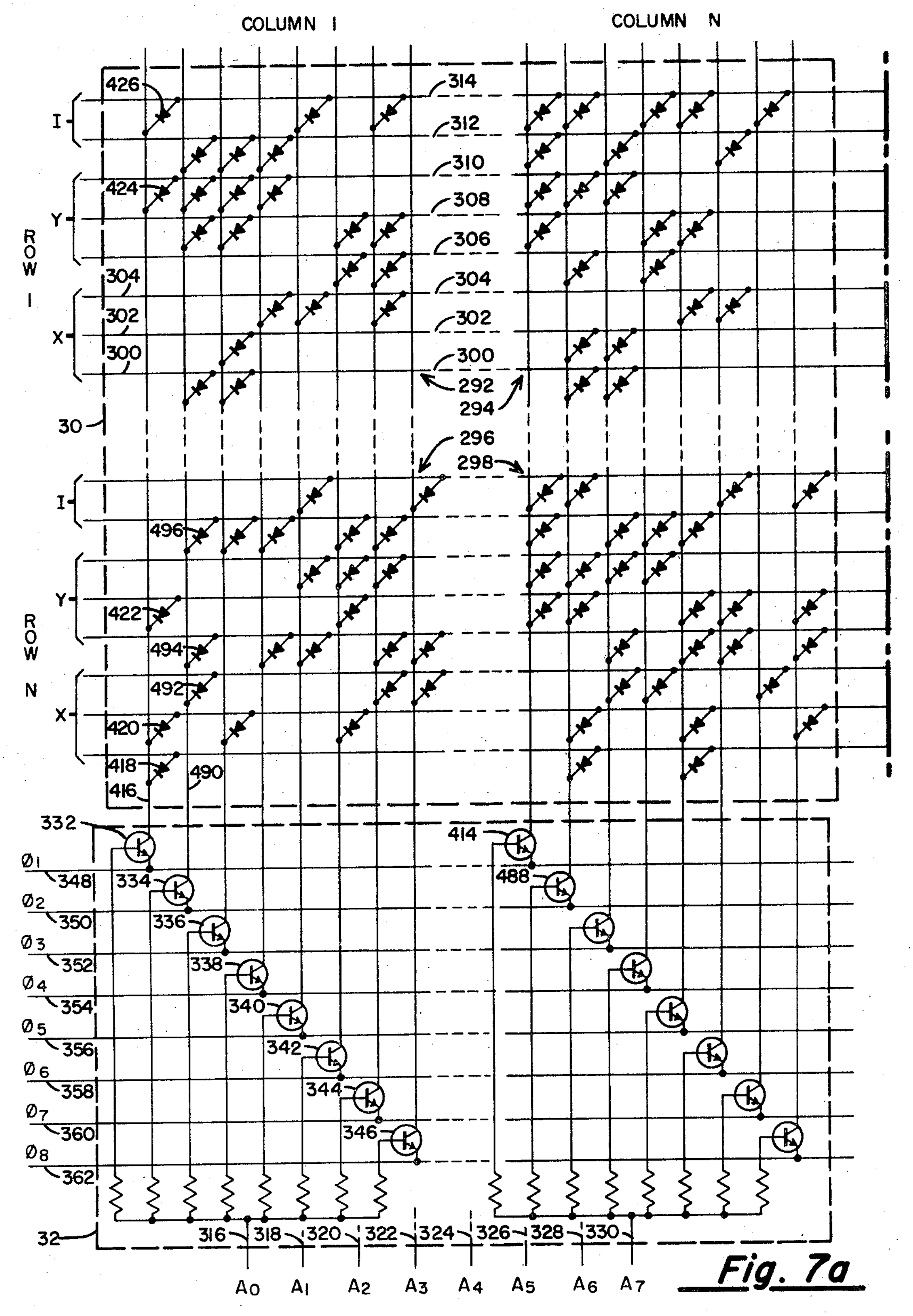
Figure 7B:
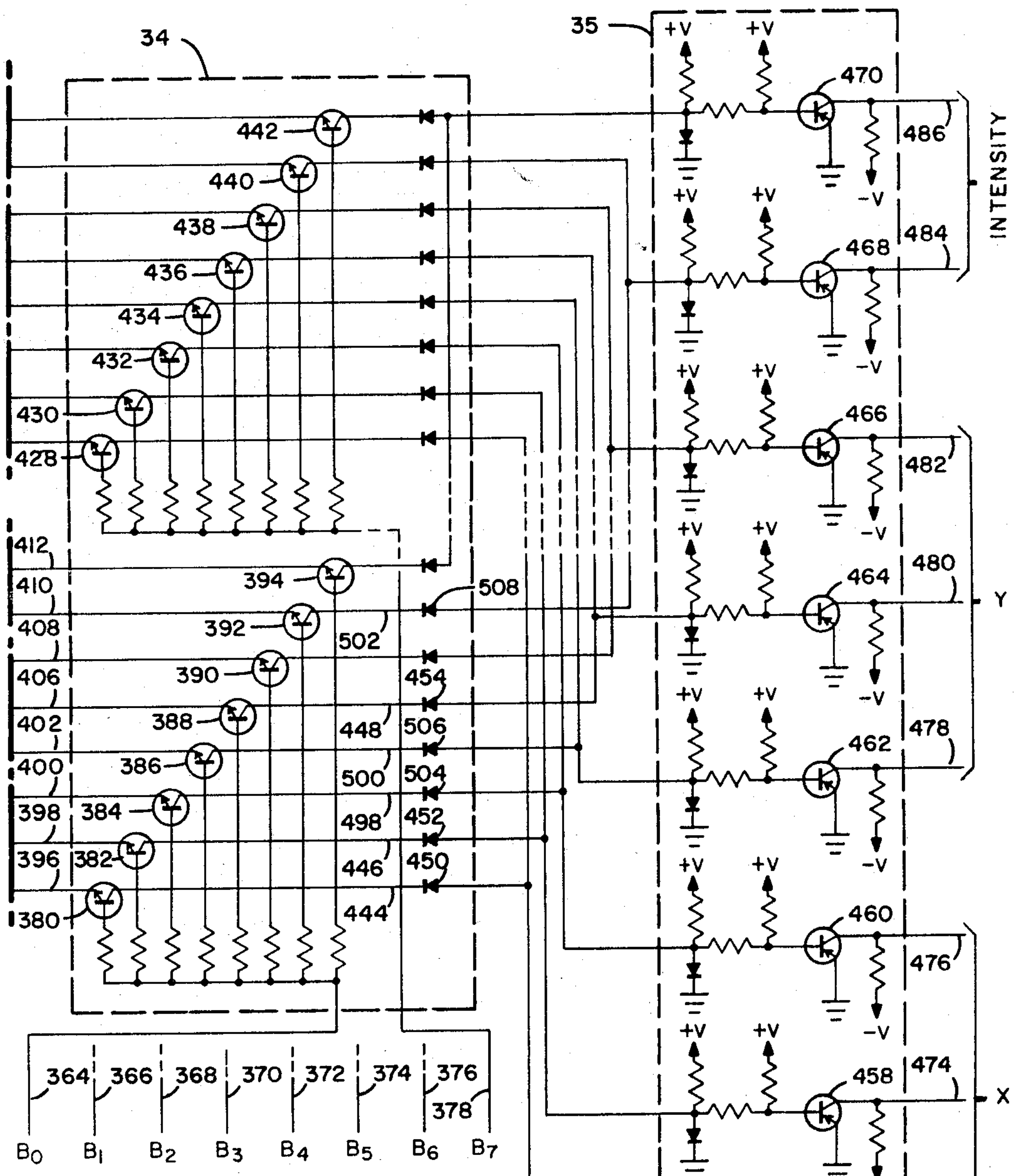
Figure 7D:
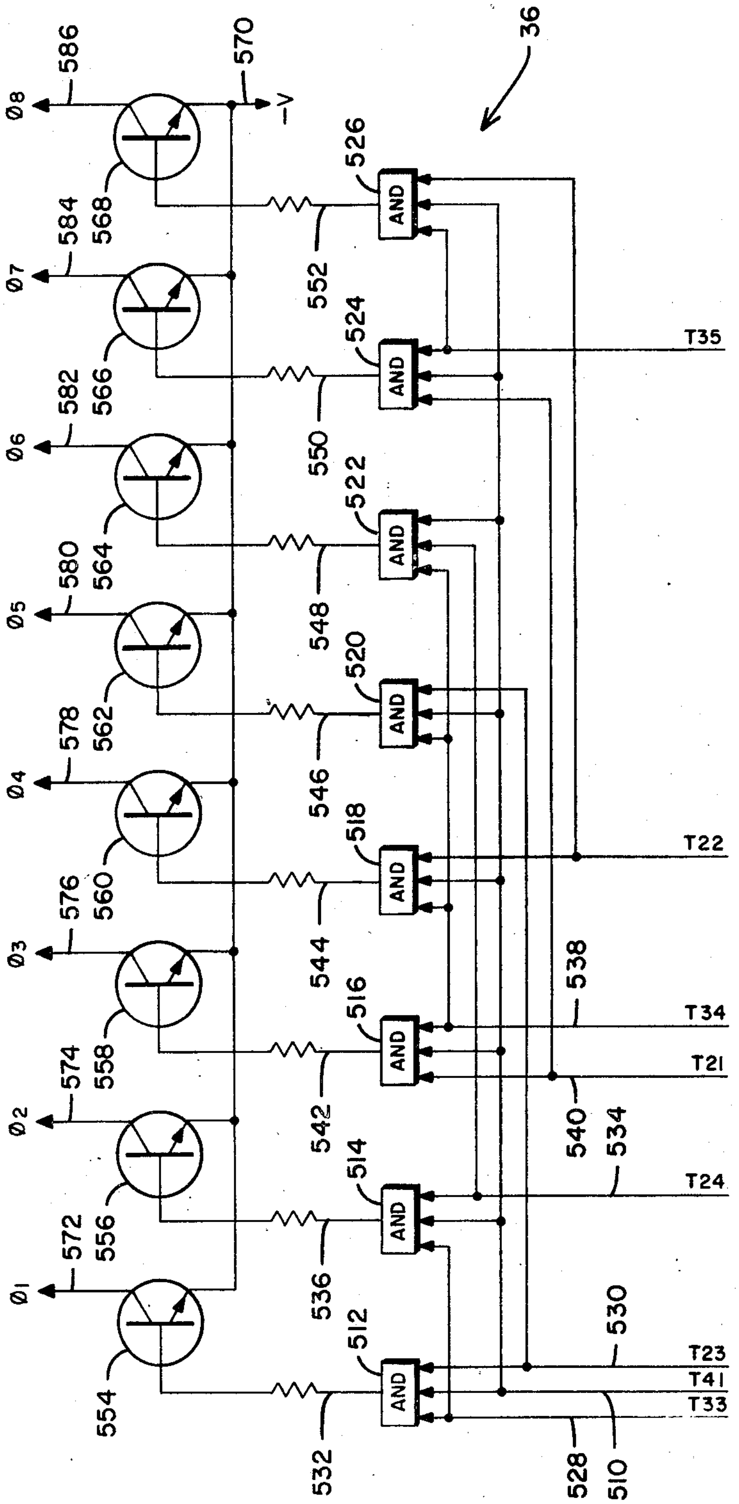
Figure 8:
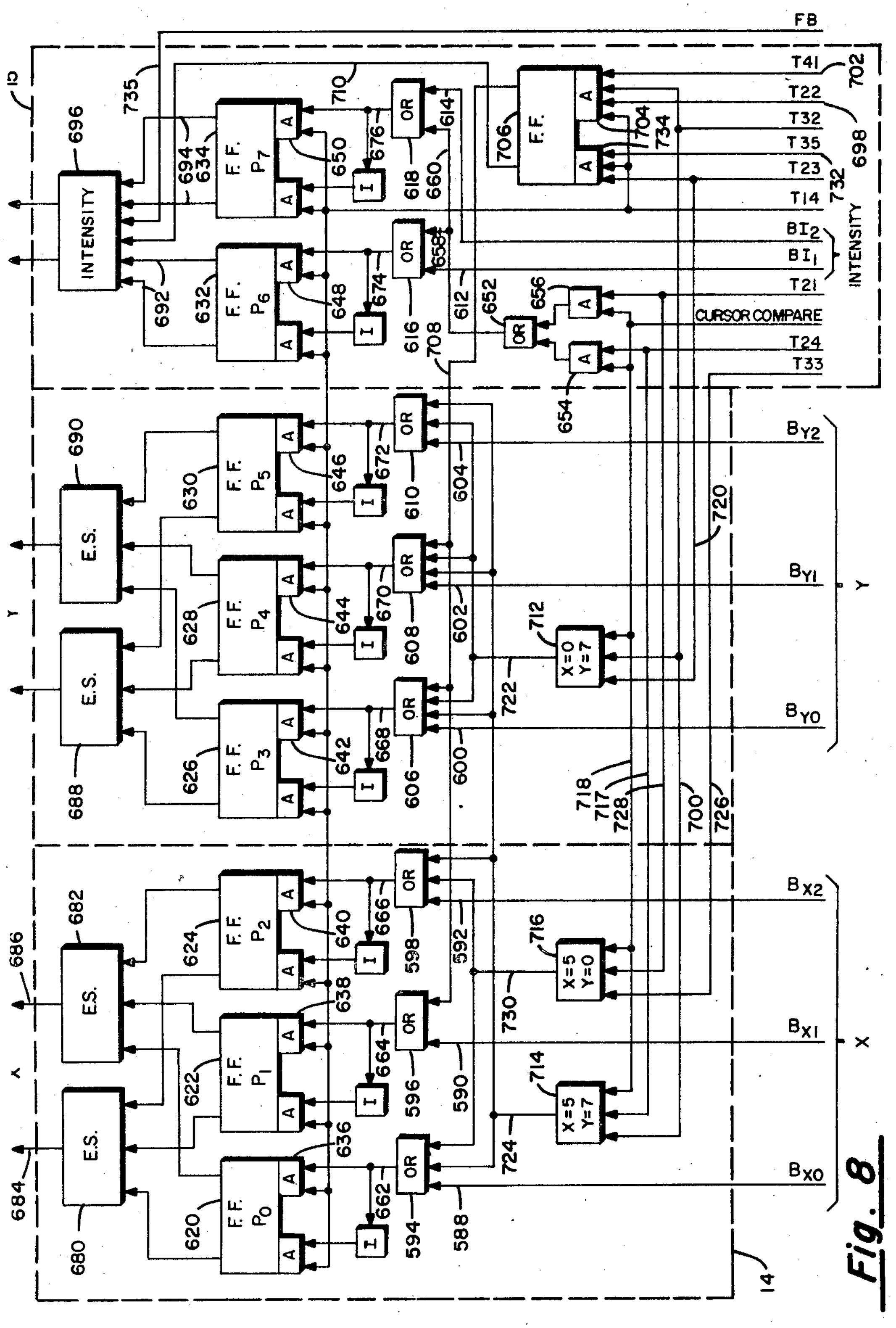
Figure 10:
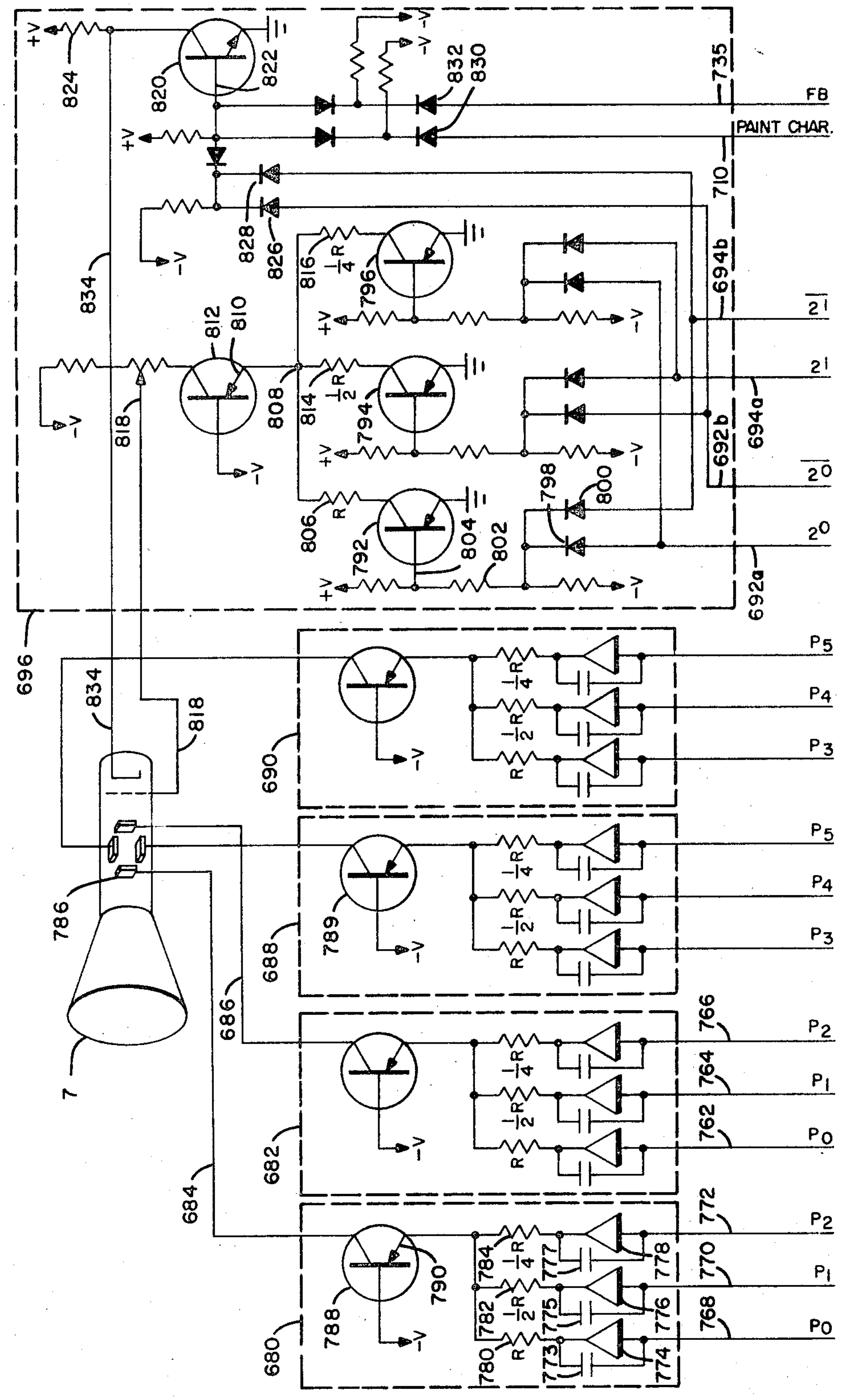
Figure 11:
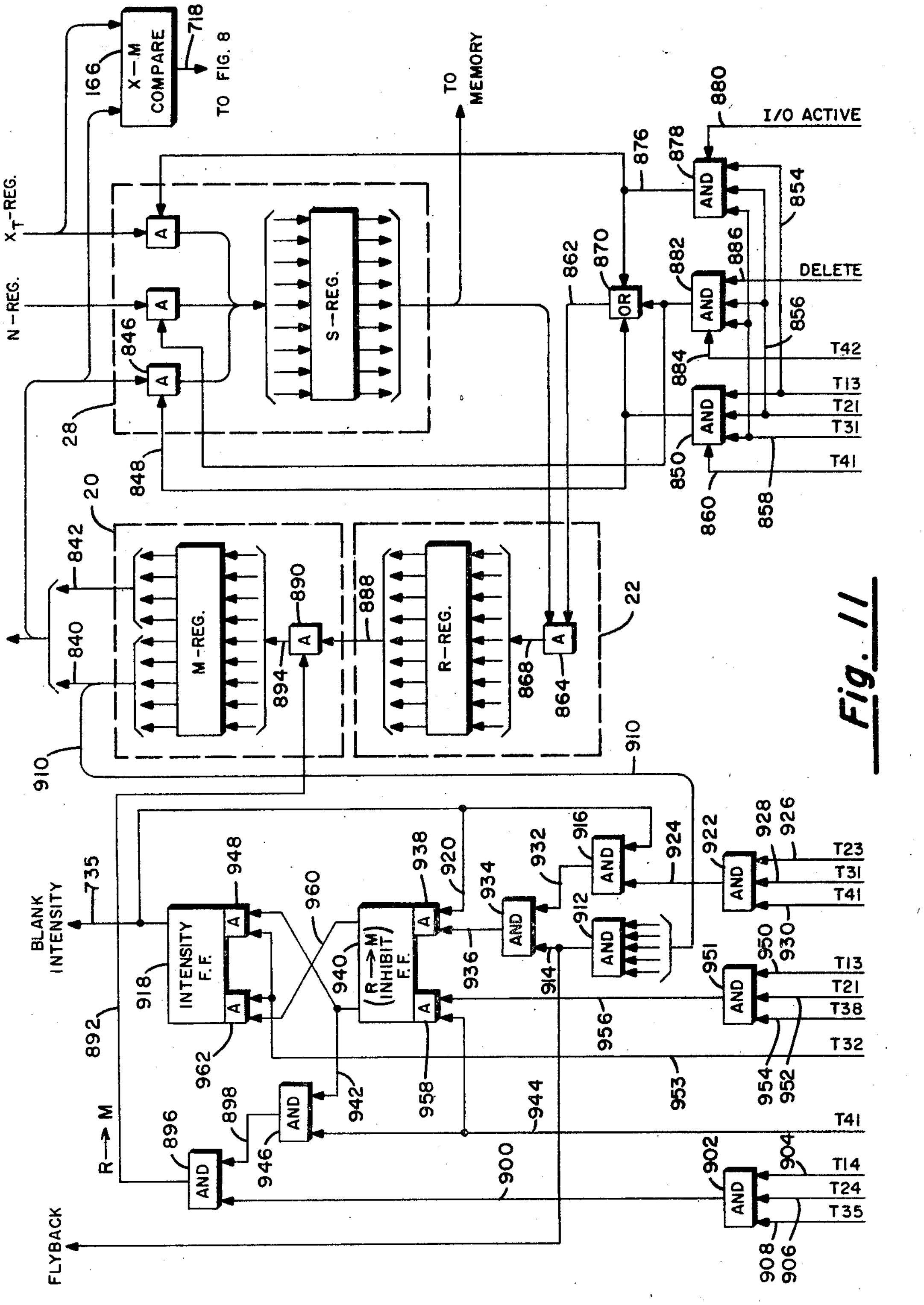
Figure 12:
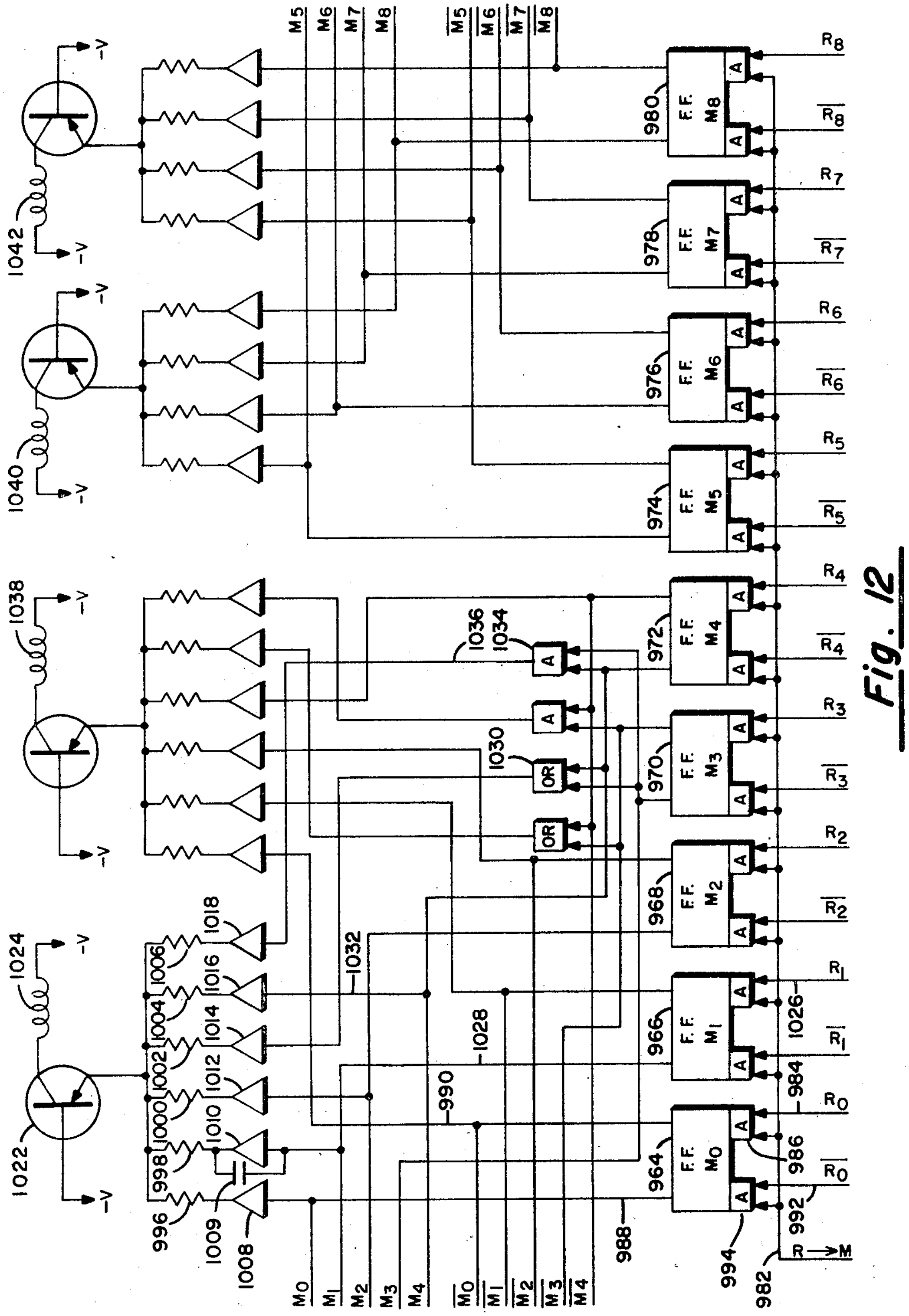
Figures 13, 13A:
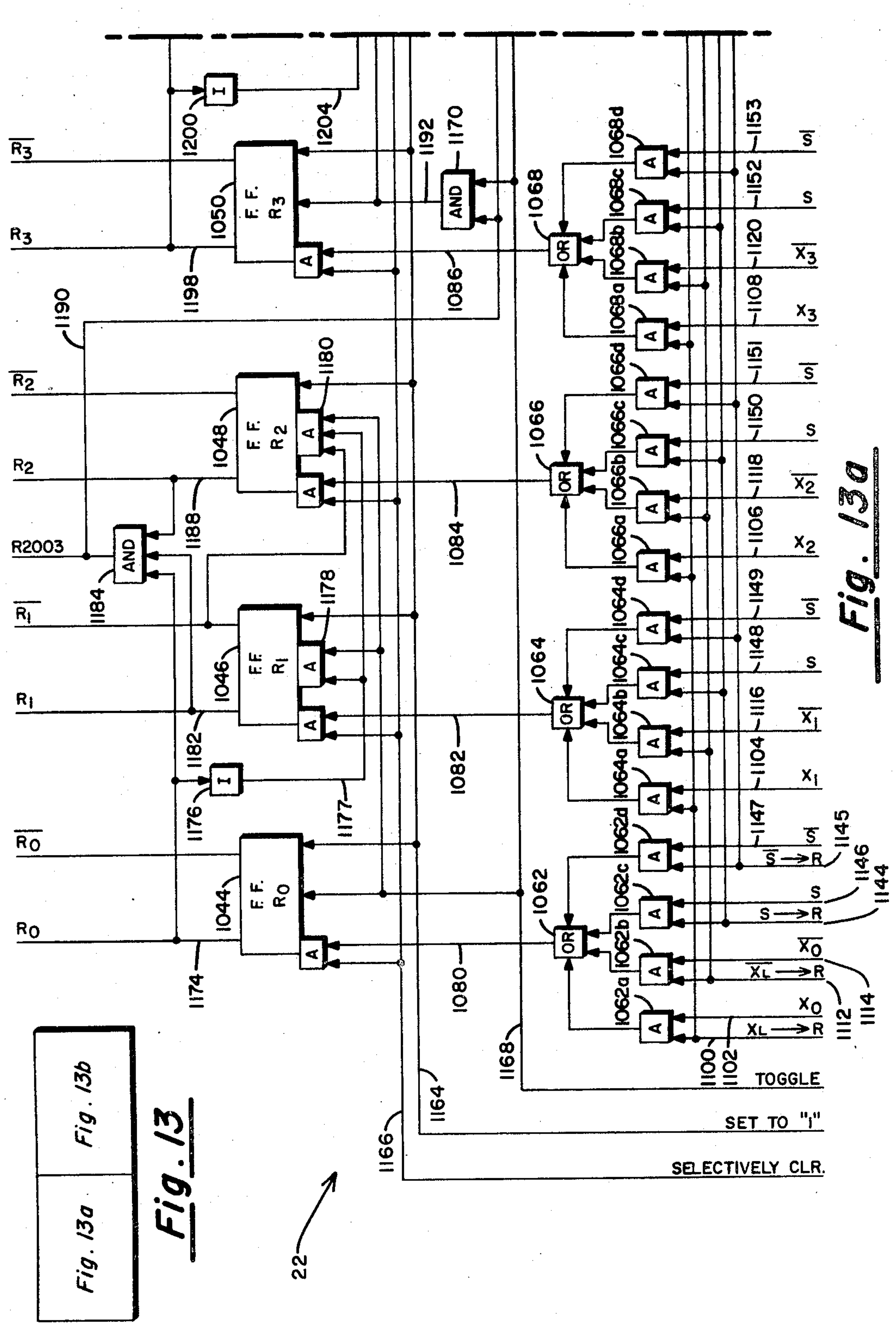
Figure 13B:
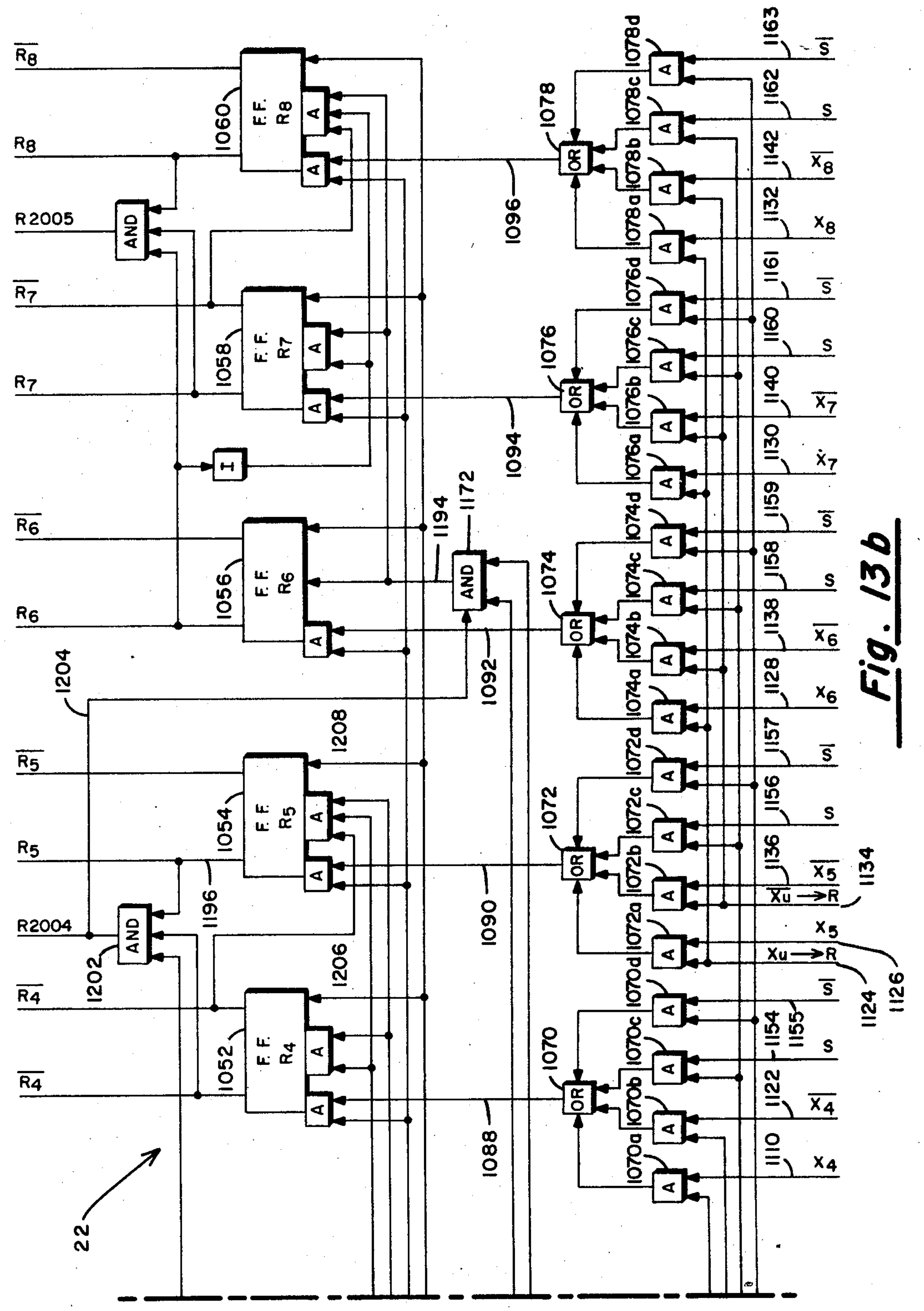
Figures 14, 15:
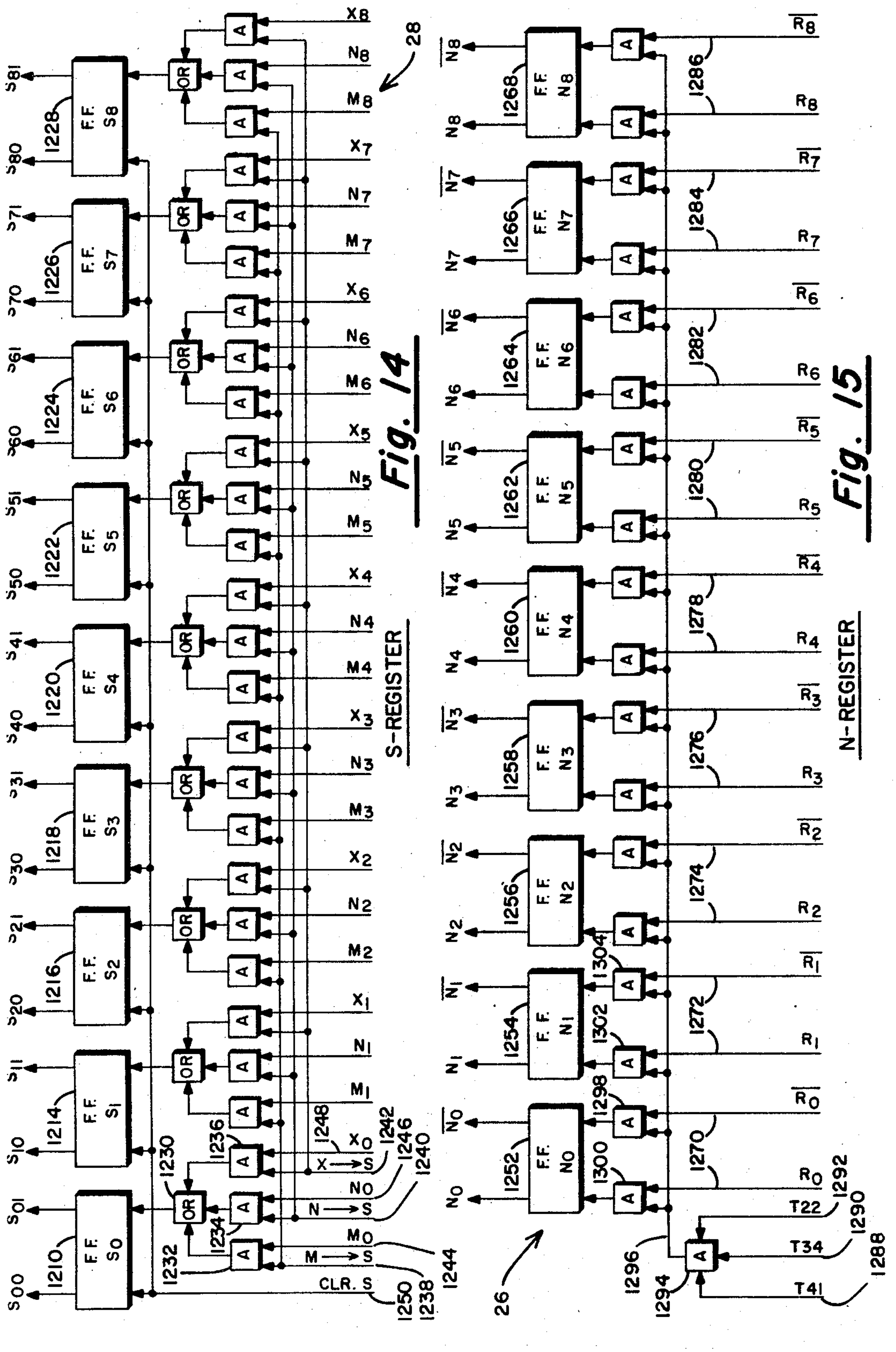
Figure 16:
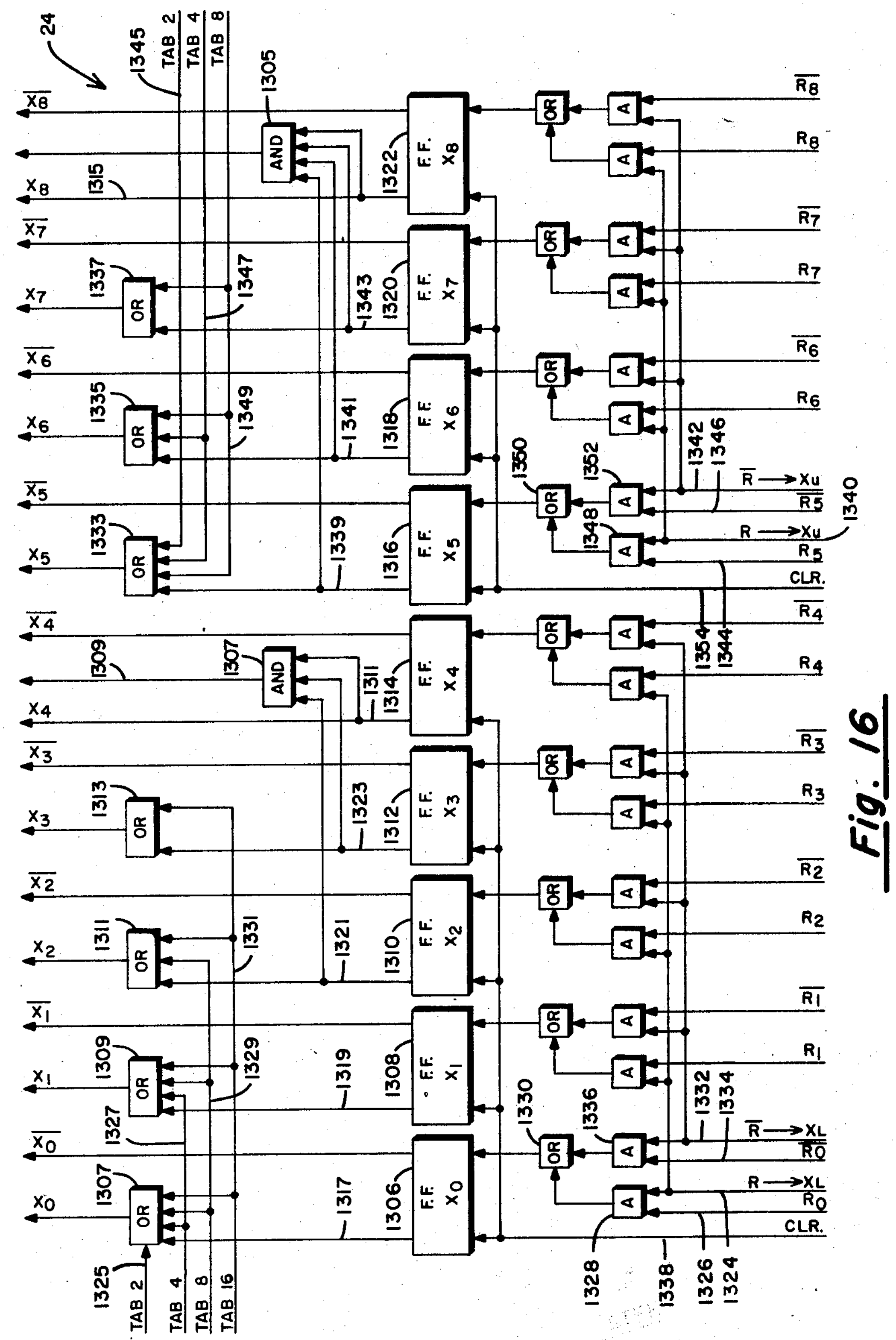
Figure 17:
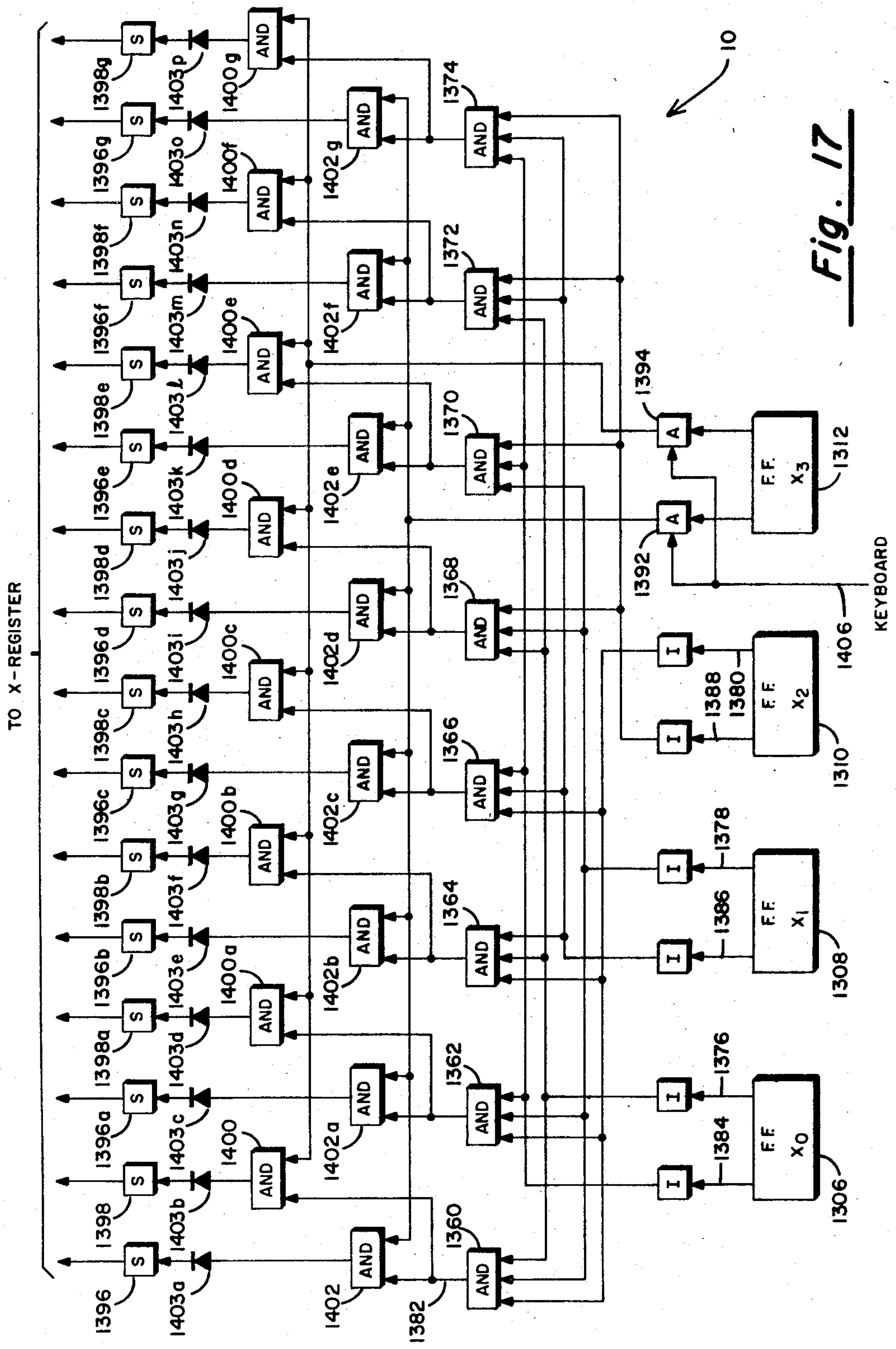
Figures 18, 18A:
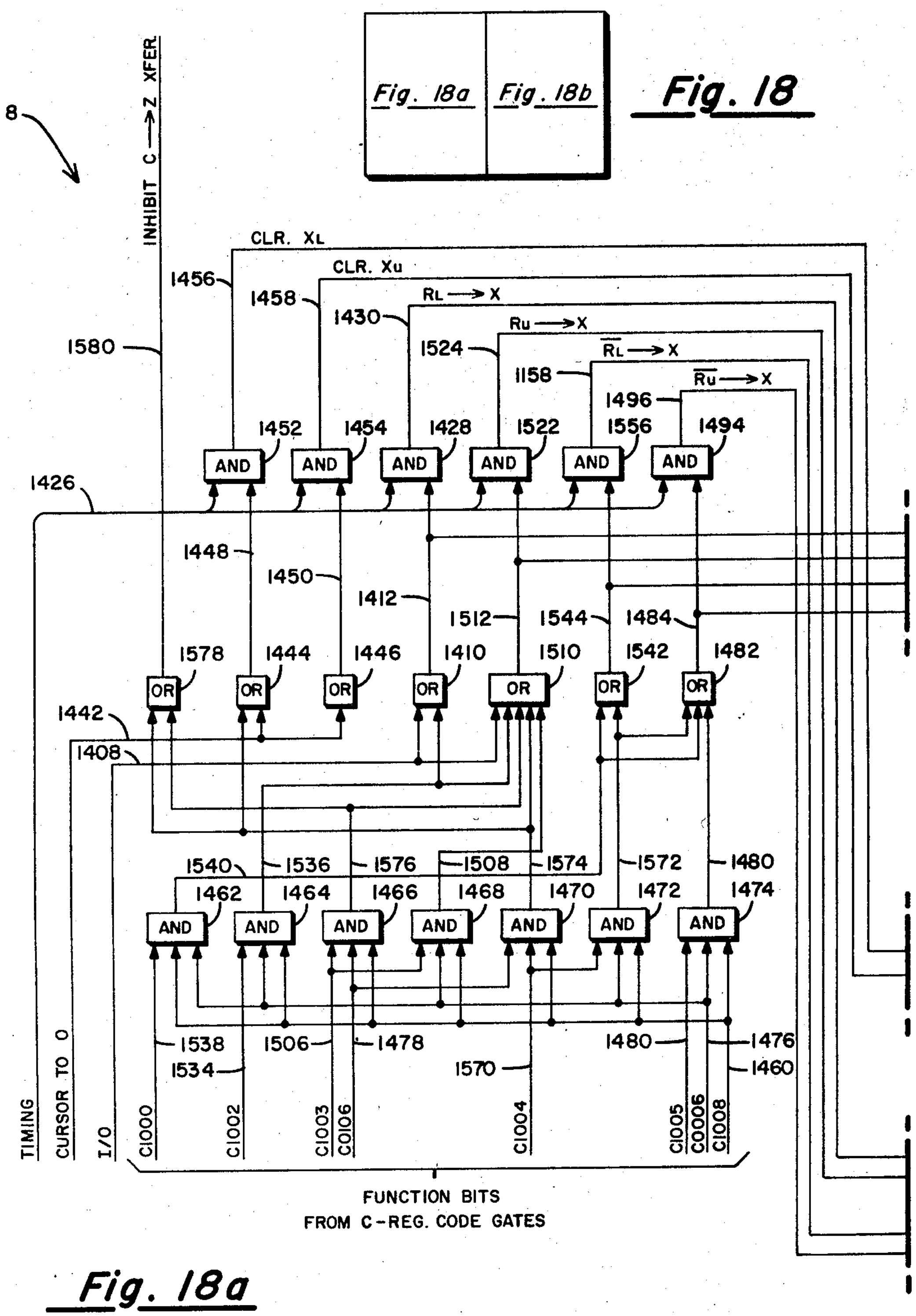
Figure 18B:
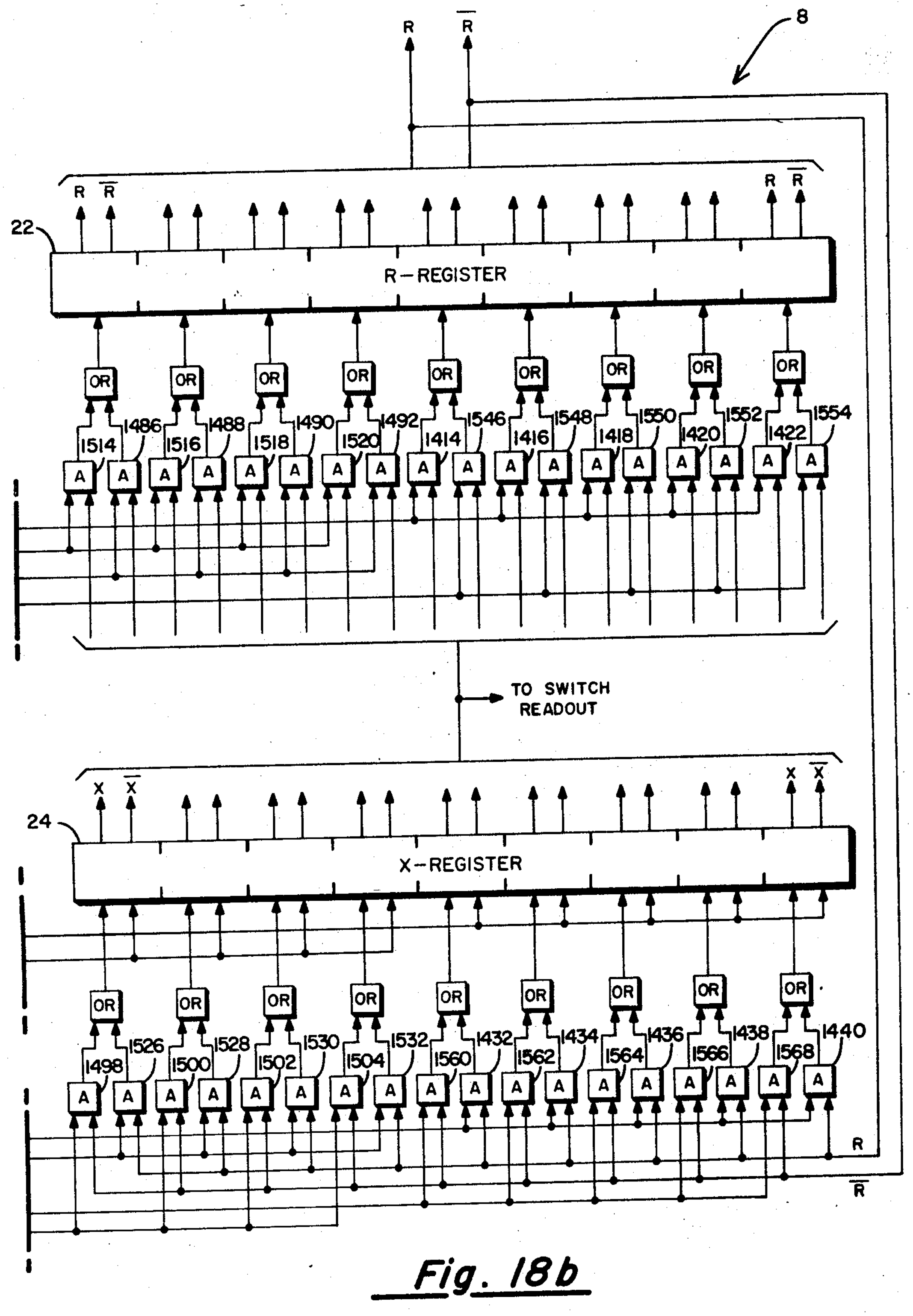
Figure 19A:
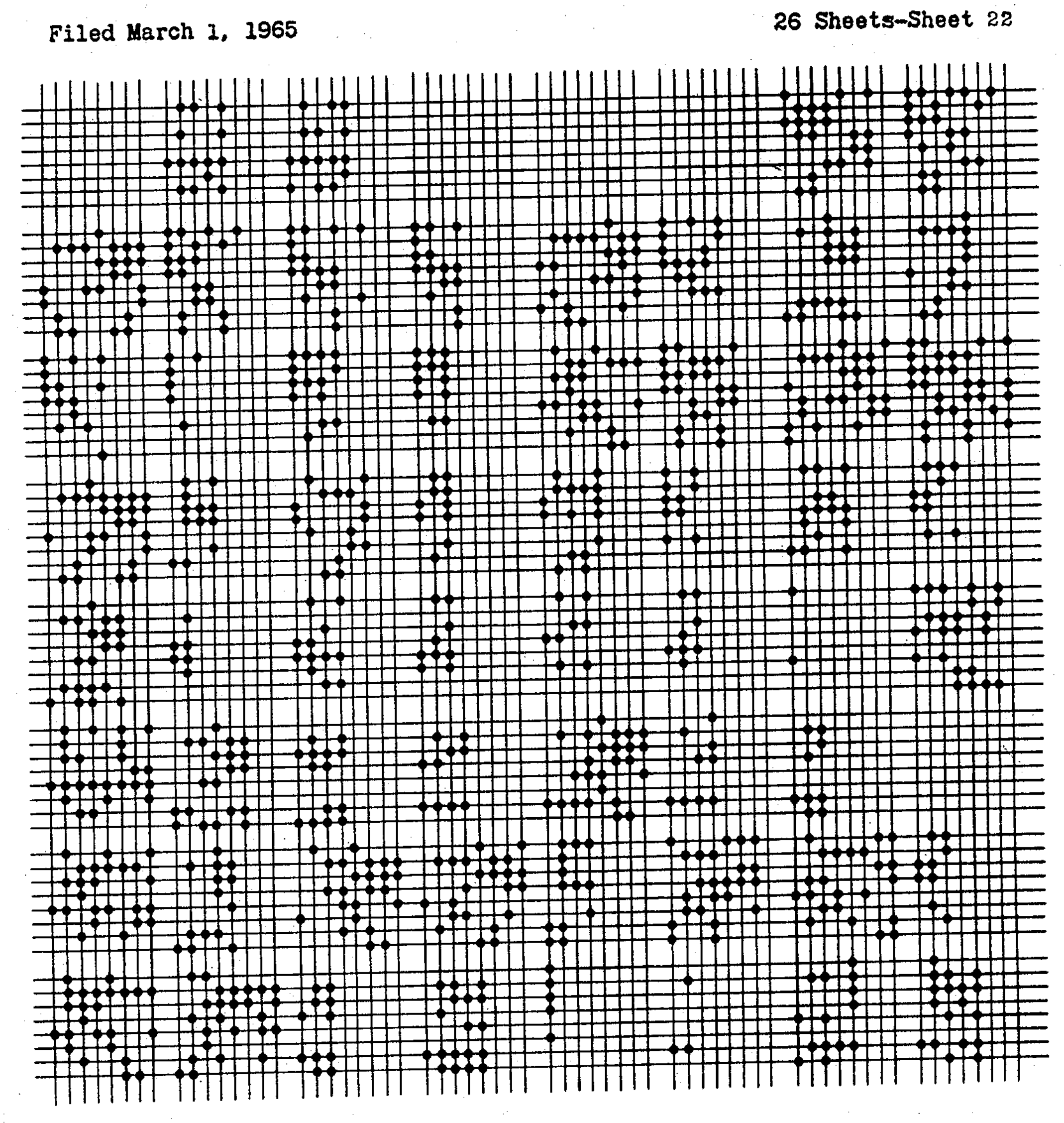
Figure 20:
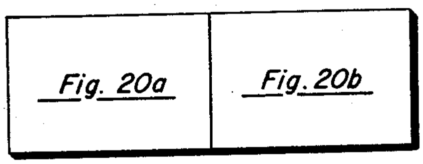
Figure 19B:
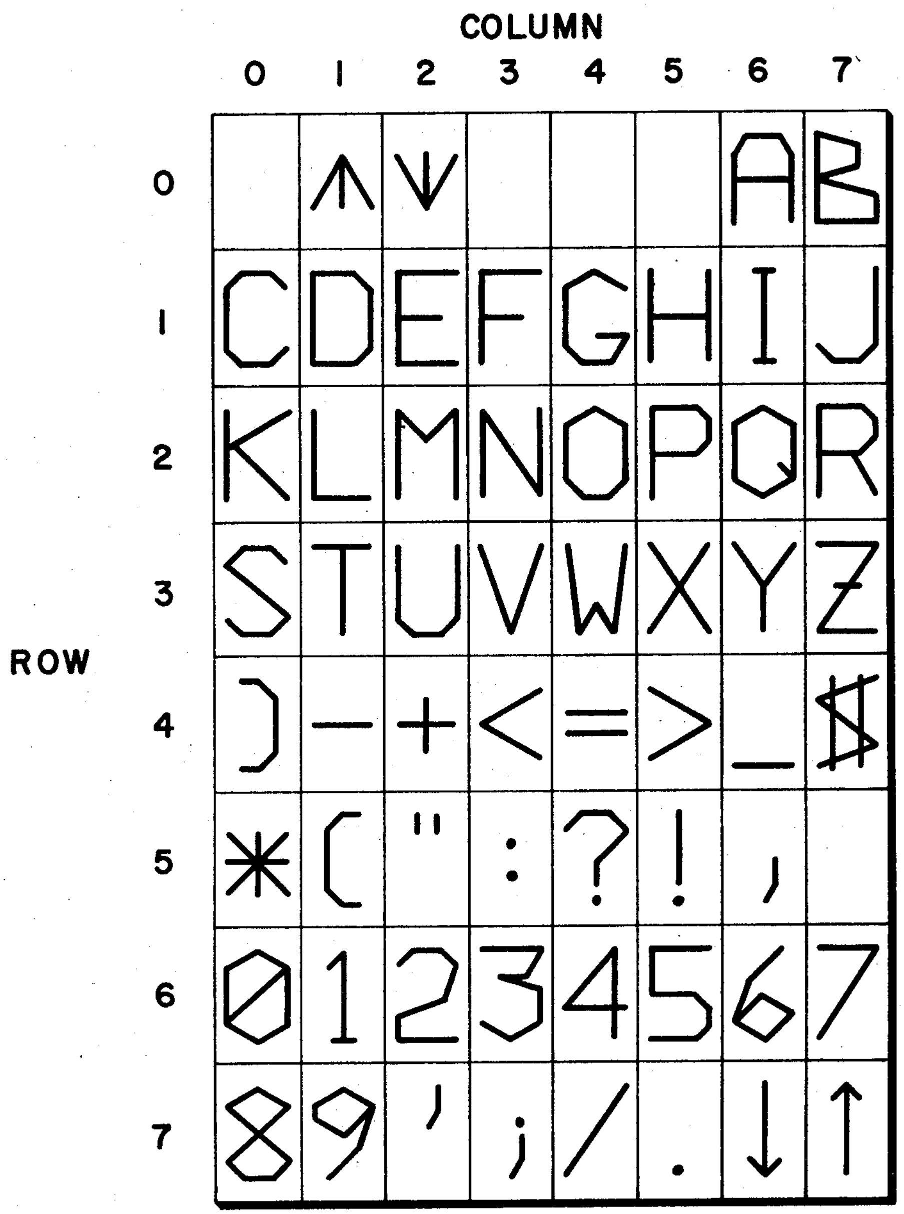
Figure 20A:
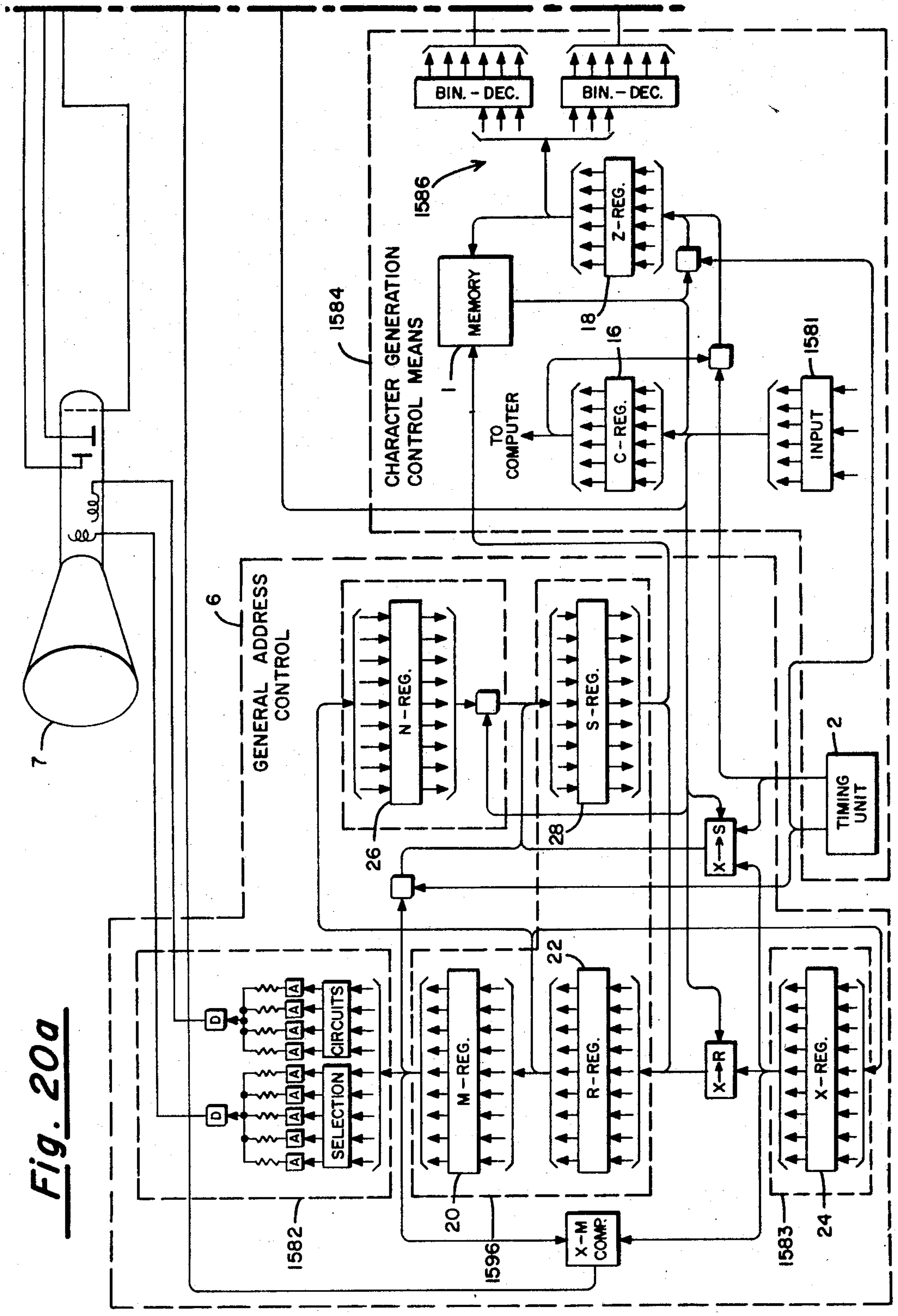
Figure 20B:
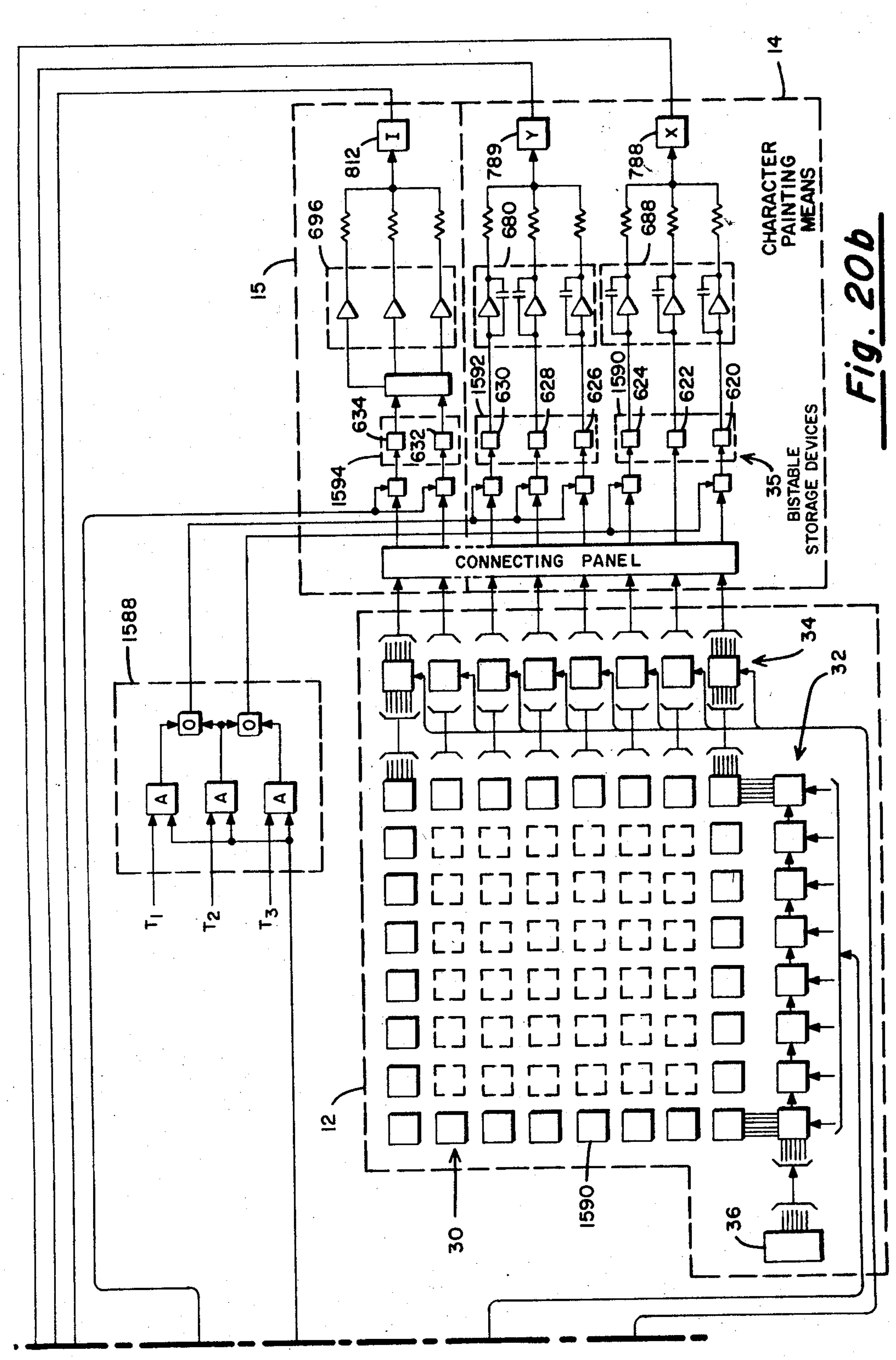
Figure 21:
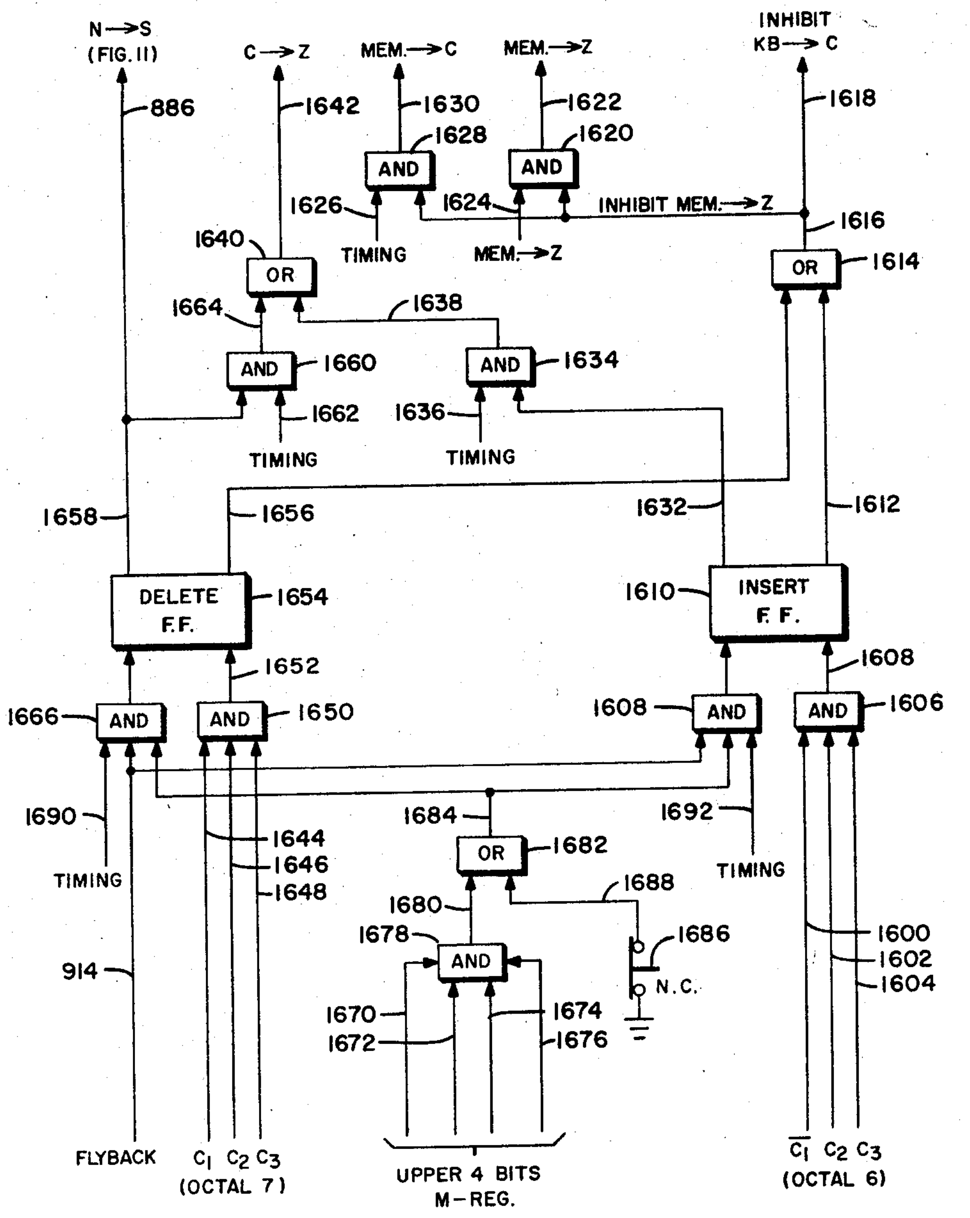

FIG. 3*a* is a block diagram of the portion of FIG. 3 which forms the Electromagnetic Control;

FIG. 3*b* is a block diagram of the portion of FIG. 3 which forms the Delete Function Address Control;

FIG. 3*c* is a block diagram of the portion of FIG. 3 which forms the Input/Output Address Control;

FIG. 3*d* is a block diagram of the portion of FIG. 3 which forms the Special Function Control;

FIG. 4 is a generalized block diagram of the Character Generator shown in FIG. 1;

FIG. 5 is a detailed diagram of the C-register which is a part of the Input/Output Unit shown in FIG. 2;

FIG. 6 is a detailed diagram of the Z-register which is a part of the Input/Output Unit shown in FIG. 2;

FIG. 7 shows the relationship of FIGS. 7*a* and 7*b* to each other;

FIGS. 7*a* and 7*b* show in detail the character generation matrix including the Character Synthesizing circuits, the row and column select circuits, the output circuit and Table I which shows the relationship of the output signals to the sequential scanning signals for a particular diode coding circuit;

FIG. 7*c* shows the character Q that is formed by the coordinates shown in Table I;

FIG. 7*d* shows the detailed diagram of the Phase Generator which produces the sequential scanning signals;

FIG. 8 is a detailed diagram of the Electrostatic Control Unit shown in FIG. 1 as well as the Intensity Control shown in FIG. 1;

FIG. 9 shows the character Q which can be synthesized by the signals produced by one of the character synthesizing circuits shown in FIG. 7 and the relationship of the character position to that of the cursor;

FIG. 10 is a detailed diagram of the *x*-coordinate and *y*-coordinate electrostatic deflection circuits and the intensity circuit shown in block form of FIG. 8;

FIG. 10*a* shows the waveforms obtained from the *x* and *y* electrostatic deflection circuits if no Miller integrators are used as well as the waveform obtained through the use of Miller integrators;

FIG. 11 shows in detail the circuitry in FIG. 3*a* that is necessary to increment the M-register in the normal manner as well as the circuitry necessary to control the M-register and the beam intensity during beam flyback;

FIG. 12 shows in detail the M-register as well as the associated driving circuits and the electro-magnetic deflection coils;

FIG. 13 shows the relationship of the circuits shown in FIGS. 13*a* and 13*b*;

FIGS. 13*a* and 13*b* show in detail the R-register with its various inputs as well as the circuitry necessary for incrementing by one count any data coupled into the R-register;

FIG. 14 is a detailed diagram of the S-register;

FIG. 15 is a detailed diagram of the N-register;

FIG. 16 shows in detail the cursor control X-register with its tabulation controls and outputs which provide indications to the operator that four more characters can be placed on a line and/or that the last line is being used;

FIG. 17 shows the X-register and the necessary circuitry for causing it to read out any external switches which may be connected to the display system;

FIG. 18 shows the relationship between FIGS. 18*a* and 18*b*;

FIGS. 18*a* and 18*b* show in detail the special function circuitry necessary to move the cursor about the cathode ray tube screen;

FIG. 19*a* shows an illustrative example of an 8 by 8 matrix array of character synthesizing matrices;

FIG. 19*b* shows the characters which can be synthesized by the matrices shown in corresponding positions in FIG. 19*a*;

FIGS. 20*a* and 20*b* show in block form the details of the entire display system;

FIG. 21 shows the INSERT and DELETE function circuitry.

EDITING FEATURE

In the computer input mode, the display system will accept a 6 bit character every 32 microseconds. Once the buffer is loaded, the operator scans the information as displayed on the CRT and edits it as required. To implement the editing requirement, a point of entry cursor has been incorporated. This cursor may be moved to any character position on the display for selective changing of data. The following cursor movement switches have been implemented:

(1) Single space forward.
(2) Single space backward.
(3) Line increment.
(4) Line decrement.
(5) Return to beginning of message.

Multiple space steps and multiple line jumps are also available. Thus, tabulation keys of 2, 4, 8 and 16 steps may be provided as well as line jumps in equivalent steps. Once the cursor has been positioned, the following actions may be taken.

(1) If the character position is blank, a character may be entered by the keyboard.

(2) If the character position already contains a character, it may be erased or changed simply by entering a keyboard character.

(3) If the character position already contains a character and the operator wishes to insert a character between it and the next character he need only press an insert button and enter the character to be inserted. All subsequent characters in that line or all subsequent lines, if desired, move one position to the right to allow space for the new character. This feature can be locked out when the buffer is full if so desired.

(4) If the character position already contains a character and the operator wishes to delete that character from the message, he depresses a delete button and the character will be erased and all subsequent characters in that line or in all subsequent lines as desired will move one space back to fill in the blank. Thus, insert and delete functions operate either on the line only or to the end of the message as the operator desires. When the message has been corrected or updated, it may be transmitted to the computer at a maximum rate of one character every 32 microseconds. Of course, this time may be faster with a larger memory.

The message may be completely composed by the keyboard, using the same editing capability and then be transmitted to the computer in a similar manner.

The input from the switch arrangement will also be displayed on the CRT and may be edited and transmitted to the computer in a similar manner.

A data keyboard is a 44 key typewriter keyboard with the selection capability of 63 characters. Data generation, correction, or addition as described above is accomplished from this section of the keyboard. Operation of the keyboard is similar to that of a normal typewriter keyboard. In addition to the character selection keys, the keyboard has keys for standard operations such as carriage return, back space, etc.

A group of control or function keys are in juxtaposition to the data keyboard. Included in this group are the following keys: keyboard, receive, transmit, insert, delete, step right, step left, advance line, and decrement line.

If the display system is to receive data from a computer, the general sequence of operator actions are as follows. The receive control key is selected and an output request is generated and transmitted to the computer. In response to the output request signal, the computer will supply the display system with the data requested and the data will be displayed on the CRT. At this point, the operator may desire to generate additional or correct existing data. This may be done by first selecting the keyboard control key. This will generate an interrupt which will give control of the display system to the data keyboard. Now the operator may, through the use of data keyboard and the cursor control, delete or change the data as it is displayed on the CRT. When the operator has completed this operation, he will select the transmit control key which will send an input request signal to the computer. When the computer returns an input acknowledge signal the new or revised data on the CRT will be transmitted to the computer.

GENERAL SYSTEM

FIG. 1 shows the general block diagram of the system, Since memory 1 may be any conventional type such as magnetic core or others well known in the art, it will not be discussed here. However it is used to store in a plurality of memory locations binary data representative of alphanumeric characters. Other elements in the system include Timing Unit 2 which produces 125 nanosecond pulses, ½ microsecond pulses, 2 microsecond pulses and 16 microsecond pulses. Input-Output unit 4 which receives inputs from the switch arrangements, the computer and the keyboard and also receives information from the memory and produces outputs to the computer (not shown), the Character Generator 12, Cursor Control 8, and the General Address Control 6 which positions the beam of the CRT in any one of its 512 positions and allows character insertion or deletion as well as special functions to be performed. The Cursor Control 8 prevents any character from being entered on the CRT face except at the point where the cursor is located. Switch Readout Control 10 governs the transmission of data from the switch arrangement to the Input-Output Unit 4. During the I/O cycle, when digital data representing a character is received by the I/O unit 4, it is transmitted to the memory from which, during the painting cycle, it is transmitted to the Character Generator 12 wherein a specific diode matrix representing that particular character is selected and digital output signals are produced which can be used to synthesize the selected character. The Electrostatic Control 14 receives the digital signals from the Character Generator 12 and utilizes them to paint a desired character on the face of the CRT. Intensity Control 15 also utilizes the digital signals from Character Generator 12 to vary the intensity of the CRT beam while the character is being painted. It is to be noted that the Electromagnetic Control 6 controls the magnetic deflection coils of the cathode ray tube while the Electrostatic Control 14 controls the electrostatic plates of the CRT. Both the magnetic deflection coils and the electrostatic deflection plates are operated in a push-pull arrangement.

TIMING UNIT

Figure 1B:
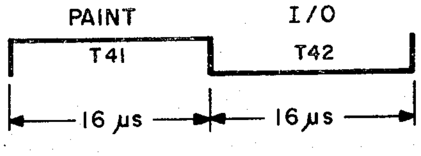
Figure 1A:
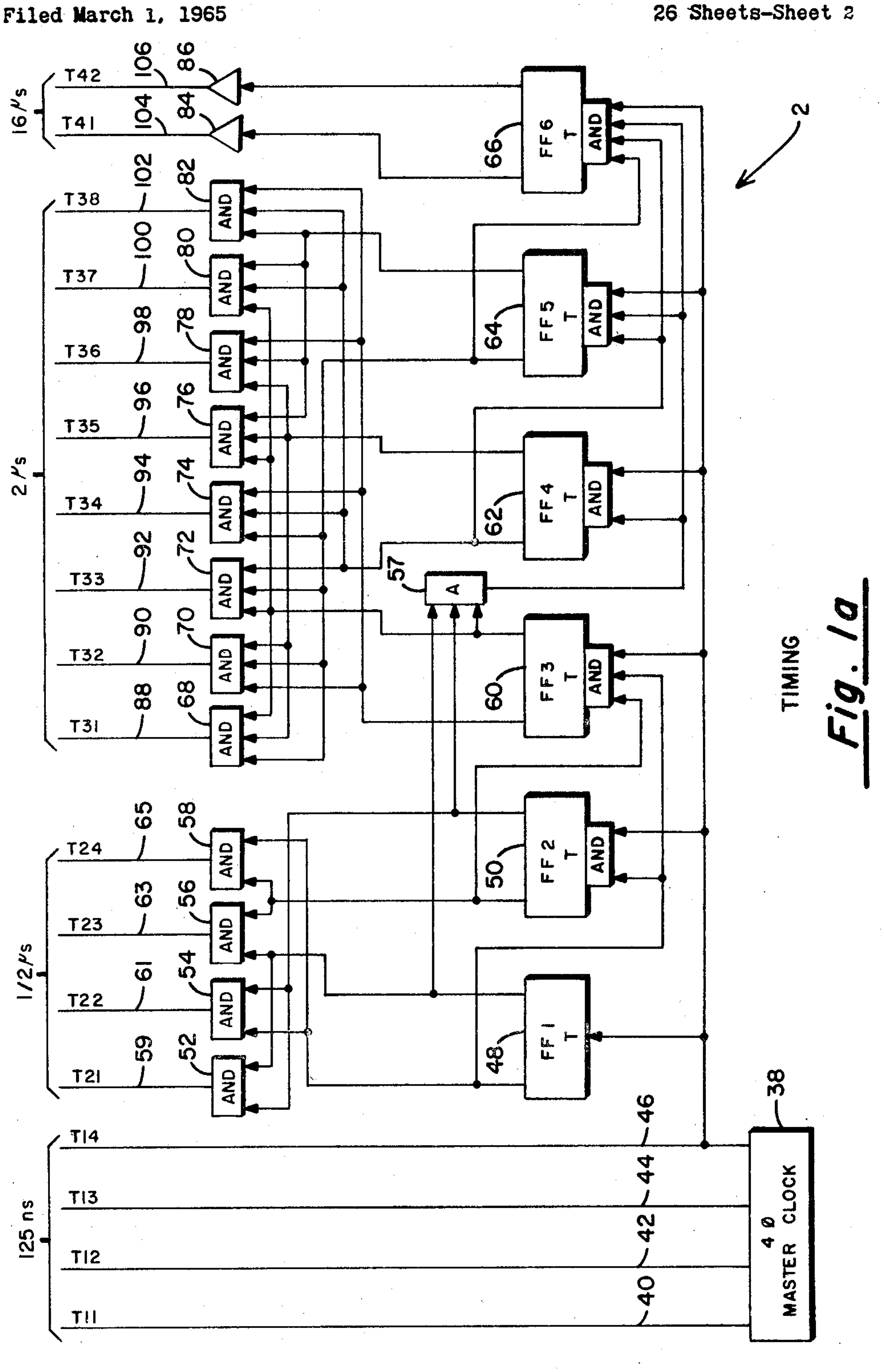

Timing Unit 2 is shown in FIG. 1*a* and includes Master Clock 38 and the counter stages 48, 50, 60, 62, 64 and 66 and associated AND gates 52, 54, 56, 58, and 68–82. The logical connection of flip-flops 48–66 is such that all flip -flops change state simultaneously thereby eliminating propagation delay from any previous stage when toggling from one state to the other. This permits operating the counter at the maximum possible speed. Master Clock 38 produces 125 nanosecond pulses sequentially on lines 40, 42, 44 and 46. Flip-flops 48 and 50 provide a possibility of four binary combinations which are used to produce output pulses on lines 59, 61, 63 and 65 from AND gates 52, 54, 56 and 58 respectively. Since flip-flop 48 is toggled every 500 nanoseconds by the pulse appearing on line 46, the four outputs from AND gates 52, 54, 56 and 58 are 500 nanoseconds or ½ microsecond duration. Thus, each of the four outputs on lines 59, 61, 63 and 65 occurs every two microseconds and lasts 500 nanoseconds.

Flip-flops 60, 62 and 64 provide a possible number of eight binary combinations. These combinations are used to drive AND gates 68 through 82 thus providing eight sequential outputs on lines 88–102. Since flip-flop 60 can be toggled only when flip-flops 48 and 50 are set, every two microseconds, each of the outputs on lines 88–102 is two microseconds in length and occurs once every 16 microseconds.

Flip-flop 66 produces outputs to amplifiers 84 and 86. Since flip-flop 66 can be toggled only when flip-flops 62 and 64 are set and AND gate 57 is producing a pulse every 16 microseconds, the outputs from amplifiers 84 and 86 on lines 104 and 106 respectively are 16 microseconds in length and each occurs once in an interval of 32 microseconds. Thus, it is clear that the Timing Unit is completely digitalized and includes only those on-off devices which operate in either the cut-off or saturated state.

FIG. 1*b* shows the operational cycles of the display system. It will be noted that during the first 16 microseconds which is designated as $T_{41}$, the characters can be painted on the CRT and thus the first half of the cycle is called the painting or tracing cycle. The second half of the cycle also lasts 16 microseconds and is designated $T_{42}$. During this last half cycle all input-output (I/O) operations take place. Thus, all operations which take place during the painting cycle can occur only when a pulse appears on line 104 in FIG. 1*a* and all input-output operations can take place only when a pulse appears on line 106 in FIG. 1*a*. It will therefore be seen that during both the painting cycle and the I/O cycle, Timing Unit 2 produces 128 pulses of 125 nanosecond duration, 32 pulses of ½ microsecond duration, and 8 pulses of 2 microsecond duration.

INPUT-OUTPUT UNIT

FIG. 2 shows the Input-Output Unit 4 in block diagram form. It will be seen that I/O unit 4 consists of C-register 16 and Z-register 18. I/O unit 4, its associated inputs and outputs and Memory 1 constitute a character generation control means since Memory 1 stores a plurality of character identifying signals which are converted into row and column selection signals by the Z-register and its associated gates. The row and column selection signals, of course, select circuits which generate signals to cause a particular character to be synthesized. Memory 1 stores the plurality of said character identifying signals in *n* lines of N signal positions per line. C-register 16 receives inputs from the keyboard, the computer and from the memory and produces outputs to the Cursor Control and the computer as well as to Z-register 18. Z-register 18 receives as inputs not only data from C-register 16 but also data from the memory and from the switch arrangement. It presents outputs to the memory and to the Character Generator. During the I/O cycle, information from either the computer or the keyboard is stored in the C-register from which it is transferred to Z-register 18 and from there to the memory. During the painting cycle, information stored in the memory is read out to the Z-register and from the Z-register to the Character Generator except during insert or delete operations. Both the C-register and the Z-register are used whenever a character is to be inserted or deleted from the information appearing on the CRT screen. Thus, the following steps occur when a character is to be inserted between two characters appearing on the CRT screen. The data representing the character to be inserted is transferred into the C-register 16 and from thence to Z-register 18 for all addresses following a compare signal between X and M registers until the end of the line or end of message depending on what the operator shall select, i.e., if the line is full, a line release button is depressed at the same time the insert button is depressed and all characters on each line after the point of insertion are shifted one place to the right. The data in the memory which represents the character on the CRT screen in the location where the new character is to be inserted is transferred from the memory to the C-register. The data in the Z-register representing the new character is then stored in the memory in the location from which the previous character was taken. The previous character which is now in the C-register is transferred to the Z-register and the next succeeding character in the memory is transferred from the memory to the C-register. The information in the Z-register is then transferred into the memory to the location from which the last data was transferred to the C-register. It will therefore be seen that as each character is taken from the memory it is shifted one address position and restored in the memory. Thus, when a character is inserted, each character after the point of insertion is shifted one position to the right. When this operation has been completed there is a blank space under the cursor which is ready to accept any character the operator may desire to select.

GENERAL ADDRESS CONTROL

FIG. 3 shows the complete control for all address registers. FIGS. 3*a, b, c* and *d* show a breakdown of the individual sections and are described below in detail.

BEAM POSITIONING CONTROL

FIG. 3*a* shows in block diagram form the Electro-Magnetic Beam Control. M-register 20 stores digital information which positions the electron beam both vertically and horizontally in any one of its 512 positions. The beam continually performs a scanning action which consists of scanning along the 32 positions in the first row, dropping to the second row and scanning through the next 32 positions, dropping to the third row, etc., continuing on through row 16 and the 32 positions therein and then returning to position 1 of line 1. The digital information in the M-register which represents the beam position is transferred to the S-register 28 as the address of the data existing in the memory at that location to be read out to the Z-register for "painting" during the painting cycle. The digital information in the S-register 28 is then transferred to the R-register 22. Any information coupled into the R-register is automatically incremented by 1. Thus the data in the S-register is incremented by 1 in the R-register and transferred back to the M-register to cause the beam to assume the next successive position. This cycle continues causing the beam to perform the scanning action described above.

DELETE FUNCTION ADDRESS CONTROL

FIG. 3*b* shows in block form the delete function address control and is used whenever a delete character function is to be performed. The Delete Function Control Means, or Delete Data Control Means, is coupled to the Character Generation Control Means, the Beam Positioning Control Means and the Timing Means for causing the destruction of any one of said character identifying signals in said memory at a location determined by said Beam Positioning Control Means during one of the tracing cycles produced by the Timing Means and causes successively positioned character identifying signals to be successively read out and stored during successive said tracing cycles, each of said successively read-out and stored signals being replaced in said memory at successive preceding locations beginning with the location of said destroyed signal during succeeding successive second cycles.

The data stored in the N-register is equal to that stored in the M-register minus 2. Thus the data in the N-register is always two counts behind that stored in the M-register. This is accomplished as follows. First the data in the M-register is transferred to the S-register. Two successive steps then occur. First, $\overline{S}$ or the inverted output from the stages of the S-register is coupled to the R-register where it is incremented by 1. $\overline{R}$ or the inverted output from the stages of the R-register is coupled to the N-register. Since the S-register contained the same data as the M-register, $\overline{S}+1=R=1110$. $\overline{R}=N=0001=S-1=M-1$. Thus, at this point the N-register contains the data in the M-register minus 1 or $N=M-1$. During the second step, the true output of S is transferred to R and incremented by 1 or $S=1001$ and $S+1=R=0101$ and R is transferred to M so the M-register contains 0101 which is two counts ahead of the N-register which contains 0001. Therefore, during a delete operation the data in the N-register is transferred to the S-register 28 as the address for the data in the C-register. Thus whenever a character is to be deleated the following operations take place. When a comparison is found between S and M registers the data in memory is transferred from memory to the C-register during the "painting" half of the cycle and then during the "I/O" half of the cycle the data in the C-register is transferred to Z-register and stored at the address specified in the N-register. Thus it can be seen that when the address specified in the M-register is transferred to the S-register that $(S-1)$ to N and $(S+1)$ to M will give the preceding address of the data for that address and the next address to be used. Therefore, when data read from memory at the address in the S-register during the "painting" cycle is replaced at the address specified in N-register during the "I/O" cycle, all data will be moved one space to the left and the unwanted character under the cursor will be replaced by the character to the right of the cursor. This operation continues automatically until at end-of-line and/or end-of-message signal is received as determined by the operator.

Thus, it will be seen that during the operation of either a delete function or an insert function, the memory-to-Z signal must be inhibited and the memory-to-C signal enabled. Further, no information from the keyboard should be able to be entered into the C-register 16. Therefore, a signal to inhibit a keyboard-to-C transfer must be produced. Also, since the data in the memory is to be transferred to the C-register 16 and from there to the Z-register 18, a C-to-Z transfer signal must be produced. Finally, during a delete function, an N-to-S transfer must occur to enable the data read out from one location in the memory to be restored in a preceding location in the memory. Therefore, an N-to-S transfer signal must be produced. The circuit for producing the above signals is shown in FIG. 21.

When an insert function is to be performed and the operator depresses the INSERT key, an octal 6, 011, is produced and stored in the first three stages of the C-register 16. These three signals are present on lines 1600, 1602 and 1604 in FIG. 21 and cause AND gate 1606 to produce a signal on line 1608 which sets INSERT F/F 1610. The signal produced on line 1612 is coupled to OR gate 1614 which produces a signal on line 1616. This signal becomes an INHIBIT KEYBOARD-to-C signal on line 1618. Further, AND gate 1620 normally produces a MEM-to-Z signal on line 1622 when a signal is present on line 1624. However, the output of OR gate 1614 on line 1616 becomes an INHIBIT MEM-to-Z signal preventing an output from AND gate 1620 on line 1622. Further, with the proper timing signal on line 1626, AND gate 1628 will produce a MEM-to-C signal on line 1630 when it also has as an input the signal from OR gate 1614. Also, INSERT F/F 1610 produces a signal on line 1632 which is coupled to AND gate 1634 where, in conjunction with the proper timing signal on line 1636, a signal is produced on line 1638 which passes through OR gate 1640 causing a C-to-Z transfer signal to be present on line 1642.

When a delete function is to be performed and the operator depresses the DELETE key, an octal 7, 111, is produced and stored in the first three stages of the C-register 16. These three signals are present on lines 1644, 1646 and 1648 in FIG. 21 and cause AND gate 1650 to produce a signal on line 1652 which sets DELETE F/F 1654. The signal produced on line 1656 is coupled to OR gate 1614 which provides an INHIBIT KB-to-C signal, an INHIBIT MEM-to-Z signal and provides a MEM-to-C signal as described above. DELETE F/F 1654 also produces a signal on line 1658 which is an N-to-S transfer signal on line 886 (shown also in FIG. 11). Further, the signal on line 1658 is coupled to AND gate 1660 which, when the proper timing signal is present on line 1662, produces a signal on line 1664 which is coupled to OR gate 1640. The output to OR gate 1640 is a C-to-Z transfer signal on line 1642.

When an INSERT or DELETE function is initiated, the operation continues automatically until either the end of the line is reached or until the end of the message is reached. This is determined by the operator and the circuitry shown in FIG. 21 shows how this operation is performed. Whenever the INSERT F/F 1610 or the DELETE F/F 1654 is set, the operation will continue automatically until the set F/F is cleared by either AND gate 1666 or AND gate 1668. AND gate 912 in FIG. 11 produces a signal on line 914 whenever all of the lower five stages of the M-register 20 are cleared (indicating that a line has been completed and a new line is to begin). This signal is present on line 914 shown in FIG. 21 and is coupled to both AND gates 1666 and 1668. Further, switch 1686 is normally closed which coupled a ground signal to OR gate 1682. The output of OR gate 1682 on line 1684 is also coupled to AND gates 1666 and 1668. Thus, AND gate 1666 will CLEAR DELETE F/F 1654 whenever a signal is present on line 914 showing that the lower five stages of the M-register 20 are cleared, the proper timing signal is present on line 1690 and the signal from OR gate 1682 indicates that switch 1686 is closed. This means that the DELETE or INSERT function will affect only one line. If it is desired that the function should continue to include the entire message and not limit it to one line, the operator depresses switch 1686 and removes the ground potential from OR gate 1682. Then, when the end of the message is reached, the upper four stages of the M-register 20 will clear and produce signals on lines 1670, 1672, 1674 and 1676 which will cause AND gate 1678 to produce a signal on line 1680. This signal is coupled to OR gate 1682 which produces an output on line 1684. Thus, AND gates 1666 and 1668 will not produce outputs to CLEAR and INSERT and DELETE F/F's until both the end of the line and the end of the message has been reached.

I/O ADDRESS CONTROL

FIG. 3*c* shows in block form the I/O address control and is used during all input or output operations.

The I/O Address Control is actually a data storage control means and is coupled to said Character Generation Control said Beam Positioning Control Means and said Timing Means for enabling said character identifying signals to be stored in any one of said positions in said Memory during the I/O timing cycle.

During I/O operations it is necessary to transfer the contents of the X-register 24 to the S-register 28. The data in the X-register is transferred to the S-register and the input data is stored in the memory at that location. The data in the S-register is then transferred to the R-register where it is incremented by 1 and returned to the X-register. The cycle is repeated until all input data is stored in memory.

As stated previously, the X-register contains in digital form the location on the CRT screen at which the cursor is to be painted. Circuit 25 continually compares the digital data in the X-register 24 with the digital data in M-register 20. When the data in the two registers compare, a signal is produced which enables the paint-cursor AND circuits (shown in FIG. 8) and the cursor is "painted" on the screen of the CRT at the appropriate location. Thus, whenever it is desired to move the cursor from one position to another, it is necessary to either increment or decrement the contents of the upper and/or lower stages of the X-register. The X-register can be incremented in one of two ways. Whenever the memory has data inserted in it from either the keyboard, the computer or the switch arrangement, the X-register is automatically incremented and the cursor moves to the next position as shown in FIG. 3*c*. FIG. 3*d* shows in block form the special function control which is used whenever it is desired to move the cursor without changing the data stored in memory.

Thus, apparatus is provided which controls the location on the cathode ray tube screen at which a desired character is to be traced, said apparatus including the X-register which utilizes digital data signals generated by special keyboard keys or other inputs for selecting a desired one of said locations on said viewing screen for tracing said character, comparing means coupled to the output of the X-register and the output of the M-register or Beam Positioning Register and paint-cursor flip-flops coupled to said comparing means and the cathode ray tube beam intensity control means for unblanking said beam intensity when said data in said X-register compares with the data in said M-register.

When it is desired to cause the cursor to step without changing the data in the memory, the proper control key, i.e., step right or step left, increment line or decrement line, is depressed which produces a function bit signal that is coupled to proper AND gates which increment or decrement the proper stages of the X-register 24 depending upon the control key depressed. In this case there is no change in the data stored in the memory because the function bit inhibits the transfer of the data in the C-register to the Z-register shown in FIG. 2. However, because the X-register contents have been incremented or decremented the cursor will move either forward or backward respectively. Similarly, other control keys, i.e., increment line, decrement line, may cause the cursor to move up one line or down one line. When the back space key is depressed, the same operation as shift left is performed. The X-register will be decremented and the cursor will move back one position from any position in which it may be located. In order to decrement the X-register, $\overline{X}$, or the inverted outputs from the stages of the X-register are transferred to the R-register and incremented by one. $\overline{R}$, or the inverted output of R is then transferred back to the appropriate stages of the X-register which in effect leaves the X-register decremented by one. The cursor then is moved back one space.

Thus, it will be seen that during the painting cycle, the data stored in the M-register indicates the beam position on the face of the CRT. This data is transferred to the S-register where it causes data in the memory at a corresponding location to be read out and initiate operations for painting the desired character on the face of the CRT. The data in the S-register is then transferred to the R-register where it is incremented by one count and returned to the M-register. During each 16 microsecond painting cycle, the above operation takes place.

During the 16 microsecond cycle following each painting cycle, data input to the device from the keyboard, the computer or the external switch arrangement is stored in the memory at the location determined by the address in the X-register. The data input also produces a signal which causes the data stored in the S-register to be transferred to the R-register where it is incremented by one count and returned to the X-register. The incremented data in the X-register causes the cursor to step to the right one position to enable the next input character to be "entered" there during the next I/O cycle.

CHARACTER GENERATOR

FIG. 4 discloses in block diagram form Character Generator 12. Diode matrix 30 of character generator 12 is composed of a matrix array of individual character synthesizing circuits electrically arranged in a plurality of rows and columns, each of said circuits being capable of producing output signals respectively indicative of a particular character. Further, each of the character synthesizing circuits have a plurality of input lines and a plurality of output lines with diode means coupling respective ones of said input lines to respective ones of said output lines. Also, the input lines of each character synthesizing circuit in any one column are coupled to corresponding input lines of all other of said circuits in said column. In a like manner, the output lines of each character synthesizing circuit in any one row are coupled to corresponding output lines of all other of said circuits in said row. One of the character synthesizing circuits is selected and its output activated by the A-select circuit and the B-select circuit, each of which includes a plurality of control circuits equal in number to said rows and said columns of said character synthesizing circuits. Each of the control circuits in the A-select circuit is coupled to all character synthesizing circuit input lines in a respective corresponding column while each of the control circuits in the B-select circuit is coupled to all character synthesizing circuit output lines in a respective corresponding row. A phase generator then produces a group of sequential scanning signals equal in number to the number of input lines of one of said character synthesizing circuits and these signals are coupled in parallel to each of the first control circuits in the A-select circuit. Enabling signals are coupled to the control circuits in both the A-select and B-select circuits to cause the control circuits to selectively enable any one of the character synthesizing circuits to produce said output signals respectively indicative of a particular character. Thus, whenever the S-register in the Electromagnetic control 6 enables data in a particular location in the memory to be read out to the Z-register in the Input-Output Unit 4, the lower three bits in the Z-register are fed to the A-select circuit 32 in the Character Generator 12 while the upper three bits are transferred to the B-select circuit 34 in the Character Generator circuit 12. One of the control circuits in both the A-select circuit 32 and B-select circuit 34 then select a character synthesizing matrix at the junction of the selected column and the selected row. Phase generator 36 then produces successively a series of scanning pulses which sequentially energize each input line of the selected matrix thus producing from output circuit 35 on line 31 a group of data pulses which are stored in a register in the Electro-static Control Unit 14 shown in FIG. 1. The data in this register then positions the electro-static beam in the X and Y directions as well as controlling the intensity of the beam.

DETAILED DESCRIPTION

I/O unit.—C-register

FIG. 5 shows C-register 16 which is part of I/O unit 4. Included in C-register 16 are six data flip-flops 108, a function flip-flop 110 and a sprocket flip-flop 112. The data flip-flop 108 stores the information received from either the computer, the typewriter keyboards or the display memory. Since the input circuits to each of data flip-flops 108 operate in a similar manner, only the input circuits to flip-flop $C_0$ will be discussed in detail. If the computer is transmiting a signal on line 114 to the display system and if a computer-to-C transfer signal appears on line 120 AND gate 128 produces an output signal which passes through OR gate 130 setting flip-flop $C_0$. Likewise if a signal from the typewriter keyboard appears on line 116 and simultaneously a keyboard-to-C transfer signal appears on line 122, AND gate 132 produces an output signal which passes through OR gate 130 setting flip-flop $C_0$. Similarly if a signal appears on line 118 from the display memory and simultaneously a memory-to-C signal appears on line 124, AND gate 134 produces an output which passes through OR gate 130 setting flip-flop $C_0$. Thus it may be seen that a signal from either the computer, a typewriter keyboard, or a display memory may be transferred into the data flip-flops 108 depending upon the appropriate transfer signal that is present on lines 120, 122 or 124.

As stated previously the C-register has outputs to the computer, the Z-register and the cursor control circuit. Lines 136 and 136*a* coupled the output of flip-flop $C_0$ to the Z-register. The signal on line 136 is also coupled to AND gate 138 which produces a signal to be coupled to the computer whenever a C-register-to-computer transfer signal appears on line 126. Circuits 117, 119, 121, 123 and 125 each of which represents a flip-flop of the C-register contain identical circuitry to that shown in dashed block 115. Whenever a typewriter key is depressed not only is a particular code which represents that character coupled to the individual stages 115, 117, 119, 121, 123 and 125 via lines 114, 114*a*, 114*b* 114*c*, 114*d* and 114*e* respectively but also a signal is produced on line 142 which when ANDed with the keyboard-to-C register signal on line 122 causes an output from AND gate 144 which sets flip-flop 112 thus producing an output termed a sprocket signal on line 146. This signal passes through OR gate 155 to become an I/O active signal on line 157. An Input Acknowledge (I/A) on line 159 or an Output Acknowledge (O/A) on line 161 also produces an I/O signal on line 157. Whenever a function key is depressed, i.e. insert, delete, step right, step left, advance line, or decrement line, a signal is coupled to flip-flop 110 via line 148 which when ANDed with the keyboard-to-C register signal on line 122 causes AND gate 150 to produce a signal which sets flip-flop 110 and produces a function signal on line 152 and line 154.

Whenever the function signals appear on lines 152 and 154 the data stored in the flip-flops of the C-register cannot be transferred to the Z-register and thus entered in the memory. The purpose for this is to allow the cursor to be moved or an insert or delete function to be performed without destroying data appearing on the face of the CRT. Each function key depressed couples a particular code signal to stages 115, 117, 119, 121, 123 and 125 of the C-register as well as a function signal on lines 152 and 154 from flip-flop 110.

This particular code will always cause stages 115, 117 and 119, the first three stages of the C-register, to assume various states while it will always cause stages 121, 123 and 125, the last three stages of the C-register, to be set thus producing outputs on lines 172, 174 and 176 respectively which are coupled to AND gate 170 to produce an enable signal to the Cursor Control. It is clear, of course, that if more functions are desired, more than the first three flip-flops may be used to give more combinations. Thus, by using stages 115, 117, 119 and 121, 24 or 16 combinations could be used to control 16 functions. The outputs from the first three stages 115, 117 and 119, can produce eight different binary combinations and stages 115, 117 and 119 have their outputs coupled to AND gates 156, 158, 160, 162, 164 and 168 such that six of these combinations produce outputs. Thus if the first three stages are not set or each have stored a 0, AND gate 156 will produce an output on line 178 to the Cursor Control. Similarly AND gate 158 will produce an output to the Cursor Control on line 180 if a binary 1 is stored in stages 115 and a binary 0 in stages 117 and 119. AND gate 160 will produce an output on line 182 if an octal 2 is stored. AND gate 162 will produce an output line 184 if an octal 3 is stored. AND gate 164 will produce an output on line 186 if the octal 4 is stored. AND gate 168 will produce an output on line 188 if an octal 5 is stored. Thus the outputs on lines 178, 180, 182, 184, 186, 188 and 190 are utilized by the Cursor Control circuitry to move the cursor without destroying data already appearing on the display.

OR gate 143 produces an output on line 145 which is coupled to the CLEAR side of the flip-flop in each stage 115, 117, 119, 121, 123 and 125 of the C-register as well as flip-flops 110 and 112. OR gate 143 will produce a CLEAR signal on line 145 whenever it has as an input either a TRANSMIT signal on line 147, a KEYBOARD signal on line 149, an INPUT signal on line 151 or an INSERT or DELETE signal on line 153.

Z-REGISTER

FIG. 6 shows Z-register 18 which is located in Input/Output Unit 4. Z-register 18 includes six flip-flop stages 192, 194, 196, 198, 200 and 202. Since the stages are identical, only stage 192 is shown in detail in order to simplify the drawings and the discussion. As mentioned earlier, the inputs to the Z-register are from the C-register, the display memory, and the special switch arrangement. The signals from stages $C_0$–$C_5$ of the C-register and coupled to stages 192–202 of the Z-register respectively via lines 204*a*–204*f* respectively. Thus whenever a signal appears on lines 204*a*–204*f* and an enable signal appears on line 206, the transfer C-to-Z signal, AND gate 208 produces an output which passes through OR gate 210 thus setting stage 212, $Z_0$. Since, if a function key is depressed, a function bit is produced which prevents a C-to-Z transfer of data, the enable signal on line 206 must pass through AND gate 207. If an inhibit C-to-Z signal is coupled to AND gate 207 via line 209, AND gate 207 cannot produce an output and, therefore, cannot enable a C-to-Z transfer of data. If a signal from the display memory appears on line 214*a* and a transfer memory-to-Z signal appears on line 216 simultaneously, AND gate 218 produces an output which passes through OR gate 210 thus setting stage 212, $Z_0$. Also if a signal from the external switch arrangement appears on line 220*a* and simultaneously a transfer switch-to-Z signal appears on line 222, AND gate 224 produces an output which passes through OR gate 210 setting stage 212, $Z_0$. Thus it is seen that either the output from the C-register, the output from the memory, or the output from the switch arrangement will be stored in the stages or the Z-register.

The output of the memory, as stated previously, is coupled either to the display memory or the character generation network.

It will be recalled that the character generation network consists of a matrix array of character synthesizing diode matrices in rows and columns, each diode matrix of which represents a particular character. As used herein for explanatory purposes only and not intended to be limiting, the matrix is composed of an array of eight rows and eight columns of said diode matrices. However, the matrix array could be of any size and an 8 by 8 array is merely used here for explanatory purposes only. Thus to select a particular 1 of the 64 diode matrices in the 8 by 8 matrix array it is necessary to select a particular column and a particular row and the diode matrix at the intersection thereof is selected.

The first three stages of the Z-register, 192, 194 and 196, are used in conjunction with AND gates 254–268 to produce a total of eight combinations representing the columns of the character generation matrix while the upper three stages of the Z-register, 198, 200 and 202, produce eight combinations which are used in conjunction with AND gates 270–284 to select the proper row of the character generation matrix. Thus it can be seen that the manner in which the lower three stages, 192, 194 and 196, of the Z-register as well as the upper three stages, 198, 200 and 202, are connected to AND gates 254–268 and 270–284 respectively provide a means for converting said binary coded data to signals representing decimal quantities 0–7. Therefore, any one of rows 0–7 and any one of columns 0–8 may be selected simultaneously. AND gates such as 208, 218 and 224 couple the binary data from the memory to the converting means only during the tracing cycle produced by the timing unit. This is true since the C-to-Z, memory-to-Z and switch-to-Z transfer signals can only occur during the character tracing cycle.

Also the outputs from the stages 192–202 of the Z-register are coupled to the display memory through AND gates 238–248 respectively if an enable-Z-to-memory signal appears on line 250.

Thus, it may be seen that the output of the Z-register is used not only to select the desired character in the character generation matrix but also may be coupled to the display memory upon application of the desired transfer signal to AND gates 238–248. All stages of the Z-register are cleared simultaneously when a pulse appears on line 252.

As stated previously the lower three stages 192, 194 and 196, of the Z-register, provide a possibility of eight different combinations of outputs which are used to select one of eight columns of the diode matrices in the character generation network. This is accomplished through the use of AND gates 254–268 which are shown in FIG. 6 to be connected to the lower three stages 192, 194 and 196, of the Z-register. Thus, when stages 192, 194 and 196 are producing "0's" on lines 226, 228 and 230 respectively, AND gate 254 produces an output on line 286 which is coupled to the A-select circuit of the character generating matrix. Further if only stage 192 is set and producing a "1" on line 226, AND gate 256 is energized thus producing a signal on line 288 which is coupled to the A-select circuit in the character generating matrix to select the next column. The remaining AND gates operate in a similar manner until AND gate 268 produces an output on line 290 indicating that all of the stages 192, 194 and 196 are set and producing a "1" on lines 226, 228 and 230 respectively.

The upper three stages 198, 200 and 202 of the Z-register operate in a similar manner to control the selection of the row in the character generating matrix. Thus, the output from AND gates 270–284 are fed to the B-select network in the character generating matrix to select the row determined by the information stored in the upper three stages of the Z-register.

CHARACTER GENERATOR

Character Generating Matrix

The signals produced by AND gates 254–268 of the Z-register are set to the A-select circuit 32 of the Character Generating Matrix 12 while the signals from AND gates 270–284 are set to the B-select circuit 34 of Character Generating Matrix 12. The Character Generating Matrix 12 is shown in FIGS. 7*a* and 7*b* and consists of diode matrix array 30, A-select circuit 32, B-select circuit 34, and the output circuit 35. Only four diode coding circuits 292, 294, 296 and 298 are shown as forming the diode matrix array 30 in FIG. 7. However, this is done for ease of illustration and is not intended to be limiting since the diode matrix 30 may be expanded to an eight-by-eight array of rows and columns or larger as necessary. An 8 by 8 array, for instance, would enable 64 characters to be synthesized. Each of the diode coding circuits 292, 294, 296 and 298 consists of eight lines from the A-select circuit 32, which may be termed input lines, intersected at right angles by eight lines from B-select circuit 34, which may be termed output lines, with various ones of the eight input lines from the A-select circuit connected by diodes to particular ones of the eight output lines from the B-select circuit. As stated previously, each of said input lines of each character synthesizing circuit in any one column is coupled to a corresponding one of said input lines of all other of said circuits in said column. Also, each of said output lines of each character synthesizing circuit in any one row is also coupled to a corresponding one of said output lines of all other said circuits in said row. When a particular column of character synthesizing matrices in the diode matrix 30 is selected by A-select circuit 32 and a particular row of said matrices has been selected by the B-select circuit, the eight input lines from the A-select circuit to the selected column are sequentially energized and a signal appeaing on each of these lines may pass through those diodes connected between that line and the lines from the row of matrices selected by the B-select circuit. Thus, the diodes provide a first means coupling predetermined ones of said input lines to predetermined ones of a first group of said output lines to produce digital signals for varying the intensity of individual line segments, a second means coupling predetermined ones of said input lines to predetermined ones of a second group of said output lines to produce digital signals representing the *x*-coordinates of each end of individual line segments and third means coupling predetermined ones of said input lines to predetermined ones of a third group of said output lines to produce digital signals representing the *y*-coordinates of each end of individual line segments. Each of the diode coding circuits 292, 294, 296 and 298 has the three purposes of representing in binary form the position of the cathode ray tube beam along the X axis, the position of the beam along the Y axis and the intensity of the beam as it sweeps between any two positions. Thus, as indicated in diode decoding circuit 292, the lower three lines 300, 302 and 304 from the $B_1$ select circuit indicate in binary form the X coordinate of the CRT beam giving a possibility of eight increments or positions. As will be seen later, however, only five of these positions are used. Also lines 306, 308 and 310 represent in binary form the Y coordinate of the CRT beam and also give a possibility of eight different Y coordinates. As will be seen later only seven of these coordinates are used. Also, lines 312 and 314 represent the intensity of the beam during the interval of time the beam is sweeping from one position to the next as determined by the successive generation of signals along the eight lines from the A-select circuit. Thus, if no diodes are present the beam is blank and will not be seen on the face of the CRT. If one diode connects line 312 to one of the lines from the A-select circuit one unit of intensity is indicated. If a diode connects line 314 with any one of the lines from the A-select circuit two units of intensity are indicated. If diodes connect both lines 312 and 314 simultaneously to one of the lines from the A-select circuit, three units of intensity are indicated. As will be seen later, each character is generated by not more than eight strokes or movements of the CRT beam. Although characters that are adequately unique and legible using only eight strokes it is not intended as a limiting factor in the character generation system. More strokes could be used if more aesthetic beauty were desired in the shape of the character. Also if desired curved lines could be used rather than straight strokes as will be explained in more detail hereinafter. This is the reason that the eight lines from the A-select circuit 32 are sequentially scanned. During each scan one stroke of the character to be generated is painted on the CRT screen. Since in forming a particular character some strokes are much shorter than others and since each stroke must be made in the same interval of time, some of the strokes would be brighter than others unless the intensity of the beam is controlled. The strokes are all made in the same interval of time due to the controlled rise time of the electrostatic amplifiers as will be explained later. Therefore, if a short stroke is to be made, only one diode will be connected between the line from the A-select circuit and line 312. If a very long stroke is to be made, two diodes will be connected to the appropriate line from the A-select circuit 32, one connecting from line 314, the other from line 312. If a medium stroke is to be made, the diode is connected from line 314 to the particular line from the A-select circuit. It is therefore obvious that through sequentially scanning the input lines of any one character synthesizing matrix, means are provided for generating *n* sequential groups of digital signals representing the *x*, *y* coordinates of said *n* connected segments forming said character and means are provided by the diodes coupled to each said generating means for producing digital signals for individually controlling the intensity of each of the *n* segments forming said character. Thus it can be seen that for each stroke of a particular character, a binary code represents the intensity of the beam during the generation of that stroke. This is very advantageous since each stroke of each character has its individual intensity controlled or varied to give uniform intensity over the entire character. Further, the length of the individual strokes forming a character may be of varying length and yet the character will have uniform overall intensity. In the prior art, characters had to be designed with the strokes forming them all being of an equal length. See for instance Losking, 3,104,387.

Each control circuit of said first and second plurality of control circuits contained in the A-select and B-select circuits respectively comprises a plurality of groups of transistors, each group of which is contained in a respective control circuits contained in the A-select and B-select circuits respectively comprises a plurality of groups of transistors, each group of which is contained in a respective control circuit and each group containing a number equal in number to the number of input and output lines in each said corresponding column and row. Each of the transistors has a base element, a collector element and an emitter element The collector of each transistor in said first control circuit is coupled to a corresponding one of said input lines in its corresponding column while the base element of each transistor in any one of said first and second control circuits are coupled to a common junction thereby forming groups of as many first and second common junctions as there are columns and rows. The Z-register with its plurality of bistable storage elements stores binary data representing both a particular column and a particular row. Thus, to form a row and column selection means, a plurality of electrical gates equal in number to said rows and columns of character synthesizing circuits are coupled to the bistable storage elements and corresponding ones of said row common junctions and said column common junctions in such a way that any one of the row gates and any one of the column gates may be simultaneously energized according to the binary data stored in said elements. The output signals from the energized column gate and the energized row gate are coupled respectively to a particular one of the column common junctions and a particular one of the row common junction. When individual ones of the scanning signals from the phase generator are selectively applied to the emitters of corresponding ones of said transistors in all of said first control circuits, said sequential scanning signals and said energizing signal from said gates which form part of the column selection means cause said transistors which are coupled to said energized column junction to sequentially conduct and produce sequential signals on said selected column input lines which are coupled to said transistor collectors. The emitter of each transistor in any one of said second plurality of control circuits is coupled to a corresponding one of the output lines in a corresponding row, and as stated previously the base of each transistor in each one of said second control circuits is coupled to a second common junction thereby forming as many groups of second common junctions as there are rows. An output circuit means comprises a plurality of transistors the number of which is equal to the number of output lines from any one of said character synthesizing circuits with the base of each of said output circuit transistors providing an input terminal. Corresponding ones of the collectors of the transistors in each of said second control circuits are coupled to a corresponding terminal of said output circuit means and thus the output means receives sequential character synthesizing output signals from the collectors of said group of transistors in said second control circuit which have said energizing signal from said row selection means applied to their respective bases. Thus, the output means includes a first, second and third group of bistable storage devices for receiving and storing respectively said first, second and third groups of binary digital signals from said selected character synthesizing diode matrix and having digital outputs representing respectively said desired beam *x*-coordinate said desired beam *y*-coordinate and said desired intensity of each said line segment. The number of bistable storage devices in each of said first, second and third groups being equal in number to the number of digital signals in each of said first, second and third respective groups of binary digital signals produced on said output lines of said selected one of said matrices.

Consider now the operation of the complete Character Generating Matrix 12. When the plurality of bistable elements forming the Z-register produce a column selection output signal from one of AND gates 254–268 on lines 286–290 respectively, that signal is coupled to one of the inputs to the A-select circuit 32 on lines 316–330. Assume that the output is on line 316, $A_0$. The signal on line 316 is applied to the base of each of transistors 332–346 enabling them to conduct if and when a signal is applied to their emitters on lines 348–362. As stated previously, the inputs to lines 348–362 are from phase generator 36 which produces signals on lines 348–362 sequentially beginning with line 348. Assume also at this point that the plurality of bistable elements forming the Z-register 18 are producing a row selection output signal on one of AND gates 270–284 which is coupled to one of the inputs 364–378 of the B-select circuit 34. Assume also that the signal is being applied to line 364, $B_0$. The signal applied to line 364 is present on the base of each of transistors 380 through 394. Any one of these transistors will now conduct if a signal is coupled to its emitter on one of lines 396–412. Returning to the A-select circuit 32, consider a signal from the phase generator 36 appearing on line 348 and coupled to the emitter of transistor 332 and transistor 414. Transistor 414 cannot conduct since no signal is present at its base from input $A_7$ on line 330. However, transistor 332 will conduct since a signal is present at its base from line 316, $A_0$. The signals present on the base and emitter of transistor 332 cause it to conduct and produce a signal on its collector which is connected to line 416. This signal on line 416 is coupled to diodes 418, 420 and 422 in diode coding circuit 296 and to diodes 424 and 426 in diode coding circuit 292. However, since no signal is present on line 378, B, transistors 428–442 in the B-select circuit cannot conduct and therefore present open circuits to diodes 424 and 426 in diode coding circuit 292. However, transistors 380–394 have a signal applied to their base from line 364, $B_0$, and therefore the signal that is present on line 416 from transistor 332 in the A-select circuit passes through diodes 418, 420 and 422 and is coupled via lines 396, 398 and 406 to the emitters of transistors 380, 382 and 388 in the B-select circuit causing them to produce outputs on lines 444, 446 and 448. These outputs are coupled through diodes 450, 452 and 454 respectively to the base of transistors 456, 458 and 464 respectively of output circuit 35 causing them to conduct and produce outputs on lines 472, 474 and 480 respectively. As can be seen in FIG. 7 the outputs on lines 472, 474 and 476 represent in binary form the coordinate of the beam along the X-axis while the outputs along lines 478, 480 and 482 represent the beam coordinates along the Y-axis. Further outputs on lines 484 and 486 represent in binary form the intensity of the beam. Thus with an output on lines 472 and 474, $2^0$ and $2^1$, the X-coordinate of the beam is three and with an output on line 480, $2^1$, the Y-coordinate of the beam is two, with no outputs on lines 484 and 486, the beam has zero intensity or is therefore blank and cannot be seen on the face of the screen as the beam moves.

When the second sequential phase from phase generator 36 appears on line 350, it is applied to the emitters of transistors 334 and 488. Since there is no signal on the base of transistor 488, it cannot conduct.

However, transistor 334 will conduct since it has a signal on its base and a signal will appear on its collector which is connected to line 490. Diodes 492, 494 and 496 in diode coding circuit 296 couple the signal on line 490 to the emitters of transistors 384, 386 and 392 in the B-select circuit via lines 400, 402 and 410 thus causing these transistors to conduct. Transistors 384, 386 and 392 produce outputs on their emitters which are coupled to lines 498, 500 and 502 respectively. These signals pass through diodes 504, 506 and 508 respectively and are coupled to the bases of transistors 460, 462 and 468 respectively causing these transistors to conduct and produce an output from their emitters on lines 476, 478 and 484. Thus the signal on line 476 is equivalent to a binary 4, $2^2$, thus indicating an X-coordinate of 4 units while the signal on line 478 is equivalent to a binary 1, $2^0$, and represents a Y-coordinate of 1 unit while the output on line 484 also represents a binary 1 ($2^0$) and indicative of the lowest level of intensity available to the CRT beam. Thus, it will be seen that as the signals from phase generator 36 are sequentially applied to lines 348–362 of the A-select circuit 32, transistors 332–346 are sequentially energized thus sequentially energizing the output lines connected to their collectors. As each line is successively energized, the diodes conduct that are coupled to that line and to the transistors in the B-select circuit which also have a signal on their base and cause the particular transistors in the B-select circuit to which they are connected to conduct and produce outputs. These outputs are coupled to corresponding transistors in the output circuit and indicate in binary form the X and Y coordinates of the CRT beam as well as the intensity of the beam. Thus, Table I shows the X, Y coordinates and the intensity level obtained if diode coding circuit 296 is selected. As has already been shown, when phase 1 is applied to line 348 of the A-select circuit 32, the output circuit 35 produces X coordinates of three units, Y coordinates of two units, and no intensity level. When phase 2 is applied to line 350 of A-select circuit 32 output circuit 35 produces X-coordinates of four units, Y-coordinates of one unit and an intensity level of one unit. Continuing through Table I it will be seen that a phase 3 signal produces X-coordinates of two units, Y-coordinates of zero units and intensity of one unit. Phase 4 produces X-coordinates of zero units, Y-coordinates of one unit and an intensity level of one unit. Phase 5 produces X-coordinates of zero units, Y-coordinates of 5 units and an intensity level of 2 units. Phase 6 produces X-coordinates of two units, Y-coordinates of six units and an intensity level of one unit. Phase 7 produces X-coordinates of four units, Y-coordinates of five units and an intensity level of one unit. Phase 8 produces X-cordinates of four units, Y-coordinates of one unit and an intensity level of two units. By beginning with X and Y coordinates of zero and moving to the X and Y coordinates indicated by each particular phase in sequence and drawing only when an intensity level is indicated, it may be seen that the coordinates defined in Table I form a Q as shown in FIG. 7*c*. In a similar manner diode coding circuit 292 will generate binary digital signals representing an A as each of the eight lines from the A-select circuit is sequentially scanned. Also diode coding circuit 294 will produce binary digital signals representing a B while diode coding circuit 298 will produce binary digital signals representing an R. Thus, if it is desired to generate the character Q, input line 316, $A_0$, to the A-select circuit 32 must be energized as well as line 364, $B_0$, to the B-select circuit 34 and as the sequential phases are applied to line 348–362, a character Q will be formed by the CRT beam which is positioned by the digital signals produced by the diode coding circuit. Also, if the character A is desired to be generated, line 316, $A_0$, of A-select circuit 32 must be energized while line 378, $B_7$, of the B-select circuit must be energized. To generate a B, coding circuit 294, line 330, $A_7$, of A-select circuit 32 must be energized as well as line 378, $B_7$, of B-select circuit 34. Also, to generate the character R, coding circuit 298, line 330, $A_7$, of A-select 32 must be energized as well as line 364, $B_0$, of the B-select circuit 34.

Thus it can be seen that any one decoding circuit of a matrix of decoding circuits may be selected merely by energizing the appropriate A-select line and B-select line. It will also be seen that the entire character generating matrix is completely digitalized and is constructed only from on-off components that operate either in saturation or cut-off. No adjustments are therefore necessary and changing component tolerances do not affect the operation thereof.

Further, the unique matrix array of matrices provides a considerable improvement over the prior art. Consider FIG. 4 of Triest, 2,931,022 which shows only two of 16 diode coding circuits. These 16 circuits are connected serially to lines 101–120 which are successively scanned by ring circuit 56. When one of the sixteen output lines such as 28 and 29 is selected and energized, it opens the seven gates for that particular character enabling the data on the seven lines, six of which represent the desired character, to be read out to OR gate 150. For 64 characters, 64 of such coding circuits would have to be placed in series and with seven AND gates per circuit would require 448 AND gates and associated circuitry. In the instant invention, with the unique matrix array of matrices, only 128 transistors are required to produce 64 outputs. Obviously the present character generation matrix is much more simple and economical than the prior art devices. Further in each of applicant's diode coding circuits, an 8 by 8 array of input-output lines is used whereas in Triest an array of 20 by 7 lines is used.

With the addition of 64 more transistors in B-select and 64 more diode matrices the generator can be expanded to 8 by 16. Beyond this by adding 64 more transistors in the A-selection and 128 additional diode matrices we then have a matrix array of 256 characters using 256 transistors to select any one character.

Also, the intensity control circuit provides significant improvements in the manner in which uniform character intensity is obtained. In some prior art patents such as Palmiter, 3,047,851, no intensity variation of the strokes which form the character is possible at all and the beam can be turned on or off only. In other patents such as Loshin, 3,104,387, the strokes which form the character are kept equal in length so that each stroke will have the same intensity level. Again, the beam can be controlled only by blanking it entirely or turning it on. The advantages and enhancing features of applicant's intensity control are therefore obvious.

Thus, the matrix array forms a character tracing control circuit means coupled by the Electrostatic Control Unit to the cathode ray tube intensity control means and beam deflection means for producing digital signals causing said beam to trace a series of intensity controlled line segments on the cathode ray tube screen as defined by discrete $x$ and $y$ coordinates to form a character while said electron beam is being positioned by the beam positioning means of the Electromagnetic Control Circuit shown in FIG. 3*a*.

PHASE GENERATOR

FIG. 7*d* shows the circuit of phase generator 36 which forms a part of a Character Generating Network 12. Phase generator 36 produces the eight phases which are sequentially applied to the emitters of the transistors in the A-select circuit 32 which causes sequential scanning of the lines forming each of the decoding matrices which form the Character Generating Matrix. It will be remembered that 32 microseconds are used to form a complete cycle of operation of the display system. The first 16 microseconds are utilized to paint the characters on the face of the CRT while the second 16 microseconds are used to perform all input/output operations to the display system. Therefore, it is desirable that phase generator 36 should produce the eight sequential phases only during the first 16 microseconds in which the characters are being painted on the face of the CRT. Therefore, a pulse T41 appears on line 510 only during the first 16 microseconds of operation thus enabling AND gates 512 through 526 during the first 16 microseconds only. In order that AND gates 512–526 might produce outputs in sequential order, they are applied with timing pulses in the proper order to provide sequential operation. It will be recalled from the operation of the timing circuit in FIG. 1*a* that during the occurrence of each of the pulses T31–T38, the four pulses T21–T24 occur. Referring now to FIG. 7*b* and phase generator 36 it will be seen that when pulse T33 appears on line 528 and pulse T23 appears on line 530 along with pulse T41 on line 510, AND gate 512 will produce an output on line 532. When T23 has terminated, T24 begins and is applied via line 534 to AND gate 514. Also applied to AND gate 514 are pulses T41 and T33 which were applied to AND gate 512. AND gate 514 then produces a pulse on line 536 immediately following the pulse from AND gate 512 on line 532. As pulse T24 terminates pulse T33 also terminates and following them, pulses T34 and T21 are applied via lines 538 and 540 along with pulse T41 to AND gate 516 which produces an output on line 542. A similar examination of the remaining AND gates and their inputs will show that the timing pulses cause sequential outputs. Thus, the outputs of AND gates 512–526 on line 532, 536 and 542–552 respectively are coupled to transistors 554–568 respectively with the proper bias voltage applied to the emitters of the transistors on line 570. The sequential outputs on lines 532, 536 and 542–552 which are coupled to the bases of the respective transistors cause each transistor sequentially to conduct and produce an output signal on lines 572–586 respectively. Again it will be seen that no analog devices are involved in the phase generator 36. The components operate entirely in saturation or cut-off only.

ELECTROSTATIC CONTROL UNIT

It will be recalled that output circuit 35 of the character generating matrix 12 produces eight digital outputs, three of which represent the X-coordinates of the CRT beam, three of which represent the X-coordinates of the CRT beam, three of which represent the Y-coordinates of the CRT beam and the last two of which represent the intensity of the beam. These eight outputs are coupled to the Electrostatic Control Unit 14 shown in FIG. 8. The three signals representing the X-coordinates of the CRT beam are coupled via lines 588, 590 and 592 to OR gates 594, 596 and 598, respectively, while the three signals representing the Y-coordinates of the CRT beam are coupled via lines 600, 602 and 604 to OR gates 606, 608 and 610 respectively and the two signals representing the intensity are coupled via lines 612 and 614 to OR gates 616 and 618. The outputs from OR gates 594–598, 606–610, 616 and 618 are coupled via lines 662–676 respectively to AND gates 636–650 respectively. When pulse T14 is applied via lines 678 to all AND gates 636–650, each AND gate having an input from a corresponding OR gate will produce an output which will set the respective flip-flops of the group of flip-flops 620–634. The combined states of the three flip-flops 620, 622 and 624 determine the X-coordinate position of the CRT beam. Thus, if flip-flop 620 is set and flip-flop 622 and 624 are not set, a binary indication of 1 unit along the X-coordinate is produced. Similarly, if flip-flop 622 is set while flip-flop 620 and 624 are not set, a binary indication of two units along the X-axis is indicated. Thus any number of units along the X-coordinate up to seven units may be indicated by the three flip-flops 620, 622 and 624. When all of these flip-flops are set, an X-coordinate indication of seven units is produced. As explained previously the electrostatic deflection plates which control the XY coordinates of the CRT beam are operated in push-pull arrangement. Thus, one output from each of the flip-flops 620–624 is coupled to one group of electrostatic deflection amplifiers 680 while the other output from each of the flip-flops 620–624 is coupled to a second group of electrostatic deflection amplifiers 682. The outputs from these two groups of deflection amplifiers are coupled via lines 684 and 686 respectively to the X deflection plates.

The Y deflection circuits are operated in a similar manner through two groups of electrostatic deflection amplifiers 688 and 690.

The outputs of flip-flops 632 and 634 are coupled via lines 692 and 694 respectively to the intensity control unit 696 which produces three different intensity levels as well as blanking the intensity.

It may be well to recall at this point that if it is desired to position the beam in a particular location on the face of the CRT tube, some type of marker must be used to indicate to the operator the position of the beam. Therefore, in order to indicate where the next insertion or deletion is to be made, the present invention causes a cursor to be produced at that location. When timing pulses T14, T23, and T35 appear on lines 678, 720, and 732 respectively AND Gate 734 produces an output causing flip-flop 706 to clear producing an output on line 708 and removing the output on line 710. Thus, prior to painting the cursor, the beam is positioned at coordinates $X=2$, $Y=3$. Thus, whenever timing pulses T14, T22, T32, and T41 appear on lines 678, 698, 700 and 702 respectively, AND gate 704 produces an output which sets flip-flop 706 causing it to remove the signal line which enables the beam to be moved from the dead time position and places a signal on line 710. With a signal on line 708, OR gates 606 and 608 of the Y deflection circuits and OR gate 596 of the X deflection circuits produce output signals. OR gates 594, 596, and 598 of the X deflection circuits therefore produce output signals equivalent to 010 or an octal 2 while OR gates 606, 608 and 610 of the Y deflection circuits produce binary outputs representing 110 or octal three. The outputs from these OR gates set their corresponding flip-flops in the group of flip-flops 620–630 thus causing the CRT beam to be positioned at the coordinates $X=2$, $Y=3$. The beam cannot be seen at this point however, since the signal on line 710 to the intensity control circuit 696 causes a blanking condition to occur as will be seen later. FIG. 9 shows that relative to the coordinates $X=0$, $Y=0$, the cursor always begins at $X=2$, $Y=3$ and moves, while blanked, to coordinates $X=0$, $Y=7$, then paints to $X=5$, $Y=7$ and finally it paints to $X=5$, $Y=0$. This is accomplished automatically by the use of timing inputs and AND gates 712, 714 and 716. Further as explained previously, the X register in cursor control 8 shown in FIGS. 16 and 18 determines the location on the CRT face at which the cursor is to be painted. Therefore, as the data in the M-register shown in FIGS. 11 and 12 is causing the CRT beam to be positioned both horizontally and vertically in one of the 512 available positions, whenever the data in the X-register agrees with that or compares with that in the M-register, the X–M compare circuit 166 produces a signal which will enable the cursor to be painted. This signal appears on line 718 in FIG. 8 and is coupled to each of AND gates 712, 714, and 716 as well as to OR gates 616 and 618. Therefore, whenever the cursor compare signal appears on line 718 and timing pulses T23 and T32 appear on lines 700 and 720 respectively, AND gate 712 produces an output which is coupled to OR gates 606, 608 and 610 of the Y deflection circuits thus causing an output from the OR gates of a binary 111 which represents the Y coordinate of seven units. The cursor compare signal on line 718 and T32 on line 700 are also coupled to AND gate 714. Therefore, 500 nanoseconds after pulse T23 is applied to AND gate 712, pulse T24 is applied to AND gate 714 which produces an output on line 724 that is coupled to OR gates 594 and 598 of the X deflection circuits as well as OR gates 606, 608 and 610 of the Y deflection circuits. OR gates 594, 596 and 598 of the X deflection circuits then produce outputs equivalent to a binary 101 which is equivalent to five units along the X axis while OR gate 606, 608 and 610 produce outputs 111 which is equivalent to seven units along the Y axis. Therefore the beam is swept from coordinates $X=0$, $Y=7$ to $X=1$, $Y=7$. It should be noted at this time that the cursor is being painted since there is a signal on line 710 to the intensity control 696 which enables the beam to be unblanked as will be discussed below. At the conclusion of timing pulses T32 and T24 being applied to AND gate 714, timing pulses T33 and T21 are applied to AND gate 716 via lines 726 and 728 respectively to cause an output from AND gate 716 on line 730. This signal is coupled only to OR gates 594 and 598 in the X deflection circuits and is not connected to any OR gate in the Y deflection circuits. Thus the output of the OR gates in the X deflection circuits is a 101 which represents five units along the X coordinates while the output from the OR gates in the Y deflection circuit is 000 which indicates 0 units along the Y axis. Thus the beam is moved from $X=5$, $Y=7$ to $X=5$, $Y=0$. The cursor is thus painted in the above manner.

The beam was blanked as it moved from coordinates $X=2$, $Y=3$ to coordinates $X=0$, $Y=7$ since pulse T23 is not coupled to OR gate 652 through either of AND gates 654 or 656. However, when pulse T24 causes the beam to move to coordinates $X=5$, $Y=7$, it is also coupled to AND gate 654 in conjunction with the cursor compare signal on line 718. These signals cause AND gate 654 to produce a signal which passes through OR gate 652 on lines 658 and 660 to OR gates 616 and 618 respectively. OR gates 616 and 618 produce outputs which set flip-flops 632 and 634 causing a binary signal of $2^0$ and $2^1$ to be coupled to intensity control 616. Thus, the cursor is painted at maximum intensity. Similarly, when T21 causes AND gate 716 to move the beam to coordinates $X=5$, $Y=0$, it also is coupled to AND gate 656 where in conjunction with the cursor compare signal on line 718, AND gate 656 is caused to produce an output which passes through OR gate 652 and passing through the circuitry described above, causes maximum intensity of the beam.

At the conclusion of the application of pulse T21 to AND gate 716, no further timing pulses are applied to AND gates 712, 714 and 716 which in effect causes all 0's at the output of OR gates 594, 596, 598, 606, 608 and 610. This causes both the X and Y deflection circuits to position the beam at coordinates $X=0$, $Y=0$. The beam is blanked at this time since OR gate 652 does not produce an output. It is from this point 500 nanoseconds later that the eight phases begin to cause a character to be generated by a particular individual matrix in the character generator 12.

Whenever the CRT beam reaches one end of a line and is caused to fly back to the beginning of the next line it is desired that the intensity be blanked during this flyback period. Therefore, during this time a signal appears on line 735 which is coupled to intensity control unit 696 thus blanking the CRT beam even though signals may appear on lines 692 and 694.

FIG. 9 shows a character which can be generated by the individual diode matrix 296 in FIG. 7 in relation to the cursor. It will be remembered that flip-flop 706 of FIG. 8 causes the X and Y deflection circuits to position the beam at coordinates $X=2$, $Y=3$ after each character is painted. Referring now to FIG. 9 and the manner in which the cursor and the letter Q in particular is generated, it will be seen that the beam is caused to move from its initial coordinates $X=2$, $Y=3$ to coordinates $X=0$, $Y=7$ and this is caused by AND gate 712 in FIG. 8. It will also be remembered that at this time a pulse from flip-flop 706 is applied via line 710 to the intensity control unit 696 which prevents the beam from painting on the face of the tube by blanking it. At the proper time, pulses are applied via lines 768, 720 and 732 to AND gate 734 which clears flip-flop 706. Further, the cursor compare signal and timing pulses T24 and T21 are coupled to OR gate 652 which removes the blanking and thus providing a signal on lines 658 and 660 which enables intensity control circuit 696 to allow the beam to paint. At this time AND gate 714 in FIG. 8 will produce an output which causes the beam to move to coordinates $X=5$, $Y=7$ as shown by arrow 740 in FIG. 9. Next AND gate 716 produces an output which causes the beam to assume coordinates $X=5$, $Y=0$ as shown by arrow 742 in FIG. 9. When AND gates 712, 714 and 716 in FIG. 8 have no outputs this causes the beam to assume coordinates $X=0$, $Y=0$ as shown by arrow 744 in FIG. 9. However, the beam is not painted at this time because OR gate 652 has no inputs to enable it. At this time the particular character generating matrix in FIG. 7 that has been selected, in this example matrix 296, begins to sweep out the letter Q by causing the beam to move in the direction and sequence shown by arrows 746–760.

ELECTROSTATIC DEFLECTION CIRCUIT

FIG. 10 discloses the circuit details of the electrostatic deflection circuits 680, 682, 688 and 690 as well as the details of the intensity control circuit 696 all of which are shown in block form in FIG. 8. It will be noted from FIGS. 8 and 10 that the X deflection circuits as well as the Y deflection circuits operate in push-pull arrangement. Thus, the three inputs on lines 762, 764 and 766 to X deflection circuit 682 are the complements of the three signals on lines 768, 770 and 772 to X deflection circuit 680. Since each of circuits 680, 682, 688 and 690 operate in identical manners only circuit 680 will be discussed in detail. One of the horizontal deflection plates 786 of CRT 7 is driven by transistor amplifiers 788 in the X deflection circuit 680. The conductivity of transistor driver 788 is determined by the combination of input signals on line 768, 770 and 772 which are coupled to the emitter of transistor driver 788 through amplifiers 774, 776 and 778 respectively as well as resistors 780, 782 and 784 respectively. It will be noted that the group of resistors 780, 782 and 784 have resistance values which form a geometric progression of R, ½R, ¼R . . .

$$\frac{1}{2^{n-1}}R$$

where $n$=the number of resistors in a group. Therefore, depending upon which input line or which combination of input lines is energized the current coupled to the emitter of the transistor driver 788 may be one of eight values. It can be seen that electrostatic deflection amplifiers for the X axis can operate to the position beam in any one of seven positions along the X axis. In a similar manner, the Y deflection circuits 688 and 690 may position the CRT beam in any one of seven positions along the Y axis.

INTENSITY CONTROL CIRCUIT

It should be noted that in order for the intensity of each stroke of a character to be made variable, each stroke should be made in the same increment of time no matter how long or short the stroke may be. When a stroke is of maximum length, maximum intensity can then be applied to it and when it is short, minimum intensity can be applied to it. In order to accomplish this, amplifiers 774, 776 and 778 in deflection circuit 680 and all other amplifiers in deflection circuits 682, 688 and 690 are provided with switching control means which causes them to switch from cut-off to saturation or vice versa in the same length of time. This is done by causing each amplifier to become a Miller integrator as is well known in the art, by using condensers 773, 775 and 777 as shown in deflection circuitry 680. This takes all non-linearities out of the circuit such as component variation since each sweep takes ½ microsecond no matter how long or how short. It also eliminates bright spots at the end of each sweep.

Consider FIG. 10*a* which shows in the solid lines the wave form of the X and Y coordinate voltages present with no Miller integrators and the dotted lines show the output when Miller integrators are used. Note that no matter how many or how few units of voltage are required, the integrated voltage requires the same increment of time to reach the amplitude of the required units.

The intensity control circuit 696 is also shown in detail in FIG. 10. This circuit is necessary to ensure that each stroke of each character generated is of essentially equal intensity. It is also used to blank the beam whenever it is sitting in its dead time position, coordinates $X=2$, $Y=3$, and whenever the beam is being returned from the end of one line to the beginning of another, i.e., during fly-back. It was stated previously that intensity control flip-flops 632 and 634 in FIG. 8 produce outputs which cause three different levels of intensity. These outputs are coupled, in various combinations, to the base of each of transistors 792, 794 and 796. Although transistors 792, 794 and 796 are normally nonconducting because of the bias voltage applied to their base, the outputs from the intensity control flip-flops are sufficient to overcome the bias voltages and cause a particular one of them to conduct. Thus if flip-flop 632 is set and flip-flop 634 is not set, a signal will appear on lines **692*a* and 694*b*, both of which are connected through diodes 798 and 800 respectively and resistor 802 to base 804 of transistor 792. Signals are required on both lines 692*a* and 694*a* before the bias voltage on base 804 can be overcome and transistor 792 switched into full conduction. Transistors 794 and 796 operate in a similar manner. Thus, if intensity control flip-flop 632 is clear and 634 is set, signals will appear on lines 692*b* and 694*a*. Both of these lines are coupled only to the base of transistor 794 causing it to conduct. Similarly, if both intensity control flip-flops 632 and 634 are set, signals are present on lines 692*a* and 694*a* and only the base of transistor 796 has both signals coupled thereto. Thus, the bias voltage on the base of transistor 796 is overcome and transistor 796** switches into conduction.

When either of transistors 792, 794 or 796 conduct, current flows through their respective collector resistor 806, 814 or 816, through common junction 808 to base 810 of transistor 812 causing it to conduct. The amount of current transistor 812 will conduct at any one instant depends upon which of transistors 792, 794 or 796 is conducting. The value of current varies because the collector resistor in each of the three transistors 792, 794 and 796 has a different value. Thus, when transistor 792 conducts current flow through collector resistor 806 which has a value of R. When transistor 794 conducts, twice as much current flows through transistor 812 since collector resistor 814 of transistor 794 is ½R or one-half the size of collector resistor 806. Similarly, when transistor 796 conducts, four times as much current flows through transistor 812 since collector resistor 816 is one-fourth the size of collector resistor 806 or ¼R. Thus, it will be seen that the collector resistors 806, 814 and 816 have resistance values which form a geometric progression of 4R, 2R and R thus causing the current flow through transistor 816 to also follow a geometric progression of I, 2I and 4I. Of course, the resistance values of collector resistors 806, 814 and 816 would not have to follow an exact geometric progression but could be made whatever value is necessary to cause the most uniform intensity of the characters in general. At any rate, as transistor 812 varies in its conductivity, it causes the negative voltage applied to the CRT grid to vary thus varying the intensity. Potentiometer arm 818 may be adjusted to obtain a desired overall intensity.

Transistor 820 has bias voltages coupled to its base 822 such that it is normally conducting. This causes the positive supply voltage on line 838 to drop across collector resistor 824. The cathode of the CRT is connected across the collector resistor 824 by line 834. Whenever it is desired to blank the CRT, transistor 820 is caused to stop conducting and the full positive voltage supply is coupled to the cathode, thus blanking the CRT. There are three circumstances under which the beam may be blanked. The first of these circumstances occurs when neither of the intensity control flip-flops 632 and 634 are set. Signals will be present on lines **692*b* and 694*b* which are coupled through diodes 826 and 828 to the base 822 of transistor 820 which overcomes the base bias voltage and causes transistor 820 to stop conducting. Thus full positive voltage is applied to the CRT cathode on line 834 causing the beam to be blanked. At the same time, of course, transistor 812 is not conducting, and full negative supply voltage is applied to the CRT grid on line 836. Complete CRT blanking thus occurs. The second of these circumstances occurs when the beam is in its dead time position. The signal on line 710 is coupled to the base 822 of transistor 820 through diode 830 thus overcoming the bias voltage on the base 822 and causing transistor 820 to become non-conductive. The full positive supply potential is applied to the cathode of the CRT on line 834** causing blanking of the beam.

Further during the time of fly-back, that is during the time the beam is sweeping from the end of one trace to the beginning of the next, it is desirable that the beam be blanked in order that its movement across the screen cannot be detected. When this situation occurs, a pulse is produced on line 735 which is coupled to the base 822 of transistor 820 through diode 832 causing it to be cut off in a similar manner as previously explained in relation to the pulse on line 710 and producing the same results of blanking the tube.

GENERAL ADDRESS CONTROL UNIT

It has already been stated that 512 characters are printed on the face of the tube in 16 lines with 32 characters per line. M-register 20 of General Address Control Unit 6 shown in FIG. 3 and FIG. 3*a* causes the electron beam to sequentially assume the 512 positions. It has also been explained previously that a complete cycle lasts 32 microseconds with 16 microseconds of the cycle being used to paint the character and 16 microseconds of the cycle being used for input-output operations. This means that at the end of the paint cycle the beam moves to its new position, sits there for approximately the next 25 microseconds, during input-output operations and at the beginning of the next painting cycle, the next character is then painted and the sequence repeats. Since the M-register governs the positioning of the beam in the 512 positions, this means that the M-register must be incremented by one count every 32 micro-seconds. FIG. 11 shows in detail the circuitry in FIG. 3*a* that is necessary for incrementing the M-register in the normal manner.

As seen in FIG. 3*a*, the Beam Positioning Control means the M-register which is a first plurality of bistable storage devices for storing as binary data the instantaneous *x*, *y* coordinates of the beam position, the S-register which is a second plurality of bistable storage device equal in number to said first plurality of bistable storage devices and the R-register which is a third plurality of bistable storage devices also equal in number to said first plurality of bistable storage devices. The first plurality of storage devices is divided into two groups one of which produces signals indicative of $n$ lines of characters on the cathode ray tube screen according to the equation $2^p=n$ and the other of which produces signals indicative of N characters per line according to the equation $2^p=N$. These two groups of signals are coupled first to corresponding ones of the second plurality of storage devices and also to a translating means. The output of the second plurality of storage devices is coupled to the Character Generation Control Unit or Input/Output Unit to cause it to activate the Character Tracing Control Circuit means. It is also coupled to corresponding ones of said third plurality of storage devices, said third storage devices including means for incrementing by one count any binary data coupled thereto. The incremented output of the third plurality of bistable storage devices is coupled to corresponding ones of the said first plurality of storage devices. The translating means receives the binary data outputs from the first plurality of bistable storage devices and translates said binary data into instantaneous current flow whose magnitude varies according to said binary data. This varying current flow is coupled to the first and second electromagnetic coils of the cathode ray tube to cause said beam to assume successively the positions determined by the successively stored binary data in said first plurality of bistable storage devices.

The translating means includes first and second groups of amplifiers with means coupling the outputs of said first plurality of bistable storage devices to said amplifier inputs as well as first and second driving circuits, each of which has an input and an output with the outputs representing respectively the $x$-coordinates of the beam position and the $y$-coordinate of the beam position. Means are also provided for coupling in parallel the outputs of each group of amplifiers to the input of the respective corresponding driving circuit to provide $2^p$ current levels out of each driving circuit where $p$=the number of amplifiers in a group. This parrallel coupling means includes first and second groups of resis'ors, the number of resistors in each group being equal in number and coupled to corresponding amplifiers in each of said amplifier groups, a predetermined number of resistors in each of said groups having resistance values according to the equation R, ½R, ¼R . . .

$$\frac{1R}{2^{n-1}}$$

where $n$=the predetermined number of resistors and the remaining resistors each have a resistance value equal to the value of the $n$th one of the predetermined number of resistors.

In FIG. 11 line 840 represents the outputs of the lower five stages of the M-register while line 842 represents the outputs of the upper four stages of the M-register. The lower five stages produce a possible 32 combinations which represent the 32 positions on any one line which the beam may occupy while the upper four stages represent a possible 16 combinations and control the Y-positioning of the beam to cause it to form 16 lines. Assume now that the information stored in the stages of the M-register 20 have caused the beam to be positioned on some particular line at a particular location on that line. This information in M-register 20 must be transferred to S-register 28 which then causes that address in the memory to be read out and the character painted according to the information stored therein. Of course, if no information is stored therein, no character is painted. This means that every 32 microseconds the data stored in the stages of M-register 20 must be transferred via path 844 and AND gate 846 to S-register 28. This is achieved by the presence of an M-to-S transfer signal on line 848 which is coupled to AND gate 846 enabling the signals on path 844 to be transferred to corresponding stages of the S-register 28. AND gate 850 will produce the M-to-S transfer signal on line 848 whenever it has pulses T13, T21, T31 and T41 applied to it on lines 854, 856, 858 and 860 respectively. Since pulse T31 on line 858 will occur during the time pulse T41 is present on line 860, only once every 32 microseconds, AND gate 850 will produce an M-to-S transfer signal every 32 microseconds. AND gate 846 is then enabled and the signals on the path 844 are transferred to the corresponding stages of S register 28. Thus, any signal stored in the corresponding address in the memory is read out and the character which the signal represents, if any, is painted on the face of the CRT.

It is now necessary that the M-register be incremented by one in order that the beam of the CRT might assume the next successive position. This is accomplished by an S-to-R transfer signal on line 862 which is coupled to AND gate 864 thus enabling the output of S register 28 to be coupled via path 866 and 868 to R-register 22 which automatically increments the data from the S-register by one. OR gate 870 will produce an S-to-R transfer signal on line 862 whenever it has as inputs either an M-to-S transfer signal on line 872, an N-to-S transfer signal on line 874 or an X-to-S transfer signal on line 876. Since the X-register governs the location in the memory at which new data can be inserted during input/output operations, it must be incremented during the 16 microseconds of I/O operation provided that a new character is to be stored in the memory, i.e. a character from the keyboard, computer or external switch arrangement. This means that the data in the X-register will be transferred to the S-register to enable the new data to be stored in the memory at that location. The data in the S-register will then be transferred to the R-register where it will be incremented by one and then returned to the X-register where it will await the next I/O operation and when a new charatcer is to be entered, it will repeat the above cycle in order to be incremented once more.

AND gate 878 will produce and X-to-S transfer signal on line 876 during input-output operations. It will be remembered that the 32 microsecond cycle consists of a 16 microsecond painting plus a 16 microsecond input-output cycle. Therefore, even though AND gate 878 has as inputs pulses T13, T21 and T31 on lines 854, 856 and 858 respectively, it cannot produce an output during the painting cycle as does AND gate 850 but also requires and I/O active signal on line 880.

Similarly AND gate 882 can only produce an N-to-S transfer signal on line 874 when pulses T21 and T31 are present on lines 856 and 858 respectively as well as pulse T42 on line 884 which represents the input-output half of the cycle. Further, in order that AND gate 882 does not produce an N-to-S transfer signal on line 874 simultaneous with an X-to-S transfer signal produced by AND gate 878 on line 876, a delete signal is also required as an input to AND gate 882 on line 886. This delete signal on 886 is present only when it is desired to delete an existing character on the face of the CRT.

Thus it will be seen that whenever AND gates 850, 882 and 878 produce respectively an M-to-S, N-to-S, or X-to-S transfer signal on lines 872, 874 or 876 respectively, OR gate 870 produces an S-to-R transfer signal on line 862 thus enabling AND gate 864 which allows the data stored in the S-register 28 to be transferred to R-register 22 via line 866 and 868 in either true or complement form.

As will be disclosed in detail hereinafter, R-register 22 automatically increments by one the data it receives and presents this data via path 888 to AND gate 890 where, when an R-to-M transfer signal appears on line 892, AND gate 890 causes a transfer of the information stored in R-register 22 via line 894 to M-register 20. Since the data received by the R-register 22 is incremented by 1 and is transferred to M-register 20, M-register 20 then causes the CRT beam to move to its next successive position.

The R-to-M transfer signal on line 892 is produced every 32 microseconds by AND gate 896 which has as its inputs an enable signal on line 898 and a signal on line 900 from AND gate 902. AND gate 902 will produce an output signal on line 900 whenever it has as inputs pulses T14, T24 and T35 on lines 904, 906 and 908 respectively. Since pulse T35 occurs only once every 16 microseconds, it will be understood that AND gate 902 will produce an output once every 16 microseconds. However, AND gate 946 will allow an R-to-M transfer only once every 32 microseconds.

BEAM FLY BACK

When the CRT beam has completed moving through the 32 positions in one line on the face of the CRT, the beam must be returned to the beginning of the second line. The time required for the beam to move from the end of one line to the beginning of the next is greater than 32 microseconds or one painting cycle. This means therefore that as the beam is moving from the end of one line to the beginning of the next, commonly called the flyback period, means must be provided to prevent the character from being painted during that time interval. This could be accomplished in one of two ways. Circuitry could be utilized which delayed the painting of a character for one cycle during which the beam could be moved from the end of one line to the beginning of the next or circuitry could enable the painting circuits to paint the same character for two cycles while blanking the CRT so that the first cycle cannot be seen. It is the latter method which is used in the present invention.

Assume that each of the lower five stages of the M-register is set thus indicating that the beam is positioned at the end of a line in character position 32. When the next R-to-M transfer signal appears on line 892, AND gate 890 enables all 0's to be transferred from the lower five stages of R-register 22 to the lower five stages of M-register 20. This information indicates that the beam returns to the beginning of a line as the beam begins to fly back. The output from the lower five stages of the M-register 20 is coupled not only to the beam positioning circuitry but also via path 910 to AND gate 912. When all 0's from the lower five stages of M-register 20 are coupled to AND gate 912, it produces an output on line 914. AND gate 916 will receive an enable signal from intensity flip-flop 918 on line 920 whenever the flip-flop 918 is cleared and will also receive a signal from AND gate 922 on line 924. AND gate 922 will produce an output on line 924 every 32 microseconds since there is only one occasion every 32 microseconds that all three pulses T23, T31 and T41 will appear on lines 926, 928 and 930 respectively simultaneously. When AND gate 916 receives as inputs a signal on line 924 from AND gate 922 and an enable signal on line 920 from the Intensity flip-flop 918, AND gate 916 produces an output on line 932. AND gate 934 will then produce an output on line 936 whenever it has as inputs signals on lines 914 and 932. AND gate 938, when it receives as inputs signals on lines 920 and 936, produces an output which sets the R-to-M inhibit flip-flop 940 which produces an output on line 942 which, when pulse T41 is present on line 944, causes AND gate 946 to produce an inhibit signal on line 898 thus preventing any further R-to-M transfer signals even though the proper timing signal appears on line 900 from AND gate 902. Therefore, as the beam is returning from the end of one line to the beginning of the next, the beam painting circuits are actually going through the motions of painting a character during the flyback time. The beam is blanked during this time however, as will be explained hereinafter. When the beam reaches the beginning of the next line, the R-to-M transfer signal has been inhibited and no new data is transferred from the R to the M-register and therefore for one more cycle the beam has an X coordinate of "0" and this time the beam is unblanked and the same character is painted again at the beginning of the line.

The beam is blanked during the flyback period by intensity flip-flop 918. When the R-to-M inhibit flip-flop 940 changes state and produces an output on line 942, that output is also coupled to AND gate 948 where in conjunction with pulse T32 on line 953, AND gate 948 is caused to produce an output which sets Intensity flip-flop 918 thus producing an output on line 735 which is coupled to the Intensity Control Unit 696 shown in FIG. 10 which blanks the CRT beam until the Intensity flip-flop is cleared. When AND gate 951 receives as inputs pulses T13, T21 and T38 on lines 950, 952 and 954 respectively, it produces an output on line 956 which is coupled to AND gate 958. There in conjunction with pulse T41 on line 944, AND gate 958 is caused to produce an output which clears the R-to-M inhibit flip-flop 940. When R-to-M flip-flop 940 is cleared, it produces an output on line 960 which is coupled to AND gate 962 where in conjunction with pulse T32 on line 953, a pulse is produced which clears Intensity flip-flop 918 which removes the signal from line 735 that is blanking the CRT beam. Further when the R-to-M inhibit flip-flop 940 is cleared, it causes AND gate 946 to remove the inhibit signal from lines 898 and instead produces an enable signal on line 898 thus enabling the R-to-M transfer signal to be produced by AND gate 896 whenever the proper signal appears on line 900 at the proper time.

BEAM POSITIONING CONTROL CIRCUIT SUMMARY

In summary the M-register incrementing circuit shown in FIG. 11 operates as follows. The data that is stored in the stages of the M-register 20 and which positions the CRT beam in one of its 512 positions is also transferred to S-register 28 when an M-to-S signal is coupled to AND gate 846. Thus S-register 28 will have stored in it the same data that is stored in M-register 20. This data stored in S-register 28 causes the data stored in the memory at a corresponding location to be read out where it is coupled to the character generating networks which cause that particular character to be painted on the face of the CRT. While this is being accomplished, AND gate 864 is also enabled by an S-to-R transfer signal which allows the data stored in the S-register to be also transferred to R-register 22. R-register 22 automatically increments the data that it receives by one count and then during the next R-to-M transfer signal, transfers the incremented data to the M-register 20 causing it to produce signals which move the beam to the next successive position. This operation continues until all of the lower five stages of the M-register have been set indicating that the beam is positioned in the last character position in a line. When the next R-to-M transfer signal causes the incremented data in the R-register 22 to transfer all "0's" to the lower five stages of M-register 20, these five outputs on the lower stages of the M-regitser each representing a "0" are ANDed together and produce a signal which not only inhibits the R-to-M transfer signal but also blanks the intensity of the cathode ray tube so that it will not show the beam sweep during flyback. Nothing inhibits the painting circuits, however, and they continue to paint the character stored in the memory during the flyback period although the painting cannot be seen. Once the beam has assumed the first position at the beginning of the next line, since no R-to-M transfer had been made, the same data stored in the M-register is transferred once again to the S-register and the same character is painted again in the first position of the next line and this time the intensity flip-flop has been cleared and the character is painted so that it can be seen on the face of the tube.

M-REGISTER

M-register 20 along with its associated driving circuits and electro-magnetic deflection coils are shown in FIG. 12. Stages 964, 966, 968, 970 and 972 of the M-register store the Xn coordinates of the beam position while stages 974, 976, 978 and 980 store the Y coordinates of the beam. Since each of the stages receive inputs from the R-register in identical manners, only the first stage, 964, will be discussed in detail. Whenever an R-to-M transfer signal appears on line 982 and a true or normal signal from the corresponding stage of the R-register is present on line 984, AND gate 986 produces an output which sets flip-flop 964 which produces a normal or true output on line 988 and a complementary output on line 990. The normal and complementary outputs of flip-flop 964 are coupled to push-pull circuits which position the beam along the X axis. If the lower stage of the R-register produces a complementary signal on line 992 and an R-to-M transfer signal is present on line 982, AND gate 994 produces an output which clears flip-flop 964 which reverses the normal and complementary outputs. One end of each of the resistors 996, 998, 1000, 1002, 1004 and 1006 is coupled respectively to amplifiers 1008, 1010, 1012, 1014, 1016 and 1018. The other ends of the resistors are coupled to a common junction 1020 which is a current summing junction. Resistors 996, 998, 1000 and 1002 are of such values as to form a geometric progression which causes the current applied to junction 1020 to assume any one of a series of levels created by the currents flowing in the resistors or a combination of the resistors. Thus if flip-flop 964 were set and providing an output on line 988 to amplifier 1008, a current of N units would be produced which flows through resistor 996 as measured at junction 1020. If flip-flop 966 were set and was applying a signal to amplifier 1010, a current would be caused to flow through resistor 998 thus producing a current of 2N units at junction 1020. If both flip-flops 964 and 966 were set and producing outputs which were coupled to amplifiers 1008 and 1010, currents would be produced which flow through both resistors 996, 998 thus providing a current of 3N units at junction 1020. Thus resistors 996, 998, 1000, and 1002, following the above examples, may be energized in combinations to provide 16 different levels of current at junction 1020. It is obvious that the geometric progression of the resistance values could continue with the next resistance value ½R. However, it has been found that because of the small relative value of resistance which would be required for the next resistor, small tolerance changes in components would drastically change the positioning point of the beam. Thus, deterioration of the resistors could cause resistance changes of such magnitude as to be deleterious to the operation of the device. Therefore, instead of adding a ½R resistor for the next level, two R resistances in parallel have been added. When a count of 15 has been reached, instead of energizing a resistance with a value of ½R, one of the resistors with an R value is added in parallel with the first R resistance. Thus, if flip-flop 964 is energized or set by a signal on line 984, the output on line 988 which is coupled to amplifier 1008 causes a current to flow through magnetic deflection coil 1024, transistor 1022, current summing junction 1020 and resistor 996. If a signal is coupled to flip-flop 966 on line 1026, the output on line 1028 is coupled to amplifier 1010 which because of the value of resistor 998 causes twice the current to flow through deflection coil 1024, transistor 1022, current summing junction 1020 and resistor 998. If both flip-flops 964 and 966 are simultaneously set then the current flow through resistor 996 and 998 cause three times the current to flow through magnetic deflection coil 1024. Likewise, if flip-flop 968 is set four times the unit current flow through the circuit formed by deflection coil 1024, transistor 1022, current summing 1020 and resistor 1000. The output of flip-flop 970 energizes resistor 1002 through OR gate 1030. When flip-flop 970 is cleared and flip-flop 972 is set, the output from flip-flop 972 is coupled not only to resistor 1002 through OR gate 1030 but also through resistor 1004 via line 1032 thus the use of 2 resistors having R resistance in parallel are substituted for one ½R resistor. When both flip-flops 970 and 972 are set their outputs cause AND gate 1034 to produce an output which is coupled to resistor 1006 via line 1036.

Thus it will be seen that there are 32 different values of current which will flow through the deflection coil 1024, transistor 1022 and current summing junction 1020 to the combination of resistors 996–1006. Since the circuits are in push-pull operation, the currents through deflection coil 1038 are derived in a similar manner as explained for coil 1024. Likewise, the vertical deflection coils 1040 and 1042 and their driving circuits operate in a similar manner to that already discussed. Since the vertical push-pull deflection circuits are driven by four stages 974, 976, 978 and 980, there are 16 possible combinations and therefore 16 values of current which may flow through deflection coils 1040 and 1042. These 16 values of current provide 16 lines upon the face of the CRT. Also, the five stages 964–972 provide the possibility of 32 combinations and therefore 32 possible currents can flow through deflection coils 1024 and 1038 thus providing 32 characters for each line on the face of the CRT. Since it has already been stated that the data is entered into the stages of the M-register sequentially from the R-register, it can be seen that the first five stages of the M-register must be set (32 characters printed or spaces used on the first line) before stage 974 of the M-register can be set which will cause the vertical deflection coils to move the beam down one line. The first five stages will then have to be set again before the next output can cause the vertical deflection coils to move to the next line. It will therefore be seen that for every 32 current levels applied to the horizontal deflection coils, one current level will be applied to the vertical deflection coils causing the beam to move down one line whenever the preceding line is filled.

Condensers may be placed across the amplifiers to make them Miller integrators such as is shown by condenser 1009 across amplifier 1010. This is only necessary where extremely fast display systems are used. Thus, in slower machines, the beam can be given time to settle down before painting a character is started.

R-REGISTER

It will be remembered from FIG. 11 that the information stored in the M-register is used not only to position the beam on the face of the tube but is also coupled to the S-register which energizes that same location in the memory matrix to enable any character stored there to be read out and painted on the face of the tube. Also the output of the S-register is coupled back to the R-register where it is incremented by one and returned to the M-register. FIG. 13 discloses the R-register in detail and it will be seen that it includes nine flip-flop stages 1044–1060. OR gates 1062–1078 will produce signals on lines 1080–1096 respectively whenever they have as inputs signals from their respective AND gates 1062*a*, *b*, *c*, or *d* through gates 1078*a*, *b*, *c* or *d*. AND gates 1062*a*–1078*a* as well as AND gates 1062*b*–1078*b* all require X-to-R transfer signal on line 1098. AND gates 1062*a*–1070*a* also require an $X_L$-to-R signal on line 1110. This signal indicates that the data stored in the lower five stages of the X-register may be transferred to the R-register. The signals from the lower five stages of the X-register are then transferred on lines 1102–1110 to corresponding AND gates 1062*a*–1070*a* along with the $X_L$-to-R signal on line 1110 thus producing outputs from AND gates 1062*a*–1070*a* which cause outputs from OR gates 1062–1070 respectively. Also it is desired to transfer the complement of the signals stored in the lower five stages of the X-register to the corresponding stages of the R-register, a $\overline{X}_L$-to-R signal is presented on line 1112 to AND gates 1062*b*–1070*b* where in conjunction with the complementary outputs of the lower five stages of the X-register on lines 1114–1122 respectively, the respective AND gates 1062*b*–1070*b* produce outputs to OR gates 1062–1070 thus causing them to have outputs on lines 1080–1088 respectively.

In like manner, if it is desired to transfer the contents of the upper four stages of the X-register to the corresponding stages of the R-register, an $X_U$-to-R signal is applied to AND gates 1072*a*–1078*a* on line 1124. Applied to the same AND gates are the signals from the upper four stages of the X-register on lines 1126–1132. These gates produce output signals which pass through OR gates 1072–1078 on lines 1090–1096 respectively. Similarly, if it is desired to transfer the complementary bits of the upper four stages of the X-register to the corresponding stages of the R-register, a $\overline{X}_U$-to-R signal is coupled to AND gates 1072*b*–1078*b* through line 1134 where in conjunction with the complementary signals on line 1136–1142 respectively, AND gates 1072*b*–1078*b* produce output signals which are coupled to OR gates 1072–1078 respectively which then produce outputs on line 1090–1096 respectively.

If it is desired to transfer the signals from the S-register to corresponding stages of the R-register, an S-to-R transfer signal is coupled to AND gates 1062*c*–1078*c* through line 1144 where in conjunction with the signals from the individual stages of the S-register on lines 1146–1162, AND gates 1062*c*–1078*c* produce outputs which pass through OR gates 1062–1078 respectively thus causing outputs on lines 1080–1096 respectively.

Finally if it is desired to transfer the complement signals from the S-register to the R-register, an $\overline{S}$ to R transfer signal is coupled to AND gates 1062*d* to 1078*d* through line 1145 where in conjunction with the complement signals from the individual stages of the S-register on lines 1147–1163, AND gates 1062*d*–1078*d* produce outputs which pass through OR gate 1062–1078 respectively thus causing outputs on lines 1080–1096 respectively.

Thus, it may be seen that four different types of signals may be transferred to the various stages of the R-register. First the true outputs from the individual stages of the X-register may be transferred to the corresponding stages of the R-register. Also the complementary outputs of each stage of the X-register may also be transferred to corresponding stages of the R-register. As will be seen later on in the specification, this ability to transfer the complement signals from the X-register to the R-register enables the CRT beam to be backspaced and a character inserted or deleted. Finally, the contents of the S-register may also be transferred to corresponding stages of the R-register. This, as explained earlier, is the normal manner in which the data stored in the M-register is transferred to the R-register and incremented by one count.

A series of three steps is required in order for the R-register to increment any incoming signals by unit. During the first step, a pulse is applied via line 1164 to the set side of all flip-flops 1044–1060 causing each of them to be set to the "1" condition. During the second step, a pulse is applied via line 1166 to all AND gates 1168–1184 where in conjunction with the incoming signals on lines 1080–1096 respectively the flip-flops 1044–1060 are selectively cleared depending upon whether or not a signal is present on the input lines 1080–1096. It should be noted at this point that any incoming signal, X, $\overline{X}$, S or $\overline{S}$ are subject to a polarity inversion as they pass through the logical AND/OR elements 1062–1078 and 1062*a, b, c,* and *d* through 1078*a, b, c,* and *d*. Thus, the signals appearing on lines 1080–1096 are the inversions of the actual input signals to AND gates 1062*a, b, c,* and *d* through 1078*a, b, c,* and *d*. As an example, assume that a "1" signal appears on line 1102 to AND gate 1062*a* and assume also that all other input signals are present to AND gate 1062*a*. The output from AND gate 1062*a* is then coupled to OR gate 1062 which produces a "0" output on line 1080. Any output line 1080–1096 which has a "1" signal present on it will, when the selectively clear signal is applied to line 1166, clear the corresponding flip-flop to which it is connected through the appropriate AND gate. During the third step, after the flip-flops have been selectively cleared, a toggle pulse is applied via line 1168 to flip-flops 1044, 1046 and 1048 and through AND gate 1170 to flip-flops 1050, 1052 and 1054 and through AND gate 1172 to flip-flops 1056, 1058 and 1060. The output of each stage is so connected to the preceding stage that whatever data is stored in the register after each stage has been selectively cleared is automatically incremented by one. As an example, assume now that a pulse has been applied to line 1164 which sets all of the flip-flops of the R-register to a "1." Further, assume that the true outputs from the corresponding stages of the X-register are 101100101 and are connected as inputs to AND gates 1062*a*–1078*a*. Assume also that an X-to-R transfer signal is present on line 1098 and an $X_L$-to-R transfer signal is present on line 1100 as well as an $X_U$-to-R transfer signal present on line 1124. Thus, AND gates 1062*a*, 1066*a*, 1068*a*, 1074*a* and 1078*a* will have outputs coupled to OR gates 1062, 1066, 1068, 1074 and 1078 each of which will produce a "0" on its output line because of the polarity inversion that has taken place. OR gates 1064, 1070, 1072 and 1076 each will produce a "1" on their corresponding output line because of the polarity inversion. This means that while the input signals coupled to the respective AND gates are 101100101, the signals out of the corresponding OR gates are 010011010. When the selectively clear signal is applied to the clear side of all flip-flops 1044–1060 via line 1166, those OR gates producing a "1" signal will, in conjunction with the clear pulse on line 1166, clear the stage to which it is connected. Thus in the given example, flip-flop 1046 is cleared by the "1" signal on line 1082, flip-flops 1052 and 1054 are cleared with the respective signals on lines 1088 and 1090 and flip-flop 1058 is also cleared with the "1" signal on line 1094. Since all of the flip-flops 1044–1060 were initially set to "1" those that were cleared were returned to the "0" state and after they have been selectively cleared according to the above example, stages 1044–1060 respectively contain the following data 101100101. It will be noted that the stages of the R-register now contain the exact input signals which were applied as true outputs from the corresponding stages of the X-register. After it has been selectively cleared, flip-flop 1044 produces a "1" on line 1174 which is coupled both to the inverter 1176 and AND gate 1184. The output of inverter 1176 on line 1177 is a "0" and is coupled to AND gates 1178 and 1180 respectively of flip-flops 1046 and 1048. Since flip-flop 1046 has been cleared, it is producing a "0" on line 1182 which is coupled to AND gate 1184 thus preventing AND gate 1184 from producing a 1 on output line 1190 to AND gates 1170 and 1172 and thus these AND gates are prevented from producing outputs even though the toggle pulse is applied to them via line 1168. However, the toggle pulse is applied directly to flip-flop 1044 thus causing it to change states from a "1" to a "0." This means that line 1174 from flip-flop 1044 will carry a "0" which when it passes through inverter 1176 will cause a "1" on line 1177. This "1" is coupled to AND gates 1178 and 1180 of flip-flop 1046, 1048 respectively. Since AND gate 1180 of flip-flop 1048 has as inputs a toggle signal, a "1" signal on line 1177 from inverter 1176, and a "1" signal on line 1186 from flip-flop 1046, it will now change states. Further, since AND gate 1178 of flip-flop 1046 has as inputs a toggle signal as well as the "1" signal on line 1177 it can also change states. Since at no time has AND gate 1184 had three "1's" simultaneously as inputs, it has continued to produce a "0" on output line 1190 thus preventing AND gates 1170 and 1172 from toggling flip-flops 1050–1056. Therefore the flip-flops have been changed from their selectively cleared state of 101100101 to their toggled state of 011100101 or the input signal has been incremented by 1.

Consider as a second example that all of the flip-flops 1044–1060 of the R-register have been set to their "1" state by the pulse on line 1164 and that true signals which are being applied to the R-register from the stages of the X-register are 111110001. This means that out of OR gates 1062–1078 on lines 1080–1096 respectively will appear the signals 000001110. Since "1's" appear only on lines 1090, 1092 and 1094, only flip-flops 1054, 1056 and 1058 will be cleared thus leaving in the stages of the R-register the bits 111110001. This information then corresponds to the input information from the X-register. Since the first three stages 1044, 1046 and 1048 are in the "1" state, each produces a "1" on their corresponding output line 1174, 1182, and 1188 the three of which are connected to AND gate 1184 thus causing an output on line 1190 which is coupled to AND gates 1170 and 1172. Therefore, AND gates 1170 and 1172 will produce output pulses on lines 1192 and 1194 respectively whenever a toggle pulse is applied to them via line 1168. Because AND gate 1170 is producing an output signal on line 1192, both flip-flops 1044 and 1050 change state immediately upon application of the toggle pulse. As flip-flop 1044 changes state, a "0" is produced on line 1174 which when it passes through inverter 1176 becomes a "1" on line 1177 which is coupled to AND gates 1178 and 1180 of flip-flop 1046, 1048 respectively. At this time flip-flop 1046 is producing a "0" on line 1186 which is coupled to AND gate 1180 of flip-flop 1048 thus preventing that flip-flop from changing state immediately. However, as soon as flip-flop 1046 changes state it produces a "1" on output line 1186 which is then coupled to AND gate 1180 enabling flip-flop 1048 to change states.

Since flip-flop 1054 is initially in the "0" state and therefore producing a "0" on line 1196 which is coupled to AND gate 1202, AND gate 1202 will produce a "0" on output line 1204 which is coupled to AND gate 1172 thus preventing AND gate 1172 from producing an output signal whenever a toggle pulse is applied to it. However, AND gate 1170 does produce an output on line 1192 when a toggle pulse is applied to it on line 1168 and the pulse on line 1192 immediately causes flip-flop 1050 to change states. It cannot cause flip-flops 1052 and 1054 to immediately change states since initially flip-flop 1050 was producing a "1" signal on line 1198 which when it passed through inverter 1200 caused a "0" to be coupled to AND gates 1206 and 1208 of flip-flops 1052 and 1054 respectively via line 1204. However, as soon as flip-flop 1050 changes state, it will produce a "0" on line 1198 which will cause a "1" to be produced on line 1204 as the output of inverter 1200. This "1" on line 1204 is coupled to AND gates 1206 and 1208 of flip-flops 1052 and 1054 thus causing both flip-flops to change states simultaneously. The last three stages 1056, 1058 and 1060 cannot change states since AND gate 1172 was never enabled with a "1" signal on line 1204. Thus after toggling, the information stored in the stages of the R-register is 000001001 which as can be seen is the input information from the X-register incremented by one. It is clear that flip-flop 1056 can change states only when the preceding six stages, 1044–1054 have been set. The last three stages 1056, 1958 and 1060 then work in a manner similar to that described in relation to the first three stages 1044, 1046 and 1048 and second three stages 1050, 1052 and 1054. Thus it will be seen that whatever information is applied as inputs to the stages of the R-register, it will be incremented by one by the manner in which the stages of the R-register are interconnected. Of course, if all transfer signals were inverted the system would use a clear to "0" and selective set and would work as well as the present system.

S-REGISTER

During the painting cycle, the data in the S-register determines the location of the information in the memory which is not read out and used to paint a character. During the I/O cycle the data in the S-register determines where in the memory the incoming data will be stored or from where the output data to the computer is to be retrieved.

The S-register 28 in FIG. 11 and in FIG. 3 is shown in detail in FIG. 14. It includes nine stages 1210–1228 each of which may be set by a signal from the corresponding stages of the M-register, the N-register or the X-register. Since all stages of the S-register are identical, only stage 1210 will be discussed in detail. Thus stage 1210 may be set by signal from OR gate 1230 when any of AND gates 1234 or 1236 produce outputs. The M-to-S, N-to-S and X-to-X signals on lines 1238, 1240 and 1242 respectively are derived or produced by the circuitry shown in FIG. 11. Thus whenever an M-to-S transfer signal appears on line 38 and a signal from the M-register on line 1244 is coupled to AND gate 1232, AND gate 1232 produces an output which passes through OR gate 1230 setting stage 1210. Also if an N-to-S transfer signal appears on line 1240 and at the same time a signal from the N-register appears on line 1246, AND gate 1234 produces an output which passes through OR gate 1230 thus setting stage 1210. Finally, if an X-to-S transfer signal is present on line 1242 simultaneously with a signal from the X-register on line 1248, AND gate 1236 produces an output which passes through OR gate setting stage 1210. Thus, it may be seen that each of the stages 1210–1228 may be set by a signal from the M, N or X registers if a corresponding M-to-S, N-to-S or X-to-S transfer signal is also present on lines 1238, 1240 and 1242. All S-register stages are cleared whenever a timing pulse T41, T38, T21 and T13 occur simultaneously and produce a clear-S signal on line 1250.

DELETE FUNCTION ADDRESS CONTROL

N-register

N-register 26 in FIG. 3*b* is shown in detail in FIG. 15. It will be remembered the data in the N-register 26 is always two counts behind the data stored in the M-register. Thus, as explained previously, with a particular count stored in the M-register, the N-register will store in-counts. N-register 26 includes nine flip-flop stages 1252–stantaneous count stored in the M-register minus two 1268 each of which is coupled to both the true and complementary outputs of a corresponding stage of the R-register by lines 1270–1286 respectively. An R-to-N transfer signal occurs periodically, once every 32 microseconds, whenever timing pulse T41, T34 and T23 are present on lines 1288, 1290 and 1292 simultaneously which cause AND gate 1294 to produce an output on line 1296 which is coupled to both the clear and set side of each flip-flop through an AND gate such as 1298, 1300, 1302 and 1304. Thus whenever a signal from the R-register is received on lines 1270 and simultaneously AND gate 1294 produces a signal on line 1296, either AND gate 1298 or AND gate 1300 produces an output which sets or clears the first flip-flop 1252. Since the NOT side of each of the R-register stages is connected to the set side of the corresponding stage of the N-register, it will be understood that the complement of each stage of the R-register or $\overline{R}$ is always transferred to the corresponding stage of the N-register. The remaining flip-flops operate in a similar manner.

I/O ADDRESS CONTROL

X-register

X-register 24 in FIGS. 3, 3c and 3d is shown in detail in FIG. 16 and includes nine stages of flip-flops each of which can accept true or complement outputs from corresponding stages of the R-register. Since stages 1306–1314 operate in exactly the same manner with exactly the same input signals and since stages 1316–1322 also operate in exactly the same manner with the same input signals, for purposes of simplicity, only stages 1306 and 1316 will be discussed in detail. Consider first stage 1306. If an R-to-X transfer signal is present on line 1324 and the true output from the corresponding stage of the R-register is present on line 1326 simultaneously, AND gate 1328 will produce an output which passes through OR gate 1330 setting flip-flop 1306 and thus causing it to assume the same state as the corresponding stage of the R-register. Assume now that a $\overline{R}$-to-X transfer signal is present on line 1332 simultaneously with the complement signal from the corresponding stage of the R-register on line 1334. AND gate 1336 will then produce an output which passes through OR gate 1330 thus setting flip-flop 1306 to the complement of the corresponding stage in the R-register. The clear $X_L$ signal on line 1338 is coupled to the clear side of flip-flops 1306–1314 and they are all cleared simultaneously. The upper four stages 1316–1322 operate in a manner similar to the lower five stages except they have their own $R_U$-to-$X_U$ transfer signal on line 1340 and also their own $\overline{R}_U$-to-$X_U$ transfer signal on line 1342. Thus if a signal from the corresponding stage of the R-register is present on line 1344 simultaneously with an $R_U$-to-$X_U$ transfer signal on line 1340, AND gate 1340 produces an output pulse which passes through OR gate 1350 thus setting stage 1316 to the same state as the corresponding stage of the R-register. However, if a complement signal from the corresponding stage of the R-register is present on line 1346 and a $\overline{R}_U$-to-$X_U$ transfer signal is present on line 1342, then AND gate 1352 produces an output pulse which passes through OR gate 1350 thus setting stage 1316 to indicate the complement of the information stored in the corresponding stage of the R-register. Stages 1318–1322 operate in a similar manner as stage 1316. All four upper stages 1316–1322 are cleared simultaneously by the application of a clear $X_U$ pulse on line 1354.

AND gate 1307 receives inputs from flip-flops 1310, 1312 and 1314 on lines 1321, 1323, and 1311. Thus when flip-flops 1310, 1312 and 1314 are set, four more input pulses will set all of stages 1306–1314 and, therefore, the output of AND gate 1307 on line 1309 may be used to ring a bell or activate a light or both to indicate that only four more characters can be placed on that line. Similarly, AND gate 1305 receives inputs from flip-flops 1316, 1318, 1320 and 1322 and produces an output on 1315 which may be used to indicate that the last line is being used.

It was stated previously that the keyboard had provisions for tabulating keys whereby the cursor could be jumped either 2, 4, 8 or 16 spaces or 2, 4 or 8 lines. The apparatus for performing this feature is shown in FIG. 16. Consider the lower five stages 1306–1314 the outputs of which represent the 32 positions on any one line. It will be noted that the output of stages 1306–1312 is coupled to OR gates 1307, 1309, 1311 and 1313 respectively via lines 1317, 1319, 1321 and 1323 respectively. Also coupled to OR gates 1307–1313 in various combinations are tabulation inputs Tab 2, Tab 4, Tab 8 and Tab 16 on lines 1325, 1327, 1329 and 1331. The tabulation signals on lines 1325–1331 are derived from a special set of keys in juxtaposition with the standard keyboard. If key Tab 2 is depressed, a signal appears on line 1325 which passes through OR gate 1307 to the corresponding stage of the R-register. Since the R-register always adds "1" to the data it receives and since the output of OR gate 1307 represents a binary "1," the incremented output of the R-register represents a decimal binary "2" and is transferred back to the X-register in the manner previously explained. Thus the X-register is incremented by "2" thus causing the cursor to move up two spaces. Similarly if key Tab 4 is depressed, the signal generated on line 1327 is coupled to both OR gates 1307 and 1309 causing outputs from them representing a decimal "3" which is incremented by "1" in the R-register and the decimal "4" returned to the X-register. Tab 8 key works in a like manner with OR gates 1307, 1309 and 1311 all receiving the signal generated by depressing the Tab 8 key. This decimal "7" is incremented to form a decimal "8" by the R-register. OR gates 1307, 1309 1311, and 1313 all receive inputs when the key Tab 16 is depressed. This decimal "15" is incremented by the R-register to form a decimal "16."

The upper four stages of the X-register, 1316–1322, produce outputs which represent the 16 possible lines on the face of the CRT. OR gates 1333, 1335 and 1337 receive inputs from stages 1316, 1318 and 1320 respectively on lines 1339, 1341 and 1343 respectively as well as Tab 2, Tab 4 and Tab 8 signals on lines 1345, 1347 and 1349 respectively. Signals from either the stages 1316, 1318 and 1320 or the Tab signals will cause outputs from the OR gates 1333, 1335 or 1337 which will cause the cursor to step from one line to the next in the manner describing the lower five stages of the X-register.

EXTERNAL SWITCH READ OUT CONTROL

As stated previously the display buffer may be loaded not only by the computer output or the keyboard input but also by an external switch arrangement. This is accomplished when the appropriate key on the keyboard is pressed which causes the X-register to be cleared and then to sequentially scan the external switch arrangement causing the switches to read out their data to the corresponding stages of the Z-register. For purposes of illustration only, FIG. 17 shows two groups of drivers with eight drivers in each group. The first eight drivers are sequentially scanned with each driver causing a bank of up to six switches to have their information read out and stored in the Z-register and then the second eight drivers are sequentially scanned and the information from each bank of switches scanned, read out and stored in the Z-register. The scanning action is caused by sequentially incrementing the X-register. This is done by transferring its information to the S-register which indicates the appropriate location in memory that the data provided by the switch arrangement can be stored and then the data is transferred from the S-register to the R-register where it is automatically incremented by one and from there R-register is returned to the X-register. This incremented data causes the next switch to be scanned. That information in the X-register is then once more transferred to the S-register where the scanned data is again stored in the memory at the address indicated by the S-register and, from the S-register, the data is once more transferred to the R-register where it is incremented and transferred back to the X-register. This cycle continues until all switches have been scanned.

In FIG. 17, the manner in which the true and complement outputs of the lower three stages of the X-register 1306, 1308 and 1310, are connected to AND gates 1360–1374, cause AND gates 1360–1374 to convert the binary input to a decimal output between 0 and 7. Therefore if the lower three stages of the X-register 1306, 1308 and 1310 are clear, their outputs respective lines 1376, 1378 and 1380 are each connected to AND gate 1360 thus causing an ouptut from AND gate 1360 on line 1382. Also, if all three of the lower stages of the X-register 1306, 1308 and 1310 are set, their outputs on lines 1384, 1386 and 1388 respectively are coupled to AND gate 1374 which causes AND gate 1374 to produce an output on line 1390. In a similar manner, any one of the AND gates 1360–1374 may be caused to produce an output depending upon the particular combination of outputs from the lower three stages of the X-register. AND gates 1392 and 1394 determine whether switch banks 1396–1396*g* or 1398–1398*g* are connected to the six stages of the Z-register. Thus, AND gates 1400–1400*g* cannot produce outputs unless they have as one input a signal from AND gate 1394. Similarly AND gates 1402–1402*g* cannot produce outputs unless they have as one input a signal from AND gate 1392. Flip-flop 1312 of the X-register provides one of the inputs to each of AND gates 1392 and 1394. The other input to each of these AND gates is supplied by a signal from the keyboard on line 1406 which is an Enable-Switch Readout signal. Thus, whenever the external switches are to be scanned, the proper key on the keyboard is depressed, the X-register is cleared and the first switch bank scanned. The contents of the X-register is then transferred to the S-register which determines the location in memory at which the scanned information may be stored. The data in the S-register is then transferred to the R-register where it is incremented by one and then returned to the X-register where the cycle begins again.

The diodes 1403*a*–*p* are to isolate each of the switches to prevent false readout by several paths through switch banks.

SPECIAL FUNCTION CIRCUIT

General description

It was stated previously that the operator has message editing capability which means that he must be able to move the cursor right, left, up, down, back-space, line feed, return cursor to line one, and return carriage to 0. It was also stated previously that the X-register contains the address of the cursor and any character "painted" on the face of the CRT will be painted only at the address stored in the X-register whenever the data in the X-register compares to the data stored in the M-register. Further, the upper four bits of the X-register contain data which represents one of 16 lines on the face of the CRT while the lower five bits of the X-register represent 32 individual positions on any one of the 16 lines. Thus, if it is desired to move the crusor from one line to the other, the upper four bits of the X-register must be either incremented or decremented while if it is desired to move the cursor either right or left, the lower five bits of the X-register must be either incremeted or decremented. It will also be remembered that whenever a key on the keyboard is depressed, the particular code is stored in individual stages of the C-register. From the C-register, the information can be transferred to the Z-register and from thence to the memory. Thus, normally whenever a key on the keyboard is depressed, that information is stored during the I/O cycle of operation at the location in the memory determined by the data in the X-register and is "painted" on the face of the CRT during the painting cycle. Thus, the cursor automatically steps to the right with the depression of each keyboard key as explained previously. This means that anything previously stored in that memory location is destroyed when the cursor steps to that memory location and the new information is stored therein. However, there are occasions, such as when the message is edited, when it is necessary to be able to move the cursor up, down, right or left without destroying the information in the memory and therefore without storing any new information in the memory. This can be accomplished when the function keys are depressed in that the special function keys produce a function bit which prevents the information in the C-register from being stored in the memory.

Detailed description

FIGS. 18*a* and 18*b* disclose the circuitry necessary for moving the cursor up, down, right or left.

Consider for a moment that the cursor needs to be moved up one line without destroying the information at the new location in the memory. This means that a function bit must be produced when the proper key is depressed which will prevent information from being stored in the Z-register and which will also cause the upper four bits of the X-register to be decremented. To decrement the upper four bits of the X-register, the complementary outputs of the upper four bits of the X-register or $\overline{X}_U$ is transferred to the correspondng stages of the R-register where that information is automatically incremented by one count and the complementary outputs of the upper four bits of the R-register or $\overline{R}_U$ is transferred to the corresponding stages of the X-register. When incrementing or decrementing lines the lower 5 bits of R are always set to 11111 to give a carry bit to upper 4 bits. Thus, as an example, if the bits 0110 are stored in the $X_U$, then $\overline{X}_U$, which is transferred to the corresponding stages of the R-register, is 1001. Since the R-register adds one count automatically to the incoming data, $\overline{X}_U+1=0101$. Since $\overline{R}_U$ is then transferred back to the corresponding stages of the X-register and $\overline{R}_U=1010$ it will be seen that $X_U$ has been decremented by "1" count. This means then that the cursor will be moved from the line on which it was located to the preceding line.

Assume now that it is desired to move the cursor left without destroying the information stored in the memory in the new location. This means that a function bit must be produced when the proper key is depressed which will prevent the information in the C-register from being stored in the memory through the Z-register and will also cause the lower five stages $X_L$ to be decremented. $X_L$ is decremented in a manner similar to $X_U$ described above. That is, $\overline{X}_L$ must be transferred to the corresponding stages of the R-register where it is incremented by one count automatically and $\overline{R}_L$ is then transferred back to the corresponding stages of $X_L$. Consider that $X_L=10110$ and $\overline{X}_L=01001$. When $\overline{X}_L$ is transferred to the corresponding stages of the R-register and incremented by one count automatically, the output of $R_L=11001$ and $\overline{R}_L=00110$ which it will be seen is $X_L$ decremented by one. It will be realized, of course, that if the cursor is in the first position of either of lines 2–16 and the cursor is decremented, it must move to the last or 32nd position of the preceding line. Therefore, the upper four stages are also decremented simultaneously with the lower four stages. In other words, the data in all 9 stages of the X-register is coupled to the corresponding stages of the R-register and the data in the entire 9 stages is decremented by one count.

Assume now that it is desired to move the cursor down without destroying the information stored in the new location. Again a function bit will be produced for the same reasons given above and $X_U$ must be incremented by one. To increment $X_U$ by one, it is merely required that the data stored in the upper four stages of the X-register be transferred to the corresponding stages of the R-register where one count is automatically added to the incoming data and the result transferred back to the corresponding stages of the X-register. Therefore, if $X_U=1010$, and that information is transferred to the R-register and incremented by one count, the result is 0110 which is transferred back to the corresponding stages of the X-register.

Similarly, if it is desired to move the cursor right, it is merely required to increment $X_L$ which requires that the data stored in the lower five stages of the X-register be transferred to the corresponding stages of the R-register where one count will be added automatically and the result will then be transferred back to the corresponding stages of the X-register. Again, it will be appreciated that if the cursor is in the last or 32nd position of a line, and it is incremented, it must move to the first position of the following line. Again, therefore, all stages of the X-register are transferred to the R-register and are incremented by one count.

If it is desired to return the carriage to 0 it is merely required that the lower five stages of the X-register be cleared. Therefore, whenever the carriage return key is depressed, a function is produced logically so the information stored at the previous locations is not destroyed.

If it is required to back-space, the same process takes place as when the cursor is moved left except that no function bit is produced and therefore the data stored in the location to which the cursor is moved will be destroyed and new data will be stored therein.

Similarly, if the line-feed key is depressed, the same operation takes place as when the cursor is moved down except that a function is produced logically and, therefore, again any information stored in the location on the line to which the beam moves will not be destroyed and new information may be read out or stored therein.

From the earlier discussion of FIG. 11, it will be recalled that whenever a normal keyboard key is depressed, or an input received from the computer or external switch arrangement and I/O signal is produced and the input data is stored in the memory at the location specified by the data stored in the X-register. This means that whenever an I/O signal is produced, the cursor should be stepped to the right one place to enable the next input character to be painted in the next location in the screen and stored in the next location in the memory. It may be seen in FIG. 18*a* that whenever an I/O signal is present on line 1408, OR gate 1410 produces a signal on line 1412 which causes two operations to take place. First, it is coupled to AND gates 1414, 1416, 1418, 1420 and 1422 where, if signals are present from the lower five stages of the X-register, each AND gate will produce a signal which sets the corresponding stage of the R-register. Thus, whenever the $X_L$-to-R signal appears on line 1412 AND gates 1414–1422 will enable the data stored in the corresponding stages of the X-register to be transferred to the corresponding stages of the R-register. Similarly, the I/O signal on line 1408 is also coupled to OR gates 1510 which causes a similar action to take place in regard to the data in the upper four stages of the X-register. Further, when the appropriate timing signal appears on line 1426, AND gates 1428 and 1522 will produce outputs on line 1430 and 1524 respectively which are $R_L$-to-$X_L$ and $R_U$-to-$X_U$ signals respectively. The $R_L$-to-$X_L$ signal is coupled to AND gates 1432, 1434, 1436, 1438 and 1440 which enable the data from the lower stages of the R-register which have been incremented by one count to be returned and stored in the corresponding stages of the X-register. The $R_U$-to-$X_U$ signal causes a similar action to take place with respect to the data in the upper four stages of the R-register. It will be seen that in normal operations whenever a normal keyboard character key is depressed or an input is received from the computer or the external switch arrangement, an I/O signal is produced which automatically causes the data in all nine stages of the X-register to be transferred to the S-register and thence to the R-register where it is incremented by one count and then is returned to the corresponding stages of the X-register. Therefore, the cursor is incremented automatically each time a normal keyboard key is depressed.

If it is desired to return to cursor to the first position of line 1, a clear cursor key is depressed which produces a signal on line 442 which is coupled to both OR gates 1444 and 1446 which produce outputs on line 1448 and 1450 respectively. These signals along with appropriation timing signals on line 4126 cause AND gate 1452 and 1454 to produce outputs on lines 1456 and 1458 both of which are coupled to the clear side of each stage of the X-register, thus causing the complete X-register to be cleared which returns the cursor not only to line 1 but to the first position in line 1.

Whenever the function keys are depressed, and enable signal is produced on line 1460 which is coupled to each of the AND gates 1462, 1464, 1466, 1468, 1470, 1472 and 1474. Further, if the depressed key produces a function bit, that bit is present on line 1476 and is coupled to AND gates 1462, 1468, 1470 and 1474. If a function key is depressed which does not produce a function bit, a signal appears on line 1478 and is coupled to AND gates 1466 and 1472.

Assume that it is desired to move the cursor up one line and the proper key on the keyboard is depressed. This key produces a signal on line 1480 as well as a function bit on line 1476 and with the enable signal present on line 1460, AND gate 1474 produces an output on line 1480. This signal is coupled to OR gate 1482 which produces an output on line 1484 which causes two operations to take place. First, it is coupled to AND gates 1486, 1488, 1490 and 1492 which enable the data stored in the upper four stages of the X-register to be transferred directly to the corresponding stages of the R-register. The signal on line 1484 is also coupled to AND gate 1494 where, in conjunction with the proper timing signal on line 1426, AND gate 1494 is caused to produce an output signal on line 1496 which is coupled to AND gates 1498, 1500, 1502, 1504 and enables the complemented outputs of the upper four stages of the R-register (which have been incremented) to be transferred back to the corresponding stages of the X-register. Thus, with a move-cursor-up signal on line 1480, it can be seen that the data stored in the upper four stages of the X-register was transferred to the corresponding stages of the R-register wherein it was incremented by one count and the complement thereof transferred back to the corresponding stages of the X-register thus decrementing the information in the upper four stages of the X-register by one count and causing the cursor to move back one line or to move up. This was accomplished by decrementing the upper four stages of the X-register by one count.

Assume now that it is desired to move the cursor down one line or in other words to move the cursor to the next succeeding line. When the proper key on the keyboard is depressed, a move-cursor-down signal is produced on line 1506 along with a function bit signal on line 1476 as well as an enable signal on line 1460. All three of these signals are coupled to AND gate 1468 which produces an output on line 1508 which is coupled to OR gate 1510. The output of OR gate 1510 on line 1512 causes two operations to take place. First, it is coupled to AND gates 1514, 1516, 1518 and 1520 enabling them to transfer the true output of the upper four stages of the X-register to the corresponding stages of the R-register. Secondly it is coupled to AND gate 1522 where, along with proper timing signals on line 1426, AND gate 1522 produces an output signal on line 1524 which is coupled to AND gates 1526, 1528, 1530 and 1532 which enable the true outputs from the upper four stages of the R-register to be transferred to the corresponding stages of the X-register. Thus it can be seen that to move the cursor down or to the next line requires that the upper four stages of the X-register be incremented by one count and this is accomplished by transferring the data in the upper four bits of the X-register directly to the corresponding stages of the R-register where they are automatically incremented by one count and the result is transferred back to the corresponding stages of the X-register.

Assume that it is desired to move the cursor to the right one space. When the proper key on the keyboard is depressed a move-cursor-right signal is produced on line 1534 along with the function bit on line 1476 and an enable signal on line 1460. All three of these signals are coupled to AND gate 1464 which produces an output on line 1536. This signal is coupled to OR gates 1410 and 1510 which produce output signals on lines 1412 and 1512 which causes the exact same operations to take place as described above when a normal key on the keyboard is depressed and an S-to-R transfer signal is produced on line 1408.

If it is desired to move the cursor left, the proper key on the keyboard is depressed and a move-cursor-left signal is produced on line 1538 as well as a function bit on line 1476 and an enable signal on line 1460. These three signals are all coupled to AND gate 1462 which produces an output line on line 1540. This signal is coupled to OR gates 1542 and 1482 which produce output signals on lines 1544 and 1484. The signal on line 1544 causes two operations to take place. First, the signal is coupled to AND gates 1546, 1548, 1550, 1552 and 1554 enabling these AND gates to couple the complements of the lower five stages of the X-register to the corresponding stages of the R-register. Also the signal on line 1544 is coupled to AND gate 1556 where, in conjunction with the proper timing signals on line 1426, AND gate 1556 produces an output on line 1558 which is coupled to AND gates 1560, 1562, 1564, 1566 and 1568 enabling them to transfer the complement of the lower five stages of the R-register to the corresponding stages of the X-register. The signal on line 1482 in a similar manner enables the complement of the data in the upper four stages of the X-register to be transferred to and from the corresponding stages of the R-register. Thus in order to move the cursor left, all nine stages of the X-register have to be decremented and to accomplish this the complement of the nine stages of the X-register are transferred to the corresponding stages of the R-register where one count is added and the complement of the result returned to the corresponding stages of the X-register.

When it is desired to back-space the cursor, the back-space key is depressed and a signal is produced on line 1570 as well as an enable signal on line 1460 and a signal on line 1476 which represents that a function bit has been produced. These three signals are coupled to AND gate 1472 which produces an output on line 1572. This signal on line 1572 is coupled to OR gates 1542 and 1482 which produce output signals on line 1544 and 1484 and the same operations are performed as when the move-cursor-left key is depressed. That is, all nine stages of the X-register have to be decremented. This is accomplished by transferring the complement of the nine stages of the X-register to the R-register where one count is added and the complement of the result is returned to the corresponding stages of the X-register. The difference between the back-space operation and the move-cursor-left operation is only the position of the keys on the keyboard. Thus, the back-space key switch could be wired in parallel with the step left key switch. It occupies the position normally allocated for a similar key on an electric typewriter.

If it is desired to return the carriage to the beginning of the line, the carriage return key is depressed and a signal is produced on line 1570. However, this time no function bit is produced on line 1476, but a signal is present on line 1478 as well as the enable signal on line 1460. All three of these signals are coupled to AND gate 1470 which produces an output on line 1574. The signal on line 1574 is coupled to OR gates 1444, 1510 and 1578. OR gate 1444 produces an output on line 1448 that is coupled to AND gate 1452 where in conjunction with the proper timing signals on line 1426, AND gate 1452 is caused to produce an output signal on line 1456. This signal is coupled to the clear side of the lower five stages of the X-register thus clearing them and causing the cursor to be returned to the 0 position in whichever line it happens to be located. OR gate 1510 operates in the manner previously described to cause the cursor to move to the next succeeding line. OR gate 1578 produces a signal via line 1580 which inhibits any C-to-Z data transfer. This is necessary whenever it is desired that no data representing a carriage return be stored in the memory. If it is desired to store such data in order that an appropriate symbol be painted on the cathode ray tube viewing screen, the inhibit signal on line 1580 must be removed.

Similarly, if the Line Feed key is depressed, a signal appears on line 1506. Again, no function bit is produced on line 1476 but a signal is present on line 1478 as well as on line 1460. All three of these signals are coupled to AND gate 1466 which produces an output on line 1576. The signal on line 1576 is coupled to OR gates 1510 and 1578. OR gate 1510 operates in the manner previously described to cause the cursor to move to the next succeeding line. OR gate 1578 operates in the manner previously described to produce a C-to-Z inhibit signal for the same reasons previously given.

Thus, as on the standard typewriter keyboard, when the carriage return key is depressed the carriage not only returns but also steps up to the next line.

DIODE CODING CIRCUIT ARRAY

FIG. 19*a* discloses the complete matrix array of matrices capable of storing 64 characters. The black dots connecting the vertical and horizontal lines represent diodes as shown in particular in FIG. 7 relating to diode coding circuits 292, 294, 296 and 298. The matrix array of FIG. 19*a* is an 8 by 8 array and the various characters which the coding matrices represent are shown in FIG. 19*b*. Thus, the character represented by the diode coding matrix in row 1, column 1 is shown to be a D in FIG. 19*b* It will be noted that row "0," columns 0, 3, 4 and 5 and row 5, column 7 do not show any diode connections. These matrices are reserved to store special codes representing functions which are not normally "painted" on the face of the CRT but which it may be desired to transmit to the computer and, therefore should be visible on the CRT screen. Thus, if it is desired to transmit a "carriage return" signal to the computer, a special code may be stored in the memory as well as in the matrix at the junction of row 0, column 3. The code stored in the diode coding circuit would cause a special character to be "painted" on the CRT screen which represented a "carriage return" which would be visible to the operator. In like manner, special codes may be available for carriage return line-feed, space, and EOM (End-of-Message).

It may be desired to transmit a message "painted" on the CRT screen to the computer no matter how long or short the message. In other words, only one line of characters or less on the CRT screen may form the complete message to be transmitted to the computer. Obvious it is not desirable that all 512 characters be transmitted to the computer since not only does this operation require time but it also requires that previous data be erased or all "0's" entered in those stages in the memory. In the present invention the EOM or end-of-message signal causes the transmit operation to revert to the receive operation thus stopping the transmission of data to the computer.

If it is desired to erase all characters on the CRT screen, a special "erase" key is depressed which stores all zeroes in the 512 bit memory which, of course, cause all characters on the CRT screen to disappear. The cursor is also returned to line 1, position 1 by the clearing of all stages of the X-register.

SUMMARY

The entire operation of the inventive character generation and display system may be summarized with reference to FIGURES 20*a* and 20*b*. Wherever possible, elements are numbered with the numbers they are given in the other drawings.

Cathode ray tube 7 includes a grid for an intensity control means, a viewing screen for displaying *n* lines of alphanumeric characters with N said characters per line, and first and second beam deflection means, said first deflection means including first and second electromagnetic deflection coils for positioning said beam at any one of said N character locations in any one of said *n* lines and said second deflection means including first and second deflection plates for tracing one of said alphanumeric characters while said beam is positioned in any one of said locations by said first beam deflecting means.

Character Generation Control Means 1584 accepts and stores binary coded data signals representing alphanumeric characters and utilizes one of said signals to activate a particular one of a plurality of character synthesizing circuits. The Character Generation Control Means 1584 includes a Magnetic Memory Means 1 for storing said binary coded data signals in a plurality of memory locations representative of *n* lines of alphanumeric characters with N said characters per line, each of said locations in said memory corresponding to a character location on said cathode ray tube screen. Also included is an Input Circuit including C-register 16 and Z-register 18 each of which consists of a plurality of binary elements for receiving input data in the form of said binary coded data signals which are representative of said alphanumeric characters. Unit 1581 represents means for producing identifying signals in the form of I/O or function signals for each character represented by said binary coded input data. Unit 1581 could include a standard computer output channel, a keyboard associated with the display unit (which is similar to a standard electric typewriter keyboard), any special type keyboard, or any special input switch arrangement. Timing Unit 2 produces a first pulse which represents an Input/Output cycle and sequentially follows the first pulse with a second which represents a Character Tracing cycle although which pulse is first and which pulse is second is not important. The Input Circuit transfers the binary coded data from Unit 1581 to Memory 1 for storage during said Input/Output cycle and transfers said data from said Memory to said Input Circiut during said Tracing cycle. Converting means 1586 receives the binary coded data transferred from Memory 1 during said Tracing cycle only and converts said data to signals representing decimal quantities. These signals are then used as row and column selection signals for the Character Tracing Control Circuit Means or Character Generator 12.

The Character Tracing Control Circuit Means or Character Generator 12 is coupled to the Character Generation Control Means 1584 and, when activated by said Character Generation Control Means, produces digital signals which are coupled to the first and second electrostatic deflection plates and the intensity control means of the cathode ray tube 7 to cause the cathode ray tube electron beam to trace a series of intensity controlled line segments on said screen as defined by *x* and *y* coordinates which form a character. Character Generator 12 includes a matrix array 30 of individual character synthesizing circuits 1590 (shown in detail in FIGS. 7*a* and 7*b*) electrically arranged in a plurality of rows and columns, each of said circuits being capable of producing output signals respectively indicative of a particular alphanumeric character and comprising a plurality of input and output lines, a plurality of diodes coupling predetermined ones of said output line to predetermined ones of said input lines, means coupling said input lines of each character synthesizing circuit in any one column in series with corresponding input lines of all other of said circuits in said column, means coupling said output lines of each character synthesizing circuit in any one row in series with corresponding output lines of all other said circuits in said row, means coupled to said array for selectively activating the output signals of any one of said circuits, said activating means comprising Phase Generator 36 for producing a group of sequential scanning signals equal in number to the input lines of one of said character synthesizing circuits, A-select circuit 32 which includes a first plurality of control circuits equal in number to said columns of character synthesizing circuits, and B-select circuit 34 which includes a second plurality of control circuits equal in number to said rows of character synthesizing circuits. Any one of said control circuits in said first and second plurality of control circuits includes a plurality of transistors equal in number to the number of input lines in a corresponding column or the number of output lines in a corresponding row, said transistors having a base element, a collector element and an emitter element. See FIGS. 7*a* and 7*b* for details. The collector of each transistor in each control circuit of said first plurality of control circuits (A-select circuit) is coupled to a corresponding one of said input lines in a corresponding column. Thus, as shown in detail in FIG. 7*a*, the collector of each of transistors 332–346 is coupled to a corresponding one of the input lines in the first column. Further, the base of each transistor in any one of said first plurality control circuits is coupled to a common junction (316 in FIG. 7*a*) thereby forming groups of as many first common junctions as there are columns. Thus, in FIG. 7*a* it will be seen that the base of each of transistors 332–346 is coupled to a common junction to which columns select line 316, $A_0$, is connected. Also, column select line 330, $A_7$, is coupled to a common junction to which the base of each transistor in the remaining control circuit in the A-select circuit shown in FIG. 7*a* is connected. The converting means 1586 in said Character Generation Control means 1584 produces column selection signals equal in number to said common junctions in said A-select circuit 32. Each one of the common junctions is coupled to a corresponding one of said column selection signals from said converting means. Also, individual ones of the sequential scanning signals from Phase Generator 36 are coupled in parallel to corresponding ones of the emitters of all said transistors in all said first control circuits 32. Thus, as shown in FIG. 7*a*, the first sequential signal on line 348 is coupled in parallel to the emitters of transistors 332 and 414. Similarly, the second sequential signal on line 350 is coupled in parallel to the emitters of transistors 334 and 448. The remaining sequential signals are coupled to the emitters of the remaining transistors in a like manner. When the sequential scanning signal is coupled to the emitter of a transistor whose base has a column select signal applied thereto, that transistor conducts and produces a signal on its collector that is coupled to one of the respective input lines of that column. Thus, in FIG. 7*a*, if a sequential scanning signal is applied via line 348 to the emitter of transistor 332 and if simultaneously a column select signal is applied to the first common junction through A-select line 316, $A_0$, transistor 332 only will conduct and produce a signal on its collector which is coupled to input line 416. The emitter of each transistor in any one of the said second plurality of control circuits, B-select circuit 34, is coupled to one of the output lines of a corresponding row. Thus, in FIG. 7*b*, transistor 380 has its emitter coupled to output line 396 of row *n*. Similarly, the remaining transistors in that group have their emitters coupled to a respective one of the output lines of Row *n*. Here also, the base of each transistor in each of the control circuits in the B-select circuit 34 is coupled to a second common junction thereby forming as many groups of second common junctions as there are rows. Thus, in FIG. 7*b* it can be seen that the base of each of transistors 380–394 is coupled to a common junction to which row select line 364, $B_0$, is connected. Also, row select line 378, $B_7$, is coupled to one of said second common junctions to which the base of each of transistors 428–442 is connected. The converting means 1586 in said Character Generation Control Means 1584 produces row selection signals equal in number to said second common unctions in said B-select circuit 34. Each one of the second common junctions is coupled to a corresponding one of said row selection signals from said converting means. Thus, Z-register 18 produces six output signals which are converted by converting means 1586 into 8 column selection signals and 8 row selection signals. When a particular column is selected and sequential scanning signals are applied to the bases of the transistors in the corresponding control circuit, each of said transistors conduct sequentially causing sequential signals to be applied to the input lines of the selected column. Simultaneously, the control circuit in the row which has been selected has a row select signal applied to the base of the transistors therein and those transistors will conduct whenever a signal is coupled to them through a respective output line which is coupled by a diode to an input line which has a signal applied to it. Thus, output signals appear on the collectors of each of the transistors in the B-select circuit 34 which are in the selected row and which are conducting. Output Circuit Means 35, shown in FIG. 7*b*, receives the signals from the selected character synthesizing circuit in Character Generator 12. Output Circuit Means 35 receives the outputs from all rows in parallel and produces first, second and third groups of binary digital signals as outputs. These groups respectively represent the desired beam *x*-coordinate, the desired beam *y*-coordinate and the desired intensity of each said line segment. This can be seen clearly in FIG. 7*b*. These outputs are received by first, second and third groups of bistable storage devices respectively shown in FIG. 8 as flip-flops 620–624. The outputs of these flip-flops represent respectively the beam *x*-coordinate, *y*-coordinate and line segment intensity and are coupled respectively to the first electrostatic plate means, second electrostatic plate means and intensity control means of the cathode ray tube by units 14 and 15. Units 14 and 15 consist of a plurality of groups of amplifiers 680, 688 and 696 (see FIG. 10), the number of groups of which are equal to the number of groups of bistable storage devices or elements 1590, 1592 and 1594 in FIG. 20*b*, a plurality of driving circuits 788, 789 and 812 equal in number to the number of amplifier groups, each of said driving circuits having an input and an output, said outputs representing respectively said beam *x*-coordinates, said *y*-coordinates and said intensity and means coupling in parallel the outputs of each group of amplifiers to the input of said corresponding driving circuit. The parallel coupling means includes a plurality of groups of resistors equal in umber to the number of groups of said amplifiers, the resistors in each of said groups having resistance values which form a geometric progression according to the equation R, ½R, ¼R . . .

$$\frac{1}{2^{n-1}}R$$

where *n* equals the number of resistors in any one of said groups. FIG. 10 shows these resistors and amplifiers clearly.

The General Address Control 6 includes Beam Positioning Means 1596 which is coupled to the first and second electromagnetic deflection coils and the Character Generation Control means 1584. The Beam Positioning means includes a first plurality of bistable storage devices 20 for storing as binary data the instantaneous *x*, *y* coordinates of the beam position, said bistable storage devices including a first group of *p* bistable elements (974, 976, 978 and 980 in FIG. 12) for producing signals indicative of n lins on the CRT screen according to the equation $2^p=n$ and a second group of *p* bistable elements (964, 966, 968, 970 and 972 in FIG. 12) for producing signals indicative of N characters per line according to the equation $2^p=N$. The Beam Positioning means also includes means coupled to said first bistable storage devices 20 and said timing means 2 for automatically and successively incrementing said stored binary data by one count during said tracing or painting cycle. The incrementing means includes second and third pluralities of bistable storage devices 28 and 22 respectively, each plurality of which is equal in number to said first plurality of bistable storage devices, means coupling the output of said first plurality of storage devices 20 to corresponding ones of said second plurality of storage devices 28, means coupling the output of said second plurality of storage devices 28 to said memory means 1 of said character generation control means 1584 to read out the data stored in said memory at a location determined by said data in said second plurality of bistable devices 28, said data causing said control means 1584 to activate said character tracing circuit means 12, means further coupling the output of said second plurality of storage devices 28 to corresponding ones of said third plurality of storage devices 22, said third storage devices including means for incrementing by one count any binary data coupled thereto (see details in FIGS. 13*a* and 13*b*), and means coupling said incremented data in said third plurality of storage devices 22 to corresponding ones of said first plurality of storage devices 20.

Data Storage Control means 24 is coupled to said Beam Positioning means 1596 and said Timing means 2 for transferring said binary coded input data to particular locations in said memory 1 during said input-output cycle, said data storage control means 1583 including a fourth plurality of bistable storage devices 24 (shown in detail in FIG. 16), said devices being equal in number to said first, second and third pluralities of bistable devices 20, 28 and 22 respectively, means utilizing signals from said timing means 2 and said identifying signal accompanying each character represented by said binary coded input data to cause said data stored in said fourth plurality of bistable devices 24 to be coupled to corresponding ones of said second plurality of storage devices 28, means coupling the output of said second plurality of storage devices to said memory means 1 of said character generation control means 1584 to cause said binary data accompanying said identifying signal to be stored in said memory at a location determined by said data in said second plurality of storage devices 28, means further coupling said output of said second plurality of storage devices to corresponding ones of said third plurality of storage devices 22, said third storage devices incrementing by one count said data from said second storage devices and means coupling said incremented data from said third storage devices to corresponding ones of said fourth plurality of storage devices.

Insert Data Control means forms a part of said Character Generation Control means 1584 for causing all characters beginning with and following a predetermined character on said CRT screen to shift right one place in order to leave a space for inserting a new character, said Insert Data Control means including means coupled to said first storage register 16 in said input circuit and to said timing means 2 for enabling said timing means to automatically clear all of said binary storage elements of register 16 means coupled to said timing means 2, said first storage register 16 and said second storage register 18 in said input unit for enabling the data in said cleared first register 16 to be transferred to said second register 18, means coupled to said memory means, said first storage register 16 and said timing means 2 for enabling said timing means to transfer data from a location in the memory which represents said predetermined character to the stages of said first register 16 during the tracing cycle, means coupled to said memory means, said second storage register 18 and said timing means for enabling said timing means to transfer said data from said second register 18 to said location in said memory from which the data representing said predetermined character was transferred during the I/O cycle, said timing means causes said data in said first register 16 and the data in subsequent memory locations to be transferred one character position in a like manner, one of said characters being transferred during each tracing cycle.

Delete Data Control means is also coupled to said Character Generation Control means 1584 and said Beam Positioning means for deleting a selected character on said CRT screen and shifting all subsequent characters left one character position, said delete data control means including a fifth plurality of bistable storage devices 26, means coupling said third plurality of storage devices 22 to said fifth plurality of storage devices 26 for causing said fifth plurality of storage devices to store data always two counts behind the data stored in said first plurality of said storage devices 20, means coupled to said timing means, said memory and said first register 16 in said input circuit for destroying said data in said memory representing said character to be deleted and which is stored in said memory at a location determined by said data in said first plurality of storage devices, means for reading out each succeeding character in said memory at the address specified by the data in said first plurality of bistable storage devices during each of said succeeding tracing cycles to said first register 16, means for replacing said character read out in said memory during the succeeding I/O cycle at a location determined by said fifth plurality of bistable storage devices 26, means for producing a first signal when the end of a line is reached, means for producing a second signal when the end of the message is reached, and means for stopping said automatic sequence of operations by utilizing said first and said second signals.

It is understood that suitable modifications may be made in the structure as disclosed provided such modifications come within the spirit and scope of the appended claims.

Having now, therefore, fully illustrated and described our invention, what we claim to be new and desire to protect by Letters Patent is:

1. A character generation circuit compirsing:
(a) a matrix array of individual character synthesizing circuits electrically arranged in a plurality of rows and columns, each of said circuits being capable of producing a series of groups of digital output signals each of which groups is indicative of an individual line segment of a particular character to be formed; and
(b) means coupled to said array for selectively generating the output signals of any one of said circuits.

2. A character generation matrix as in claim 1 wherein each of said character synthesizing circuits comprises:
(a) a plurality of input lines;
(b) a plurality of output lines; and
(c) means coupling predetermined ones of said input lines to predetermined ones of said output lines.

3. A character generation matrix as in claim 2 wherein said electrical arrangement of the rows and columns of said character synthesizing circuits comprises:
(a) means for coupling said input lines of each character synthesizing circuit in any one column to corresponding input lines of all other of said circuits in said column; and
(b) means for coupling said output lines of each character synthesizing circuits in any one row to corresponding output lines of all other said circuits in said row.

4. A character generation matrix as in claim 3 wherein said generating means comprises:
(a) a first plurality of control circuits equal in number to said columns of character synthesizing circuits;
(b) means for coupling corresponding ones of said first plurality of control circuits to all character synthesizing circuit input lines in respective corresponding columns;
(c) means for producing a group of sequential scanning signals equal in number to the input liens of one of said character synthesizing circuits;
(d) means coupling said signals to each of said first control circuits in parallel;
(e) a second plurality of control circuits equal in number to said rows of character synthesizing circuits;
(f) means for coupling a corresponding one of said second plurality of control circuits to all character synthesizing circuit output lines in a respective corresponding row; and
(g) enabling means coupled to said control circuits for causing said control circuits to selectively enable any one of said character synthesizing circuits to produce said output signals representative of a particular character.

5. A character generation matrix as in claim 4 wherein each control circuit of said first and second plurality of control circuits comprises:
(a) a plurality of transistors equal in number to the number of input or output lines in the corresponding column row or to which it is connected, said transistors having a base element, a collector element and an emitter element;
(b) means coupling the collector of each transistor in each of said first control circuits to a corresponding one of said input lines in a corresponding column to which it is connected;
(c) means coupling the base of each transistor in any one of said first control circuits to a first common junction thereby forming groups of as many first common junctions as there are columns;
(d) column selection means in said enabling means coupled to said groups of first common junctions for selecting a column common junction and energizing the base of each transistor coupled to said selected junction;
(e) means for selectively applied individual ones of said sequential scanning signals to the emitters of corresponding ones of said transistors in all said first control circuits, said sequential scanning signals and said energizing signal from said column selecting means causing said transistors coupled to said energized column junction to sequentially conduct and produce sequential signals on said selected column input lines coupled to said transistor collectors;
(f) means coupling the emitter of each transistor in any one of said second plurality of control circuits to a corresponding one of said output lines in a corresponding row,
(g) means coupling the base of each transistor in any one of said second control circuits to a second common junction thereby forming as many groups of second common junctions as there are rows;
(h) output signal receiving means having input terminals corresponding in number to the number of output lines in any one row;
(i) means coupling the collectors of corresponding ones of said transistors in each of said second control circuits to a corresponding terminal in said output signal receiving means; and
(j) row selection means coupled to said second common junctions for selectively energizing the base of each transistor coupled to a selected row;
said output means receiving sequential character synthesizing output signals from the collectors of said group of transistors in said second control circuit which have said energizing signal from said row selection means applied to their respective bases.

6. A character generating matrix as in claim 5 wherein said row and said column selection means includes:
(a) a plurality of electrical gates equal in number to said rows and said columns, the outputs of said gates being coupled to corresponding ones of said row common junctions and said column common junctions;
(b) a plurality of bistable elements for storing binary data which represents both a particular column and a particular row; and
(c) means coupling the outputs of said bistable elements to said gates in such a manner that any one of said row gates and any one of said column gates may be simultaneously energized according to the binary data stored in said elements.

7. A character generating matrix as in claim 6 wherein all components in the character generation circuit are completely digital and operate in saturation and cut-off states only.

8. A character generation and display system comprising:

(a) a cathode ray tube having first and second beam deflecting means, an intensity control means and a viewing screen for displaying $n$ lines of characters and N characters per line;

(b) positioning means including a first plurality of bistable storage devices coupled to said first beam deflecting means for storing binary data to position said beam on said viewing screen;

(c) character tracing control circuit means coupled to said intensity control means and said second beam deflecting means for producing digital output signals causing said beam to trace a series of variable intensity controlled line segments on said screen as defined by discrete $x$ and $y$ coordinates to form a character while said beam is positioned by said positioning means;

(d) said character tracing control circuit means including a plurality of character generating diode matrices arranged electrically in a matrix array of rows and columns with each of said matrices being common to one of said rows and one of said columns; and (e) character generation control means coupled to said character tracing circuit and said beam positioning means for causing digital signals to be produced by a selected one of said matrices depending upon the beam position.

9. A system as in claim 8 wherein said character generation control means includes:

(a) magnetic memory means for storing in a plurality of memory locations binary coded data signals representative of alphanumeric characters;

(b) an input circuit for receiving binary coded data signals representative of said alphanumeric characters;

(c) timing means for alternately establishing an input/output cycle and a tracing cycle;

(d) means coupled to said input circuit, said memory and said timing means for transferring said binary coded data to said memory for storage during said input/output cycle and second means coupled to said memory, said beam positioning circuit and said timing means for transferring said binary coded data from said memory at a location corresponding to said beam position during said tracing cycle;

(e) means for converting said binary coded data from said memory to signals representing decimal quantities; and (f) gate means coupled to said converting means, said timing means and said memory means, said timing means enabling said gate means to couple the binary data from said memory means to said converting means only during said tracing cycle.

10. A system as in claim 8 including means coupled to said first bistable storage devices for automatically and successively incrementing said stored binary data by one count comprising:

(a) second and third pluralities of bistable storage devices each plurality of which is equal in number to said first plurality of bistable storage devices;

(b) means coupling the output of said first plurality of storage devices representing said beam position to corresponding ones of said second plurality of storage devices;

(c) means coupling the output of said second plurality of storage devices to said character generation control means to cause said control means to activate said character tracing control circuit means;

(d) means further coupling the output of said second plurality of storage devices to corresponding ones of said third plurality of storage devices, said third storage devices including means for incrementing by one count any binary data coupled thereto; and (e) means coupling said incremented data to corresponding ones of said first plurality storage devices.

11. A digital alphanumeric character generation and display system comprising:

(a) a cathode ray tube having first and second beam deflection means, intensity control means and a viewing screen for displaying $n$ lines of alphanumeric characters with N character positions per line;

(b) character tracing control circuit means coupled to said intensity control means and said first beam deflection means for producing digital signals causing said beam to trace a series of intensity controlled line segments on said screen as defined by $x$ and $y$ coordinates to form a character, said character tracing circuit means including a character generation matrix comprising, (1) a matrix array of individual character synthesizing circuits electrically arranged in a plurality of rows and columns, each of said circuits being capable of producing a plurality of groups of output signals, each of which groups is indicative of both the intensity and an end point of an individual segment of a particular character when a selected row and column are activated, and (2) means coupled respectively to said rows and columns for receiving row and column selection signals;

(c) character generation control means coupled to said character tracing circuit means for utilizing digital data signals to activate a particular one of said character synthesizing circuits, said character generation control means including, (1) memory means for storing a plurality of said digital data signals in $n$ lines of N signal positions per line, (2) means for converting a selected one of said digital data signals into said row and column selection signals;

(d) beam positioning control means coupled to said second beam deflection means and said character generation control means for positioning said electron beam in any one of said N character positions while selecting one of said digital data signals stored in said memory, said beam positioning control means comprising, (1) means for causing said beam to successively step from one of said character positions to another while selecting a corresponding one of said character identifying signals stored in said memory for each character position;

(e) timing means for causing a first timing cycle to enable tracing of said characters and a second timing cycle for enabling said character identifying signals to be stored in said memory means;

(f) data storage control means coupled to said character generation control, said beam positioning control means and said timing means for enabling said character identifying signals to be stored in any one of said positions in said memory during said second timing cycle; and (g) delete data control means coupled to said character generation control means, said beam positioning control means and said timing means for causing the destruction of any one of said digital data signals in said memory at a location determined by said beam positioning control means during a first of said tracing cycles and for causing successively positioned signals to be successively read out and stored during successive said first tracing cycles, each of said successively readout and stored signals being replaced in said memory at successive preceding locations beginning with the location of said destroyed signal during succeeding successive second cycles.

12. A character generation and display system which utilizes a cathode ray tube having a viewing screen, comprising:

(a) beam positioning means for utilizing digital data stored therein to successively position said beam in predetermined locations on the viewing screen of said cathode ray tube;

(b) character data generating means;

(c) character tracing means and beam intensity control means coupled to said character data generation means and said cathode ray tube for tracing a character on said screen;

(d) apparatus for controlling the location on said screen at which the desired character is to be traced, said apparatus including, (1) a data storage register for receiving digital data signals representing a desired one of said locations on said viewing screen for tracing said character, (2) a comparing circuit coupled to said data storage register and said beam positioning means for comparing the data stored therein and generating a control signal when said data in said register and said beam positioning means compare; and (e) means coupling said control signal from said comparing circuit to said beam intensity control means for unblanking said beam intensity.

13. A system as in claim 12 further including:

(a) typewriter keyboard keys, each of said keys generating unique character identifying signals when depressed; and (b) means coupling said generated character identifying signals to said data storage register for causing said register to be incremented each time a keyboard key is depressed.

14. A system as in claim 13 wherein said apparatus for controlling the desired location on said viewing screen for tracing said character further includes:

means coupled to said comparing circuit for providing a visual indication on said screen of said desired location whenever said control signal is produced by said comparing means.

15. A character generation and display system which utilizes a cathode ray tube having a viewing screen for tracing $n$ lines of characters with N characters per line, beam positioning means, character tracing means and beam blanking means, said system comprising:

(a) timing means for sequentially producing a first timing signal representing an input-output cycle, and a second timing signal representing a character tracing cycle;

(b) means for generating unique groups of first digital data signals each of which groups represents an individual alphanumeric character;

(c) memory means for storing $n$ lines of said first digital data groups with N data group locations per line, each of said N locations corresponding to said N locations on said cathode ray tube viewing screen;

(d) memory location selecting means coupled to said generating means, said memory means and said timing means for causing a first one of said unique signal groups to be stored in a desired one of said N memory locations during said first timing signal representing said input-output cycle, said selecting means including, (1) means for storing second digital data signals indicative of a particular one of said N memory locations, (2) means coupled to said cathode ray tube deflection means and said second timing signal for positioning said beam in one of said N cathode ray screen locations, (3) coupled to said beam positioning means, said second timing signal and said memory means for selecting one of said groups of digital data signals stored in said memory at a location corresponding to said beam position; and (e) means coupled to said digital data selection means and said cathode ray tube beam deflecting means for utilizing said selected digital data signals to cause said beam to trace said character at said beam position.

References Cited

UNITED STATES PATENTS

| | | | |
|---|---|---|---|
| 3,248,705 | 4/1966 | Dammann et al. | 340—324.1 |
| 3,090,041 | 5/1963 | Dell | 340—324.1 |
| 3,098,219 | 7/1963 | Voigt et al. | 340—324.1 |
| 3,165,729 | 1/1965 | Richman | 340—324.1 |
| 3,205,344 | 9/1965 | Taylor et al. | 340—324.1 |
| 3,205,488 | 9/1965 | Lumpkin | 340—324.1 |
| 3,234,534 | 2/1966 | Todman | 340—324.1 |
| 3,281,831 | 10/1966 | Yamushevsky | 340—324.1 |
| 3,311,908 | 3/1967 | Halsted et al. | 340—324.1 |
| 3,185,967 | 5/1965 | Foglia | 340—166 |
| 3,215,819 | 11/1965 | Smith et al. | 340—166 |
| 3,296,609 | 1/1967 | Wilhelmsen | 340—324.1 |
| 3,325,803 | 6/1967 | Carlock et al. | 340—324.1 |
| 3,329,947 | 7/1967 | Larrowe et al. | 340—324.1 |
| 3,336,587 | 8/1967 | Brown | 340—324.1 |
| 3,396,377 | 8/1968 | Strout | 340—324 |

THOMAS B. HABECKER, Primary Examiner

M. M. CURTIS, Assistant Examiner

U.S. Cl. X.R.

340—166, 172.5

UNITED STATES PATENT OFFICE
CERTIFICATE OF CORRECTION

Patent No. 3,466,645 September 9, 1969

Mauritz L. Granberg et al.

It is certified that error appears in the above identified patent and that said Letters Patent are hereby corrected as shown below:

Column 49, line 51, "circuits" should read -- circuit --; line 63, "liens" should read -- lines --. Column 50, line 24, "applied" should read -- applying --.

Signed and sealed this 21st day of April 1970.

(SEAL)
Attest:

Edward M. Fletcher, Jr.
Attesting Officer

WILLIAM E. SCHUYLER, JR.
Commissioner of Patents